(12) United States Patent
Onuki et al.

(10) Patent No.: US 7,099,555 B2
(45) Date of Patent: Aug. 29, 2006

(54) LIGHT AMOUNT ADJUSTING APPARATUS, OPTICAL EQUIPMENT, OPTICAL FILTER AND IMAGE-TAKING APPARATUS

(75) Inventors: Ichiro Onuki, Kanagawa (JP); Eriko Namazue, Tokyo (JP); Akio Kashiwazaki, Kanagawa (JP); Osamu Kanome, Kanagawa (JP); Kohei Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/919,514

(22) Filed: Aug. 17, 2004

(65) Prior Publication Data
US 2005/0041949 A1 Feb. 24, 2005

(30) Foreign Application Priority Data

| Aug. 20, 2003 | (JP) | ............................. 296075-2003 |
| Aug. 20, 2003 | (JP) | ............................. 296076-2003 |
| Mar. 17, 2004 | (JP) | ............................. 076368-2004 |

(51) Int. Cl.
*G02B 6/00* (2006.01)

(52) U.S. Cl. ..................... 385/147; 385/24; 250/208.1; 359/589; 359/726; 348/207.99; 348/218.1; 348/333.02

(58) Field of Classification Search ............ 385/16–24, 385/147; 250/208.1; 348/207.99, 218.1, 348/221.1, 333.02, 345, 350, 482, 231.3; 359/359, 589, 630, 633, 676, 726, 819
See application file for complete search history.

(56) References Cited

U.S. PATENT DOCUMENTS

| 3,843,235 | A | 10/1974 | Mino et al. .................. 350/205 |
| 6,377,305 | B1 * | 4/2002 | Onuki ......................... 348/345 |
| 2004/0021758 | A1 | 2/2004 | Miyazaki et al. ........... 347/106 |
| 2005/0068428 | A1 * | 3/2005 | Uchida ..................... 348/231.3 |

FOREIGN PATENT DOCUMENTS

JP 10-268382 10/1998

OTHER PUBLICATIONS

Shashin Kogyo (Photo Industry), Apr. 1999, pp. 74-77.

* cited by examiner

*Primary Examiner*—Phan Palmer
(74) *Attorney, Agent, or Firm*—Fitzpatrick, Cella, Harper & Scinto

(57) ABSTRACT

An optical filter is disclosed which adjusts the contours of blurred images and maintains the size of blurred images. The optical filter includes a substrate being substantially transparent and a first layer whose optical density changes continuously, formed on the substrate. A transmission rate of the first layer decreases substantially linearly from a center toward a periphery of the optical filter, and the transmission rate distribution is symmetric with respect to the center.

7 Claims, 58 Drawing Sheets

IN FOCUS

BLURRED IMAGE WITHOUT FILTER

BLURRED IMAGE WITH LINEAR TRANSMISSION RATE DISTRIBUTION FILTER

BLURRED IMAGE WITH GAUSS-TYPE TRANSMISSION RATE DISTRIBUTION FILTER

FIG.20

| IMAGE-TAKING MODE | | EXPOSURE CONTROL MODE | AF MODE | FILTER CONTROL |
|---|---|---|---|---|
| STILL-PICTURE MODE | (1) FULLY AUTOMATIC | STANDARD PROGRAM AE | ONE-SHOT AF | (A) AUTOMATIC SELECTION IN ACCORDANCE WITH BRIGHTNESS |
| | (2) LANDSCAPE | SMALL-APERTURE PRIORITY PROGRAM AE (LONG DEPTH OF FIELD) | ONE-SHOT AF | |
| | (3) SPORTS | HIGH-SPEED SHUTTER PRIORITY AE (LARGE APERTURE) | SERVO AF | |
| | (4) PORTRAIT | LARGE-APERTURE PROGRAM AE (SHORT DEPTH OF FIELD) | ONE-SHOT AF | (B) FORCED INSERTION |
| | (5) CLOSE-UP (MACRO) | INCREASE DEPTH OF FIELD (SMALL APERTURE) | ONE-SHOT AF | |
| | (6) PROGRAM AE | STANDARD PROGRAM AE | | (C) MANUAL SELECTION |
| | (7) SHUTTER PRIORITY AE | CAMERA OPERATOR SELECTS SHUTTER SPEED | ONE-SHOT AF | |
| | (8) APERTURE PRIORITY AE | CAMERA OPERATOR SELECTS F NUMBER | | |
| | (9) MANUAL | CAMERA OPERATOR SELECTS SHUTTER SPEED AND F NUMBER | | |
| MOVING-PICTURE MODE | (11) FULLY AUTOMATIC | STANDARD PROGRAM AE | | (A) AUTOMATIC SELECTION IN ACCORDANCE WITH BRIGHTNESS |
| | (12) SPORTS | STANDARD PROGRAM AE | SERVO AF | |
| | (13) SURF & SNOW | STANDARD PROGRAM AE (TENDENCY TO OVEREXPOSE) | | |
| | (14) PORTRAIT | LARGE-APERTURE PRIORITY AE (SHORT DEPTH OF FIELD) | SERVO AF | (B) FORCED INSERTION |
| | (15) SPOTLIGHT | STANDARD PROGRAM AE (APPROPRIATE FOR VERY BRIGHT PORTIONS) | | (C) MANUAL SELECTION |
| | (16) NIGHT | STANDARD PROGRAM AE (APPROPRIATE FOR VERY BRIGHT PORTIONS) | SERVO AF | |

FIG.32

| | IMAGE-TAKING MODE | EXPOSURE CONTROL MODE | AF MODE | FILTER CONTROL |
|---|---|---|---|---|
| STILL-PICTURE MODE | (1) FULLY AUTOMATIC | STANDARD PROGRAM AE | ONE-SHOT AF | (A) AUTOMATIC SELECTION IN ACCORDANCE WITH BRIGHTNESS (PRIORITY TO TRANSPARENT PORTION) |
| | (2) LANDSCAPE | SMALL-APERTURE PRIORITY PROGRAM AE (LONG DEPTH OF FIELD) | ONE-SHOT AF | |
| | (3) SPORTS | HIGH-SPEED SHUTTER PRIORITY AE (LARGE APERTURE) | SERVO AF | (B) 251c OR 251d SELECTED IN ACCORDANCE WITH BRIGHTNESS |
| | (4) PORTRAIT | LARGE-APERTURE PRIORITY PROGRAM AE (SHORT DEPTH OF FIELD) | ONE-SHOT AF | |
| | (5) CLOSE-UP (MACRO) | INCREASE DEPTH OF FIELD (SMALL APERTURE) | ONE-SHOT AF | (C) AUTOMATIC SELECTION IN ACCORDANCE WITH IMAGE-TAKING MAGNIFICATION |
| | (6) PROGRAM AE | STANDARD PROGRAM AE | ONE-SHOT AF | (D) MANUAL SELECTION |
| | (7) SHUTTER PRIORITY AE | CAMERA OPERATOR SELECTS SHUTTER SPEED | | |
| | (8) APERTURE PRIORITY AE | CAMERA OPERATOR SELECTS F NUMBER | | |
| | (9) MANUAL | CAMERA OPERATOR SELECTS SHUTTER SPEED AND F NUMBER | | |
| MOVING-PICTURE MODE | (11) FULLY AUTOMATIC | STANDARD PROGRAM AE | SERVO AF | (A) AUTOMATIC SELECTION IN ACCORDANCE WITH BRIGHTNESS (TRANSPARENT PORTION PRIORITY) |
| | (12) SPORTS | STANDARD PROGRAM AE | | |
| | (13) SURF & SNOW | STANDARD PROGRAM AE (TENDENCY TO OVEREXPOSE) | | |
| | (14) PORTRAIT | LARGE-APERTURE PRIORITY PROGRAM AE (SHORT DEPTH OF FIELD) | SERVO AF | (B) 251c OR 251d SELECTED IN ACCORDANCE WITH BRIGHTNESS |
| | (15) SPOTLIGHT | STANDARD PROGRAM AE (APPROPRIATE FOR VERY BRIGHT PORTIONS) | SERVO AF | (D) MANUAL SELECTION |
| | (16) NIGHT | STANDARD PROGRAM AE (APPROPRIATE FOR VERY BRIGHT PORTIONS) | | |

FIG.36

| IMAGE-MAGNIFICATION β | SELECTED FILTER |
|---|---|
| $\beta < 0.001$ | 251b |
| $0.001 \leq \beta < 0.01$ | 251c |
| $0.01 \leq \beta < 0.1$ | 251c |
| $0.1 \leq \beta < 1$ | 251b |

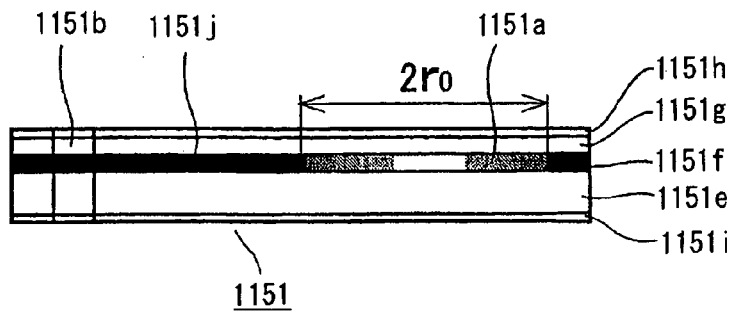
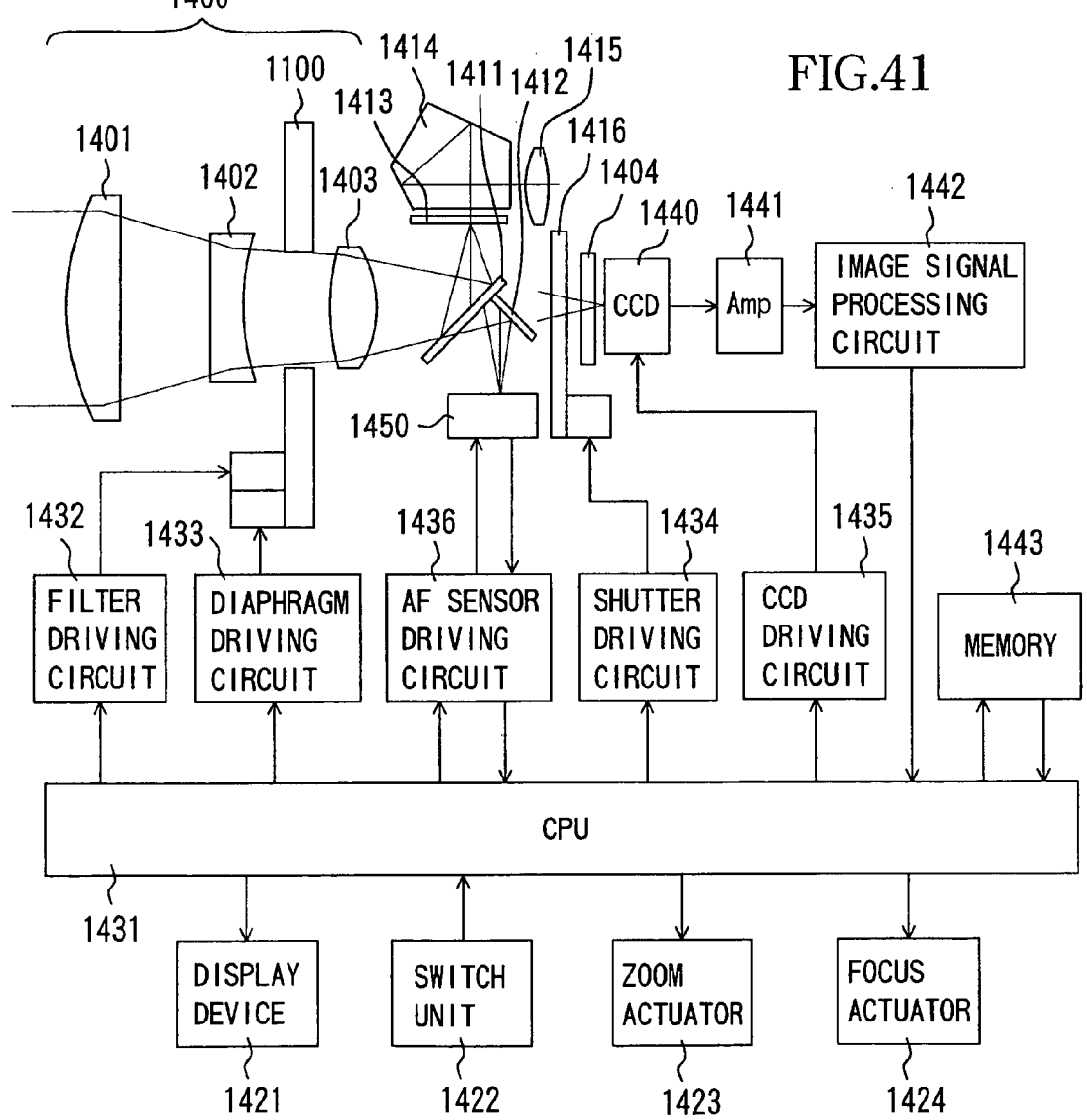

FIG.43

| | IMAGE-TAKING MODE | EXPOSURE CONTROL MODE | FILTER MODE | FINDER MODE | AF MODE |
|---|---|---|---|---|---|
| STILL-PICTURE MODE | (1) FULLY AUTOMATIC | STANDARD PROGRAM AE | FORCED RETRACTION | OPTICAL FINDER | PHASE DIFF. DET. ONE-SHOT AF (F2.8 LIGHT FLUX) |
| | (2) LANDSCAPE | SMALL-APERTURE PRIORITY PROGRAM AE (LONG DEPTH OF FIELD) | | | |
| | (3) SPORTS | HIGH-SPEED SHUTTER PRIORITY AE (LARGE APERTURE) | | | |
| | (4) PORTRAIT | LARGE-APERTURE PRIORITY AE (SHORT DEPTH OF FIELD) | FORCED INSERTION | ELECTRONIC FINDER | CONTRAST DETECT. ONE-SHOT AF |
| | (5) CLOSE-UP (MACRO) | INCREASE DEPTH OF FIELD (SMALL APERTURE) | | | |
| | (6) PROGRAM AE | STANDARD PROGRAM AE | MANUAL SELECTION | OPTICAL FINDER | PHASE DIFF. DET. ONE-SHOT AF · F2.8 LIGHT FLUX WHEN FILTER OFF · F5.6 LIGHT FLUX WHEN FILTER ON |
| | (7) SHUTTER PRIORITY AE | CAMERA OPERATOR SELECTS SHUTTER SPEED | | | |
| | (8) APERTURE PRIORITY AE | CAMERA OPERATOR SELECTS F NUMBER | | | |
| | (9) MANUAL | CAMERA OPERATOR SELECTS SHUTTER SPEED AND F NUMBER | | | |
| MOV.-PICTURE MODE | (11) FULLY AUTOMATIC | STANDARD PROGRAM AE | FORCED RETRACTION | ELECTRONIC FINDER | CONTRAST DETECTION SERVO AF |
| | (12) SPORTS | STANDARD PROGRAM AE | | | |
| | (13) SURF & SNOW | STANDARD PROGRAM AE (TENDENCY TO OVEREXPOSE) | | | |
| | (14) PORTRAIT | LARGE-APERTURE PRIORITY PROGRAM AE (SHORT DEPTH OF FIELD) | FORCED INSERTION | | |
| | (15) SPOTLIGHT | STANDARD PROGRAM AE (APPROPRIATE FOR VERY BRIGHT PORTIONS) | MANUAL SELECTION | | |
| | (16) NIGHT | STANDARD PROGRAM AE (APPROPRIATE FOR VERY BRIGHT PORTIONS) | | | |

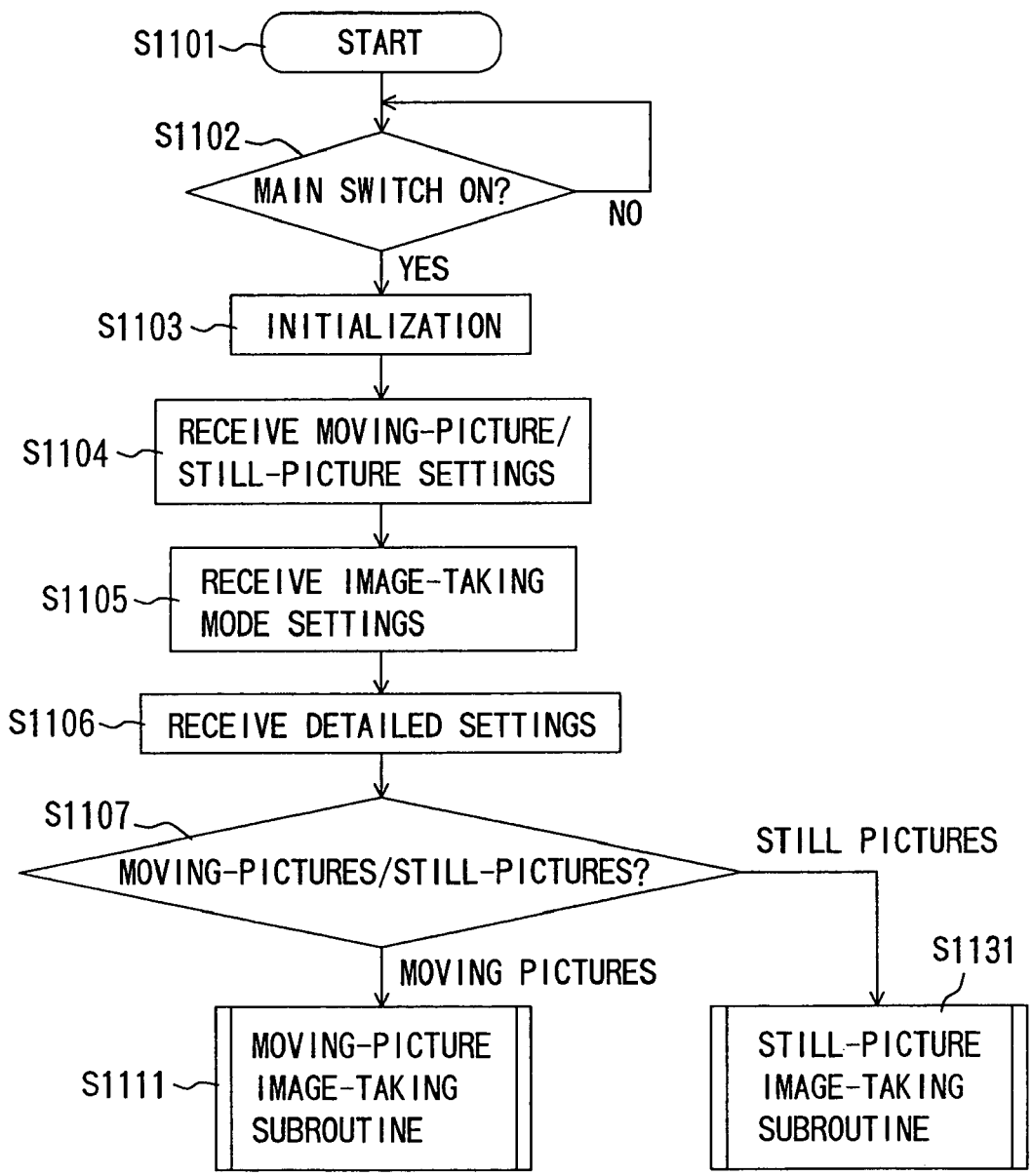

FIG.55

| | IMAGE-TAKING MODE | EXPOSURE CONTROL MODE | FILTER MODE | FINDER MODE | AF MODE |
|---|---|---|---|---|---|
| STILL-PICTURE MODE | (1) FULLY AUTOMATIC | STANDARD PROGRAM AE | 251a | OPTICAL FINDER | PHASE DIFF. DET. ONE-SHOT AF (F2.8 LIGHT FLUX) |
| | (2) LANDSCAPE | SMALL-APERTURE PRIORITY PROGRAM AE (LONG DEPTH OF FIELD) | | | PHASE DIFF. DET. SERVO AF (F2.8 LIGHT FLUX) |
| | (3) SPORTS | HIGH-SPEED SHUTTER PRIORITY AE (LARGE APERTURE) | | | |
| | (4) PORTRAIT | LARGE-APERTURE PRIORITY PROGRAM AE (SHORT DEPTH OF FIELD) | 251c | OPTICAL FINDER | PHASE DIFF. DET. ONE-SHOT AF (F2.8 LIGHT FLUX) |
| | (5) CLOSE-UP (MACRO) | INCREASE DEPTH OF FIELD (SMALL APERTURE) | 251d | ELECTRONIC FINDER | CONTR. DETECT. ONE-SHOT AF |
| | (6) PROGRAM AE | STANDARD PROGRAM AE | MANUAL SELECTION | OPTICAL FINDER | PHASE DIFF. DET. ONE-SHOT AF • 251a, 251c → F2.8 LIGHT FLUX • 251b → F5.8 LIGHT FLUX • 251d – AF PROHIBITED |
| | (7) SHUTTER PRIORITY AE | CAMERA OPERATOR SELECTS SHUTTER SPEED | | | |
| | (8) APERTURE PRIORITY AE | CAMERA OPERATOR SELECTS F NUMBER | | | |
| | (9) MANUAL | CAMERA OPERATOR SELECTS SHUTTER SPEED AND F NUMBER | | | |
| MOV.-PICTURE MODE | (11) FULLY AUTOMATIC | STANDARD PROGRAM AE | 251a | ELECTRONIC FINDER | CONTRAST DETECTION SERVO AF |
| | (12) SPORTS | STANDARD PROGRAM AE | | | |
| | (13) SURF & SNOW | STANDARD PROGRAM AE (TENDENCY TO OVEREXPOSE) | | | |
| | (14) PORTRAIT | LARGE-APERTURE PRIORITY PROGRAM AE (SHORT DEPTH OF FIELD) | 251d | | |
| | (15) SPOTLIGHT | STANDARD PROGRAM AE (APPROPRIATE FOR VERY BRIGHT PORTIONS) | MANUAL SELECTION | | |
| | (16) NIGHT | STANDARD PROGRAM AE (APPROPRIATE FOR VERY BRIGHT PORTIONS) | | | |

FIG.61

| | IMAGE-TAKING MODE | EXPOSURE CONTROL MODE | FILTER MODE | FINDER MODE | AF MODE |
|---|---|---|---|---|---|
| STILL-PICTURE MODE | (1) FULLY AUTOMATIC | STANDARD PROGRAM AE | FORCED RETRACTION | OPTICAL FINDER | PHASE DIFF. DET. ONE-SHOT AF (F2.8 LIGHT FLUX) |
| | (2) LANDSCAPE | SMALL-APERTURE PRIORITY PROGRAM AE (LONG DEPTH OF FIELD) | | | |
| | (3) SPORTS | HIGH-SPEED SHUTTER PRIORITY AE (LARGE APERTURE) | | | PHASE DIFF. DET. SERVO AF (F2.8 LIGHT FLUX) |
| | (4) PORTRAIT | LARGE-APERTURE PRIORITY AE (SHORT DEPTH OF FIELD) | FORCED INSERTION | OPTICAL FINDER | PHASE DIFF. DET. ONE-SHOT AF (F2.8 LIGHT FLUX) |
| | (5) CLOSE-UP (MACRO) | INCREASE DEPTH OF FIELD (SMALL APERTURE) | | ELECTRONIC FINDER | CONTR. DETECT. ONE-SHOT AF |
| | (6) PROGRAM AE | STANDARD PROGRAM AE | | | |
| | (7) SHUTTER PRIORITY AE | CAMERA OPERATOR SELECTS SHUTTER SPEED | MANUAL SELECTION | OPTICAL FINDER | PHASE DIFF. DET. ONE-SHOT AF (F2.8 LIGHT FLUX) |
| | (8) APERTURE PRIORITY AE | CAMERA OPERATOR SELECTS F NUMBER | | | |
| | (9) MANUAL | CAMERA OPERATOR SELECTS SHUTTER SPEED AND F NUMBER | | | |
| MOV.-PICTURE MODE | (11) FULLY AUTOMATIC | STANDARD PROGRAM AE | FORCED RETRACTION | | |
| | (12) SPORTS | STANDARD PROGRAM AE | | | |
| | (13) SURF & SNOW | STANDARD PROGRAM AE (TENDENCY TO OVEREXPOSE) | | | |
| | (14) PORTRAIT | LARGE-APERTURE PRIORITY PROGRAM AE (SHORT DEPTH OF FIELD) | FORCED INSERTION | ELECTRONIC FINDER | CONTRAST DETECTION SERVO AF |
| | (15) SPOTLIGHT | STANDARD PROGRAM AE (APPROPRIATE FOR VERY BRIGHT PORTIONS) | MANUAL SELECTION | | |
| | (16) NIGHT | STANDARD PROGRAM AE (APPROPRIATE FOR VERY BRIGHT PORTIONS) | | | |

LIGHT AMOUNT ADJUSTING APPARATUS, OPTICAL EQUIPMENT, OPTICAL FILTER AND IMAGE-TAKING APPARATUS

BACKGROUND OF THE INVENTION

1. Field of the Invention

The present invention relates to an optical filter for obtaining a favorably out-of-focused image when taking photographs, as well as to a light amount adjusting apparatus and an image-taking apparatus to which such an optical filter is mounted.

2. Description of Related Art

In the past, technology has been disclosed related to optical filters for improving out-of-focused image, so-called blurred images which are not in focus and to cameras incorporating such optical filters. An example of such filters are apodization filters. Apodization filters are devised so that their transmission rate decreases with increasing distance from a center of the optical axis in directions perpendicular to the optical axis, and when such a filter is used, then the contours in a blurred image become smooth, and cross-eyed bokeh and ring bokeh are eased. Accordingly, in scenes in which the focus depth is small, such as when taking portraits or in macro photography, the background becomes a naturally blurred image with softened contours, attaining a high-quality image in which the focused main object looks attractive.

Regarding manufacturing methods and structures for filters attaining this effect, the following technology is known.

U.S. Pat. No. 3,843,235 discloses a structure of an apodization filter, in which a planar-concave lens made of light-absorbing glass and a convex-planar lens made of transparent glass are cemented together, and the optical power is set to substantially zero. Also disclosed are the optical characteristics when incorporating this apodization filter in an optical system. U.S. Pat. No. 3,843,235 also discloses a method for obtaining an apodization filter by applying a photosensitive resin on a transparent base and causing a coloring reaction in the light-sensitive resin through an optical mask, as well as a method for fabricating an apodization filter by a vacuum evaporation method on a transparent base. It is also mentioned that it is possible to provide a plurality of apodization filters having different transmission rate distributions, and to perform a light amount adjustment control that is optimal for each filter.

Japanese Patent Application Laid-Open No. H10 (1998)-268382 discloses a lens barrel to which an apodization filter can be mounted removably, and a camera in which aperture control is performed based on stored information corresponding to the type of the mounted filter.

Moreover, pages 74–77 of the April 1999 issue of "SHASHIN KOGYO" (Photo Industry), a monthly journal published by KK. SHASHIN KOGYO SHUPPANSHA, discloses a product application example of an apodization filter according to the technology disclosed in U.S. Pat. No. 3,843,235 and made by cementing together a planar-concave lens made of light-absorbing glass and a convex-planar lens made of transparent glass, and also discloses the transmission rate distribution characteristics of the apodization filter.

However, the following problems occur when the optical characteristics of the apodization filter are inappropriate:

(A) When a transmission rate at an outer periphery of a filter is too large, then an effect of smoothening the contours of blurred images is decreased.

(B) When a transmission rate at an outer periphery of a filter is too small, then a diameter of blurred images becomes small, and a three-dimensional impression and an impression of depth of an image are lost.

(C) When a shape of a transmission rate distribution is inappropriate, then the contours of blurred images become unnatural.

(D) When the average transmission rate of an overall effective filter portion is too small, then a transmitted light quantity is reduced, extending an exposure time and increasing an effect of camera shake.

Consequently, for the optical characteristics of an apodization filter, a shape of a transmission rate distribution is desired, at which an avoiding of the above-noted problems is well-balanced, but the conventional technology has the following problems:

(1) With a cemented glass filter as disclosed in U.S. Pat. No. 3,843,235 and on pages 74–77 of the April 1999 issue of "SHASHIN KOGYO," that is, with the apodization filter made by cementing together the planar-concave lens made of light-absorbing glass and the convex-planar lens made of transparent glass, a shape of the transmission rate distribution is limited substantially to the Gauss distribution (also referred to as a "normal distribution" in stochastic theory), and it is difficult to obtain characteristics that provide a well-balanced solution of the problems (A) to (D) described above.

(2) There is no specific numeric limitation to the transmission rate distribution disclosed in U.S. Pat. No. 3,843,235, and there is also no explicit disclosure relating optical characteristics that should be provided in order to solve the problems (A) to (D).

(3) Japanese Patent Application Laid-Open No. H10 (1998)-268382 discloses a mechanism by which different filters can be mounted selectively in accordance with the image-taking objectives, but there is no disclosure with regard to a method for optimizing the effect of smoothening the contours of blurred images, or the filter characteristics for this.

However, the above-mentioned related technologies have the following disadvantages:

(1) U.S. Pat. No. 3,843,235 does not disclose anything about driving of the apodization filter with respect to an aperture through which a light flux is transmitted. It is mentioned that a plurality of apodization filters with different effective diameters and transmission rate distributions may be provided and used as appropriate, but there are no specific explanations at all regarding a changing mechanism or a method for exposure control. On the other hand, in the related technology disclosed in Japanese Patent Application Laid-Open No. H10 (1998)-268382, the camera operator must change the apodization filters manually, so that its handling properties are poor and there is the risk of missing out on good photo opportunities.

(2) With the apodization filter disclosed in U.S. Pat. No. 3,843,235, which is made by cementing together the planar-concave lens made of light-absorbing glass and the convex-planar lens made of transparent glass, the degree of freedom for the design of the transmission rate distribution is low, and moreover there is the problem that the image-forming optical system tends to become large, because a thickness of the filter has to be made large. Moreover, an advancing/retracting mechanism for on-off switching of the apodization filter (meaning the control of the advancing and retracting with respect to the aperture) is necessary, so that there was a need for a structure with which the image-taking apparatus into which the filter is incorporated does not become large. It should be noted that U.S. Pat. No. 3,843,235 contains statements which seem to indicate that it is possible to make the apodization filter thinner and lighter, that is, to manufacture the apodization filter by forming the photosensitive resin or the vapor-deposited film on the transparent base, but there is no description of any specific manufacturing method.

(3) Not only the above-described apodization filter made by cementing together the planar-concave lens made of light-absorbing glass and the convex-planar lens made of transparent glass, but also apodization filters made by forming the photosensitive resin or the vapor-deposited film on the transparent base, which can be expected to be made thinner and lighter in the future, are expensive in view of their workability and the facilities that are required to manufacture them.

On the other hand, in image-taking apparatuses for capturing still pictures or moving images by using an image-pickup system such as a silver-halide film or an image-pickup means such as a CCD, there are deficiencies with regard to not only the light amount adjusting function but also the focus adjustment function when trying to obtain high-quality images. However, in the related technologies, there is no disclosure regarding a method for focus adjustment when using an apodization filter.

Moreover, the Minolta STF 135 mm F2.8 [T4.5] (trademark) is a product incorporating an apodization filter. This product is an exchangeable lens for a single lens reflex camera using 35 mm film. In a single lens reflex camera with exchangeable lens, the focus detection is ordinarily performed by using an autofocus (AF) mechanism of a phase difference detection method (more specifically a focus detection device). However, in focus defection devices employing phase difference detection method, when a transmission rate is changed continuously at the pupil position of the image-taking lens due to an apodization filter, then an illumination distribution of an object for focus detection which is projected onto an AF sensor is not uniform, so that focus detection discrepancies occur. Consequently, this produce was a lens for manual focusing only. (The foregoing has been summarized from "SHASHIN KOUGYOU", publ. by KK. SHASHIN KOUGYOU SHUPPANNSHA, April 1999 issue, p. 77.

SUMMARY OF THE INVENTION

A light amount adjusting apparatus according to one aspect of the present invention comprises an optical filter whose optical density increases continuously from its center toward its periphery, a first actuator serving as a driving source of the optical filter, and a control circuit operating the optical filter with respect to an aperture formed in the light amount adjusting apparatus by controlling the driving of the first actuator.

An optical equipment according to one aspect of the present invention comprises an image-taking lens and the above-described light amount adjusting apparatus.

An optical filter according to one aspect of the present invention comprises a substrate being substantially transparent, and a first layer whose optical density changes continuously, formed on the substrate. A transmission rate of the first layer decreases substantially linearly from a center toward a periphery of the optical filter, and the transmission rate distribution is symmetric with respect to the center.

An optical filter according to another aspect of the present invention comprises a substrate being substantially transparent, a first layer being capable of accepting ink and being formed on the substrate, and a second layer including a flat surface and being formed on the first layer. Colored ink is applied to the first layer such that the optical density of the first layer increases continuously from a predetermined position toward a periphery of the optical filter.

An image-taking apparatus according to one aspect of the present invention comprises an image-pickup element photoelectrically converting an object image formed by an image-taking optical system, and a focus detection unit detecting a focus state of the image-taking optical system by using a phase difference detection method. The image-taking optical system comprises an optical filter including a first region with a constant optical density, and the focus detection unit performs a focus detection operation using a light flux that has been transmitted through the first region.

These and further objects and features of the light amount adjusting apparatus, optical equipment, optical filter and image-taking apparatus according to the present invention will become apparent from the following detailed description of preferred embodiments thereof taken in conjunction with the accompanying drawings.

BRIEF DESCRIPTION OF THE DRAWINGS

FIG. 20 is a table listing image-taking control modes of an image-taking apparatus according to Embodiment 3.

FIG. 32 is a table listing image-taking control modes of an image-taking apparatus according to Embodiment 4.

FIG. 36 is a table illustrating a filter selection during macro image-taking in Embodiment 4.

FIG. 40 is a cross-sectional view of an apodization filter in Embodiment 5.

FIG. 41 is a diagram showing a structure of an image-taking apparatus according to Embodiment 5.

FIG. 43 is a table listing image-taking modes of an image-taking apparatus according to Embodiment 5.

FIG. 44 is a flowchart showing a main control of an image-taking apparatus according to Embodiment 5.

FIG. 55 is a table listing image-taking modes of an image-taking apparatus according to Embodiment 6.

FIG. 61 is a table listing image-taking modes of an image-taking apparatus according to Embodiment 7.

DETAILED DESCRIPTION OF THE PREFERRED EMBODIMENTS

Embodiment 1

FIGS. 1 to 7 illustrate Embodiment 1 of the present invention.

Figure 1:
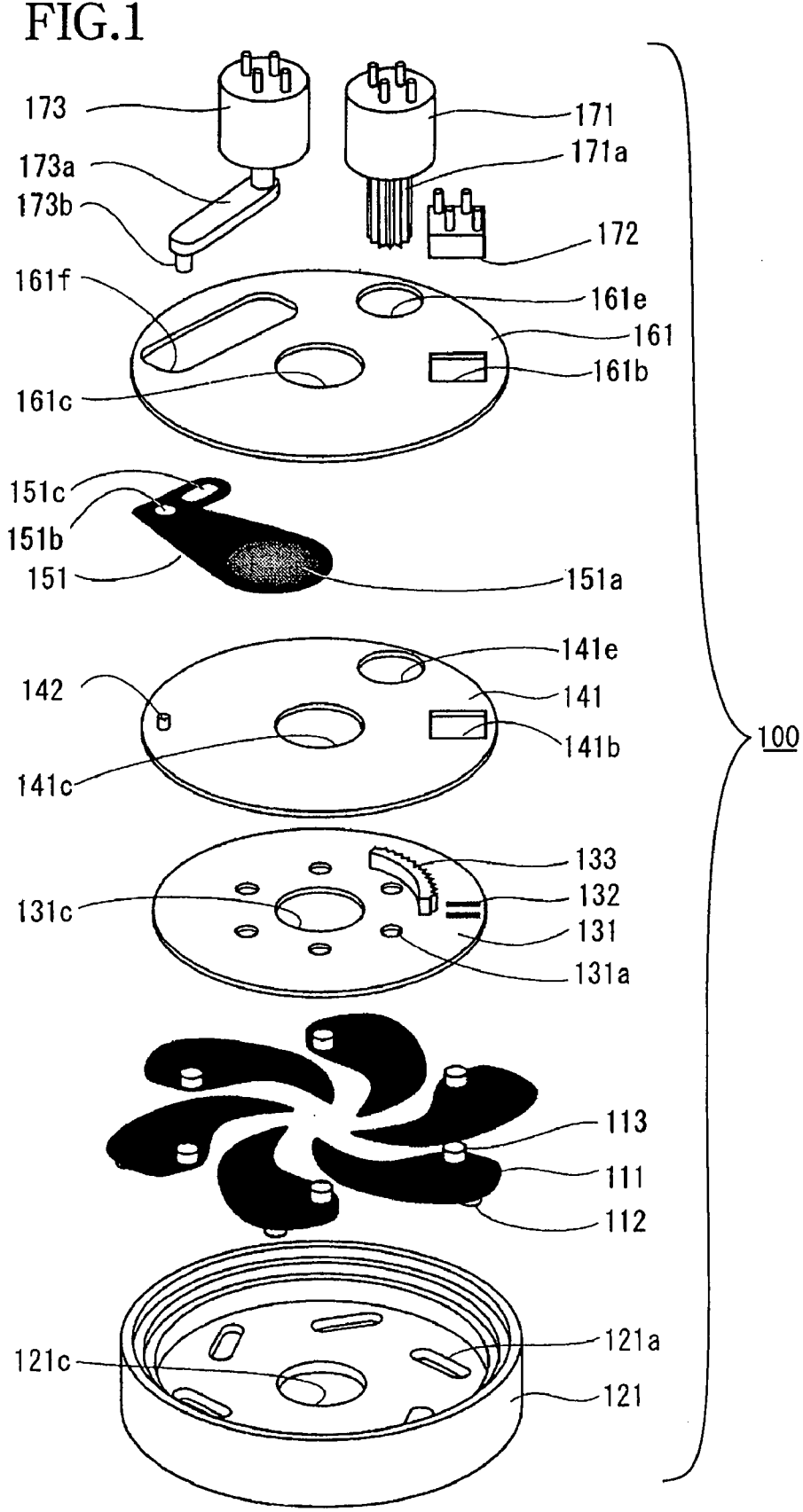
FIG. 1 is an exploded perspective view of a light amount adjusting apparatus according to Embodiment 1 of the present invention.

FIG. 1 is an exploded perspective view showing essential parts of a light amount adjusting apparatus 100 incorporating an apodization filter according to the present invention. In FIG. 1, reference numeral 111 denotes diaphragm blades having a property of blocking light across their entire region. Driven pins 112 and 113 are arranged upright on the lower and the upper surface of the diaphragm blades 111. Six diaphragm blades 111 of the same shape are used, forming a diaphragm aperture. It should be noted that the larger the number of diaphragm blades 111 is, the closer the shape of the aperture becomes to being circular when the diaphragm blades 111 are constricted, improving the naturalness of the blurred image and easing the diffraction phenomena due to the vertices of the polygonal aperture, but a larger number of blades also incurs greater manufacturing costs. Consequently, in the present diaphragm mechanism, it is preferable that the number of diaphragm blades is 5 to 9. In Embodiment 1, six diaphragm blades are used, as shown in FIG. 1, striving for an optimum balance between optical performance and manufacturing costs.

Reference numeral 121 denotes a bottom plate holding the diaphragm blades 111, which is provided, in the middle of a planar bottom surface, with an aperture 121c limiting a maximum diameter of a light flux when the diaphragm blades are spread open. Six cam grooves 121a are provided around this aperture 121. The pins 112 of the diaphragm blades 111 engage these cam grooves 121a and can be moved through them in a sliding manner. The six cam grooves 121a all have the same shape and are arranged at intervals of 60° around as a center on the aperture 121c.

Reference numeral 131 denotes a driving member also referred to as "windmill wheel," which is provided with six holes 131a for driving the diaphragm blades arranged at equal intervals around an aperture 131c in the center. The pins 113 of the diaphragm blades 111 engage these holes 131a in a rotatable manner. Accordingly, when the windmill wheel 131 is turned in counterclockwise direction, the six diaphragm blades 111 are driven by the driven pins 113 on the upper side, but at the same time the driven pins 112 on the lower side slide under the restriction of the cam grooves 121a, so that the diaphragm blades 111 are constricted from an open state to a minimum aperture value. When the windmill wheel 131 is turned back in clockwise direction, then the diaphragm blades 111 are restored from their minimum aperture value to their open state. Furthermore, a mark (an index) 132 for detecting an initial position of the windmill wheel as well as a driven gear 133 are provided on the upper surface of the windmill wheel 131.

Reference numeral 141 denotes a partition plate. A predetermined space is formed between the partition plate 141 and the bottom plate 121, and the diaphragm blades 111 and the windmill wheel 131 are accommodated in this space. An aperture 141c for transmitting light flux is provided in the middle of the partition plate 141. A rotation support shaft 142 of an apodization filter (explained below) is arranged upright next to the aperture 141c. The partition plate 141 is further provided with a phase detection window 141b for detecting the presence of the mark 132 on the windmill wheel 131 as well as an escape hole 141e of a later-described pinion gear.

Reference numeral 151 denotes an apodization filter made by forming a later-described apodization pattern (effective filter portion) 151a by inkjet printing on an about 0.1 mm thick transparent resin film, such as a PET (polyethylene terephthalate) film, and provided on its base end with a bearing hole 151b for rotational support and a long hole 151c for driving the apodization filter. The bearing hole 151b engages with the rotation support shaft 142 on the partition plate 141, rotatively supporting the apodization filter 151. The transmission rate distribution, that is, the optical density pattern of the effective filter portion 151a is explained further below.

Reference numeral 161 denotes a cover plate. A predetermined space is formed between the cover plate 161 and the partition plate 141, and the apodization filter 151 is accommodated in this space. An aperture 161c for transmitting light flux is provided in the middle of the cover plate 161. The cover plate 161 is further provided with a detection window 161b for detecting the presence of the mark 132 on the windmill wheel 131 as well as an escape hole 161e for a pinion gear and an escape hole 161f of a later-described driving lever.

Reference numeral 171 denotes a stepper motor for driving the windmill wheel 131. A pinion gear 171a of the stepper motor 171 passes through the holes 161e and 141e, and the front end portion (lower portion) of the gear 171a meshes with the gear 133 provided on the windmill wheel 131. Reference numeral 172 denotes an optical position detection unit incorporating a light projector element and a photodetector element and detecting light that has been reflected from an upper surface of the windmill wheel 131. The optical position detection unit 172 is configured such that when the mark 132 is arranged in opposition directly below the position detection unit 172, then a predetermined signal is output, so that it can be detected whether the phase angle of the windmill wheel 131 has returned to the initial state.

With this structure, the stepper motor 171 is driven to return the windmill wheel 131 to its initial state while observing the output of the position detection unit 172, and the diaphragm aperture is returned to the open state. By driving the stepper motor 171 from this position in accordance with a predetermined program, the diaphragm aperture can be controlled to a desired size.

Reference numeral 173 denotes a rotative actuator for driving the apodization filter 151, which is a bistable actuator, which can stop stably at both ends of a rotatable range when no current is sent through it. A driving lever 173a is fixed to the tip of an output shaft of the actuator 173, and a driving shaft 173b is arranged vertically on a lower surface at the front end of this driving lever 173a. The driving shaft 173b engages the long hole 151c for driving the apodization filter 151. With this structure, by controlling the direction of the current flowing through the actuator 173, the rotation of the driving lever 173a is controlled, and the effective filter portion 151a of the apodization filter 151 can be advanced into or retracted from an optical path of the light flux transmitted through the aperture 141c.

It should be noted that by arranging the actuator 173 and the stepper motor 171 next to one another in a ring-shaped space (in a plane that is perpendicular to the optical axis), an usage efficiency of the space can be improved and an overall apparatus can be made compact.

On the other side, a shutter mechanism as known in the art is arranged below the light amount adjusting apparatus 100. In FIG. 1, a downward direction is an object side, and an upward direction is an image-forming plane side. That is to say, the image-taking light flux is transmitted through the shutter mechanism, the diaphragm mechanism, and the apodization filter in that order. In the optical apparatus to which this light amount adjusting apparatus is mounted, when not image-taking, the shutter mechanism is in a light flux blocking state, that is, the shutter blades are in a closed position, and the diaphragm mechanism is kept in a minimum aperture state. In this situation, the apodization filter 151 is placed in the dark, so that a deterioration of its filter pigments due to harmful light, such as UV light, can be avoided.

Furthermore, the diaphragm blades 111 and the apodization filter 151 are layered in a direction of the optical axis, and are overall configured as one unit. The stepper motor 171 for driving the diaphragm blades and the filter for driving actuator 173 are arranged next to one another in this unit, so that the apodization filter 151 and the mechanism for driving it can be incorporated in a space that is substantially the same as in a conventional diaphragm mechanism, which contributes to the compactness of an overall apparatus.

The present embodiment is configured such that when the diaphragm mechanism is incorporated in a later-described image-forming optical system, the F number can be adjusted from F2 for the open state to F8 for the smallest aperture.

Figure 2:
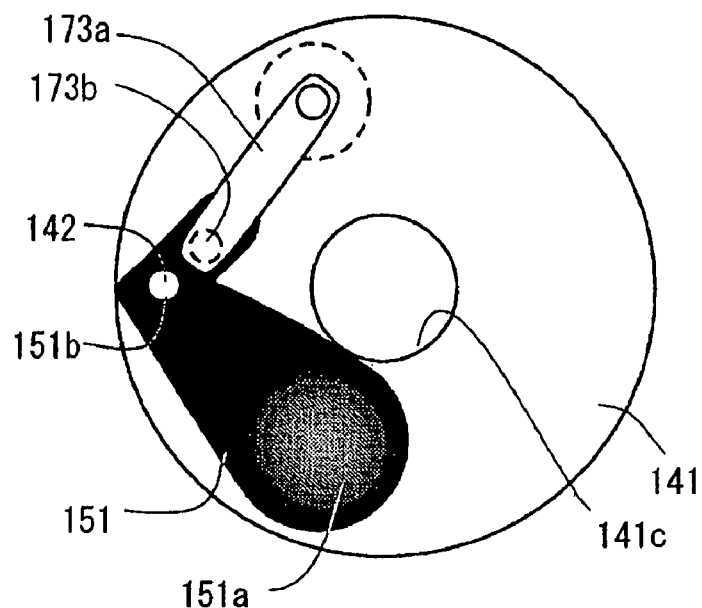
FIGS. 2(A) and 2(B) show top views of an apodization filter in Embodiment 1.
Figure 2:
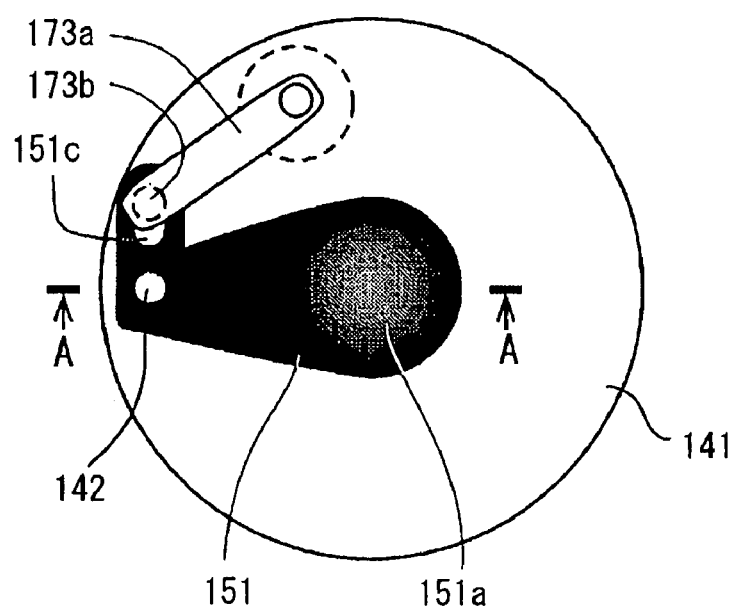

FIG. 2 is a top view illustrating the advancing/retracting operation of the apodization filter 151. FIG. 2(A) shows a state when the filter is retracted from the light flux transmitting aperture. In FIG. 2(A), reference numeral 141 denotes the partition plate explained in FIG. 1. The light flux transmitting aperture 141c is arranged in the middle, and the rotation support shaft 142 of the apodization filter is arranged upright at the edge portion of the partition plate 141.

Reference numeral 151 denotes the apodization filter, which is provided with the bearing hole 151b for rotational support, rotatably engaging the support shaft 142. Reference numeral 173a denotes the driving lever, which is fixed to the output shaft of the actuator 173 (not shown in FIG. 2). The driving shaft 173b on the lower side at the tip of the driving lever 173a engages the driven long hole 151c provided in the apodization filter 151. In FIG. 2(A), the driving lever 173a is turned in counterclockwise direction, so that the apodization filter 151 is turned in clockwise direction, and the effective filter portion 151a is retracted away from the light flux transmitting aperture 141c.

Next, when a current of a predetermined direction is sent through the actuator 173, the driving lever 173a turns in clockwise direction. Thus, the apodization filter 151 turns in counterclockwise direction and is advanced such that the effective filter portion 151a covers the light flux transmitting aperture 141c, resulting in the state shown in FIG. 2(B). And when the current sent through the actuator 173 is inverted, also the apodization filter 151 is inverted, and returns to the state shown in FIG. 2(A). By using the bistable actuator 173, the apodization filter 151 can be kept stably in both the states shown in FIG. 2(A) and FIG. 2(B) when the current is stopped.

The following is an explanation of the optical characteristics of the apodization filter 151.

An optical absorption capability of the apodization filter 151 differs depending on a position on its effective region, but the spectral transmission rate in a visible light spectrum is substantially uniform at any position within the effective region. Ordinarily, an optical density or a transmission rate is used as an index for expressing the optical characteristics of such a filter. An optical density (OD) and an transmission rate Tr (%) are related by the following equations:

$$Tr = 100 \times 10^{(-OD)} \quad \text{(Eq. 1)}$$

$$OD = -\text{Log}_{10}(Tr/100) \quad \text{(Eq. 2)}$$

Figure 3:
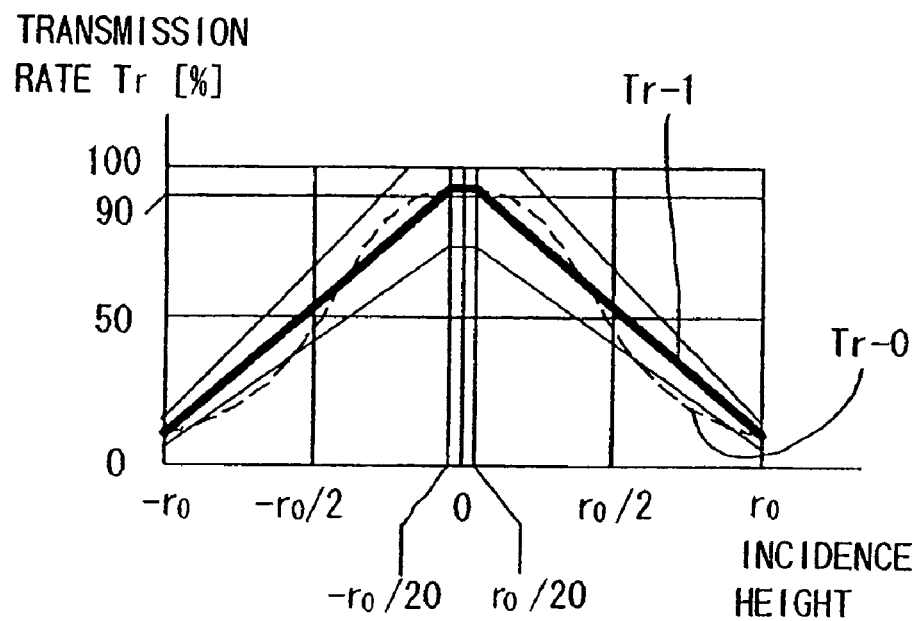
FIG. 3(A) shows a transmission rate distribution of an apodization filter in Embodiment 1.
FIG. 3(B) shows an optical density distribution of an apodization filter in Embodiment 1.
Figure 3:
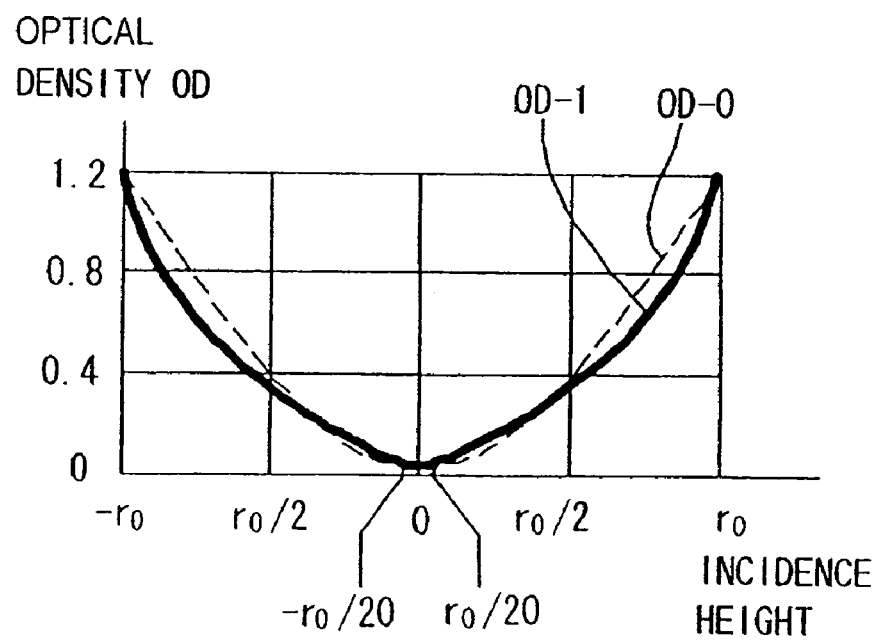

FIG. 3 shows graphs illustrating pattern characteristics of the effective filter portion 151a of the apodization filter 151 in Embodiment 1. FIG. 3(A) shows a transmission rate distribution. The horizontal axis in FIG. 3(A) is a light ray incidence height on a filter, that is, the distance from the center of the filter, with r0 being an effective radius of the filter. The vertical axis in FIG. 3(A) is the transmission rate Tr (%). FIG. 3(B) shows an optical density (OD). The horizontal axis in FIG. 3(B) similarly is the incidence height, and the vertical axis is the optical density.

Tr-1, which is shown by the bold straight line in FIG. 3(A), is a design value for a transmission rate distribution of the optical filter in the present Embodiment 1. The transmission rate Tr(r) as a function of the incidence height r is given by the following equation representing a straight line:

$$Tr(r) = 100 \times (a \times r + b) \quad \text{(Eq. 3d)}$$

Here, a represents a predetermined negative coefficient and b represents a predetermined positive coefficient. Moreover, the thin straight lines above and below this straight line illustrate a tolerance for the transmission rate distribution, and mark a tolerance range of ±20% with respect to the design value. This corresponds to the tolerance range for the transmission rate manufacturing discrepancies when fabricating the optical filter. The inventors have found that outside this tolerance range, the effect of adjusting the contours of blurred images clearly decreases.

Tr-0, which is shown by a broken line in FIG. 3(A) is a characteristic of a transmission rate distribution of an ordinary apodization filter with Gauss distribution. For characteristics of the two filters, examples are given in which the transmission rates at the center and the outermost periphery are the same, and as becomes clear from FIG. 3(A), the transmission rate near the center of the conventional filter with Gauss distribution is relatively high and the transmission rate at the periphery is relatively low, compared to the filter with the linear distribution of the present invention. Moreover, it can be seen that the transmission rate at the periphery of the Gauss distribution-type filter is lower than the tolerance range for the linear distribution-type filter.

OD-1 in FIG. 3(B) is an optical density distribution as calculated by substituting Eq. 3d into Eq. 2. In the present embodiment, a practically transparent region without an optical absorption substrate capability is provided at a small region in the center, that is, at the region with an incidence height of r0/20 or less. The reason for this is that, when fabricating the optical filter by a manufacturing method described below, if the design value of the transmission rate distribution has a sharp peak at the filter center, then a ring-shaped pattern or a dark spot may generate at the filter center due to manufacturing discrepancies, so that a finite transparent region is provided in order to prevent generating the ring-shaped pattern or dark spot. Moreover, that the transmission rate of the transparent region is lower than 100% is caused by a light quantity loss due to surface reflections at an incident surface and an emergent surface of the filter, so that it is not loss due to the optical absorption substance.

Figure 4:
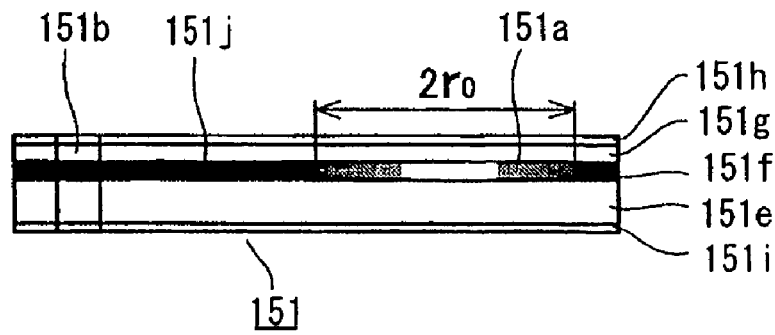
FIG. 4 is a cross-sectional view of an apodization filter in Embodiment 1.

FIG. 4 is a diagram illustrating the structure of a thin, light-weight and inexpensive apodization filter 151 with a high degree of design freedom, and is a cross-sectional view taken along A—A in FIG. 2(B). Reference numeral 151e denotes a PET film serving as a transparent substrate. An ink-accepting layer 151f is applied to the upper surface of the PET film 151e. A dye-based coloring material having a low dispersion and a flat spectral transmission rate in the visible light spectrum is ejected onto the ink-accepting layer 151f by a micro-drop ejecting apparatus, namely a so-called inkjet recording apparatus, thus forming an effective filter portion 151a with a diameter of 2r0. On the other hand, in regions of the ink-accepting layer outside the effective filter portion 151a, a light-blocking portion 151j is formed, for example, by a pigment-based coloring material having a higher optical density than the dye-based coloring material. Then, a flattening layer 151g is applied, and the irregularities in the surface of the ink-accepting layer occurring due to the printing process are flattened out. Furthermore, anti-reflective layers 151h and 151i are formed on the upper surface of the flattening layer 151g and the lower surface of the transparent substrate 151e by vapor deposition method.

With this process, a large number of apodization filters are formed on the transparent substrate 151e of large surface area, and when separating them by punching into individual filters in a final pressing step, the bearing hole 151b for rotational driving is also punched out at the same time, thus obtaining the filter 151. It should be noted that the details regarding the materials for the various layers, the application process and the drying process as well as the details of the technology for fabricating a high-quality filter whose optical density changes continuously and that has little dispersion and diffraction with respect to incident light are not directly related to the present invention and are known in the art, so that their further explanation has been omitted.

For the process of manufacturing the apodization filter according to the present invention, the above-described process is preferable, but there is no limitation to this. For example, it is also possible to fabricate by inkjet printing only the portion of the filter through which the light flux is transmitted, then separate this portion by punching, and attach it to a holding lever made of a metal thin sheet. Moreover, when an optically absorbing thin film of titanium oxide or the like is formed, by using a vacuum evaporation apparatus, it is also possible to continually change the film thickness.

The following is an explanation of a light amount adjusting function for the case that the light amount adjusting apparatus of FIG. 1 is applied to an image-taking apparatus.

Ordinarily, the following APEX equation is used as an equation for determining an adequate exposure with a still camera:

$$AV+TV=BV+SV=EV \tag{Eq. 4}$$

In Eq. 4, AV represents an aperture value, TV represents a time value, BV represents a luminance value, SV represents a film speed value, and EV represents an exposure value.

The above-described apodization filter 151 has the function to attenuate the light flux in the visible light spectrum, so that it can be regarded as one type of ND filter (neutral optical density filter). If both the diaphragm mechanism and the ND filter are used to adjust the light amount, then it is necessary to consider not only the F number, which indicates the diaphragm aperture, but also the T number, which takes into account a decrease of the transmission rate due to the ND filter. Here, a dimming step number, the T number and the AV value due to using the ND filter can be expressed by the following equations:

$$\text{dimming step number} = -\text{Log}_2(Tr/100) \tag{Eq. 5}$$
$$= -3.32 \times \text{Log}_{10}(Tr/100)$$
$$= 3.32 \times OD$$

$$T \text{ number} = F \text{ number}/(Tr/100)^{0.5} \tag{Eq. 6}$$

$$AV \text{ value (corresponding to } T \text{ number)} = AV \text{ value} \tag{Eq. 7}$$
$$\text{(corresponding to } F \text{ number)} -$$
$$\text{Log}_2(Tr/100) =$$
$$AV \text{ value (corresponding to } F \text{ number)} +$$
$$\text{dimming step number}$$

Herein, the transmission rate and the OD value of Eq. 1 and Eq. 2 are the values for a predetermined location on the filter, whereas for the transmission rate and the OD value in Eq. 5 to Eq. 7, the averages values across the entire region within the light flux transmitting aperture as formed by the diaphragm blades are used.

Figure 5:
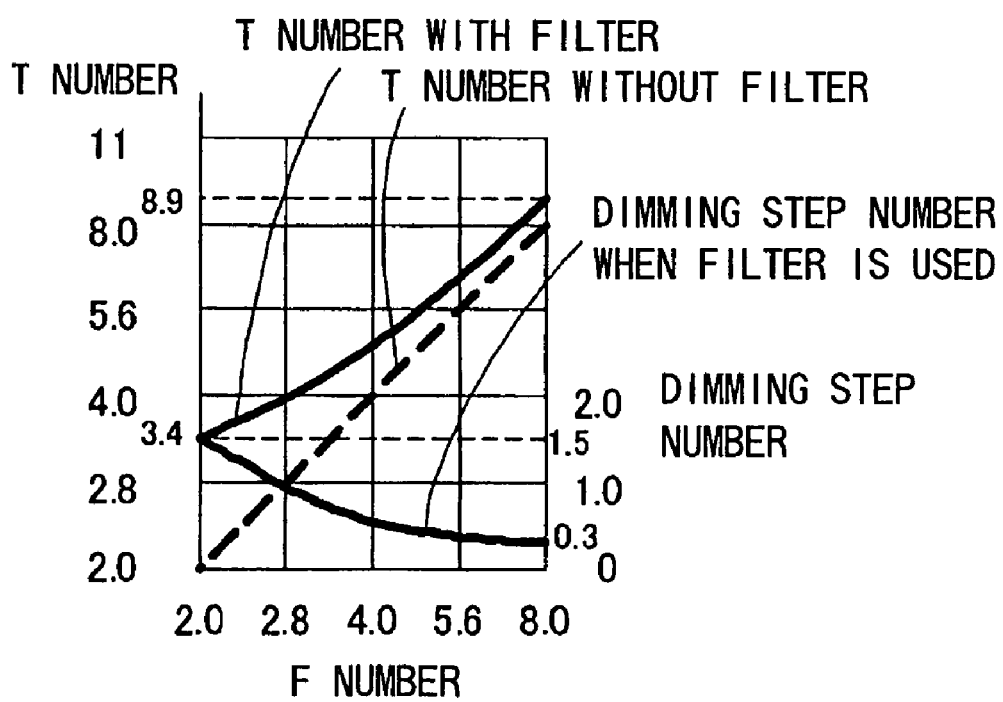
FIG. 5 is a graph illustrating a light amount adjusting action of an apodization filter in Embodiment 1.

FIG. 5 is a diagram illustrating the T number and the dimming step number for the case that an apodization filter 151 having the characteristics shown in FIG. 3 is incorporated in the light amount adjusting apparatus of FIG. 1, which is then used in an image-forming optical system.

In this diagram, the horizontal axis is the F number adjusted by the diaphragm mechanism incorporated in the light amount adjusting apparatus 100. An open-state F number of the image-forming optical system according to this embodiment is F2.0 as explained below, and the diaphragm mechanism has a diaphragm adjustment function from F2.0 (open) to F8.0 (smallest aperture). The vertical axis is the T number (left scale) and the dimming step number (right scale). In FIG. 5, if the apodization filter 151 is retracted from the light flux transmitting aperture, then the F number and the T number coincide, as indicated by the broken line. On the other hand, if the apodization filter 151 has been advanced into an optical path of the light flux transmitted through the aperture, then the T number and the dimming step number become as indicated by the solid lines. That is to say, the effect of the apodization filter 151 becomes maximal when the aperture is open, but in this case also the light loss becomes maximal, with a dimming step number of about 1.5 steps, and a T number of about 3.4. Then, as the F number is increased by constriction with the diaphragm mechanism, the dimming step number decreases and the T number approaches the F number, but the effect of the apodization filter 151 is diminished. At the smallest aperture F8, the dimming step number becomes 0.3 steps and the T number becomes 8.9.

Figure 6:
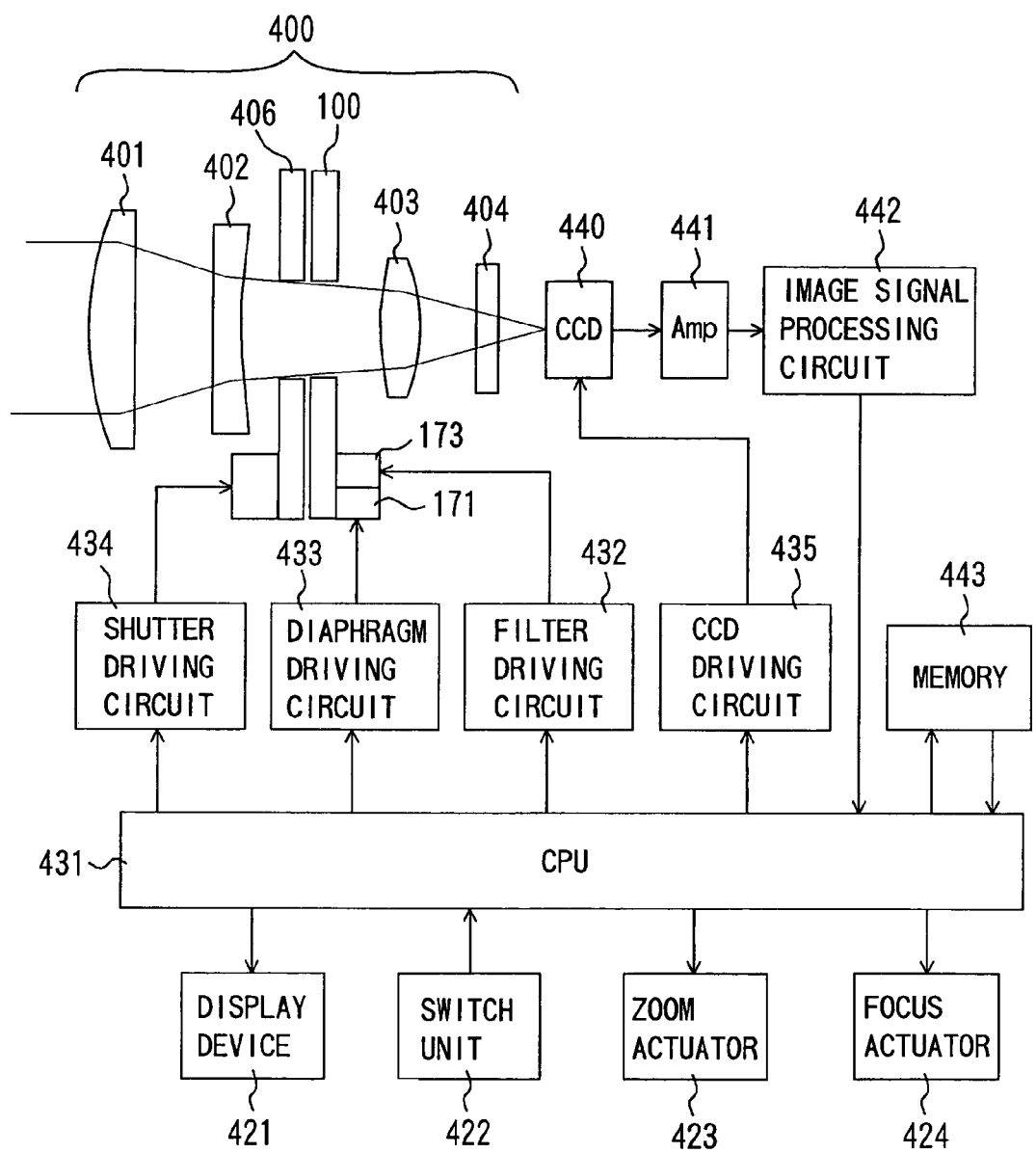
FIG. 6 is a diagram showing a structure of an image-taking apparatus according to Embodiment 1.

FIG. 6 shows an image-taking apparatus to which the light amount adjusting apparatus 100 shown in FIGS. 1 to 5 has been mounted. In the present Embodiment 1, a digital camera is taken as an example of the image-taking apparatus, which photoelectrically converts an optical image with an image-pickup device into electrical signals, and records still images or moving images as digital data.

Reference numeral 400 denotes an image-forming optical system made of a plurality of lens units, including a front lens unit 401, a zoom lens unit 402, a focus lens unit 403, and an optical low-pass filter 404. The optical specifications of the image-forming optical system according to Embodiment 1 are a focal length of 35–200 in terms of a camera using a 35 mm film, and an open F number of 2.0. Reference numeral 100 denotes the light amount adjusting apparatus shown in FIG. 1, and reference numeral 406 denotes a shutter mechanism as known in the art, which regulates an exposure time by driving a plurality of shutter blades.

Moreover, an image-pickup device 440 is arranged at a focus position (expected image surface) of the image-forming optical system 400. For this, a photoelectrical conversion means, such as a two-dimensional CCD is used, which is made of a plurality of photoelectrical conversion sections converting irradiated optical energy into electric charges, a charge accumulation section accumulating these charges, and a charge transfer section transferring these charges to the outside. In the present Embodiment 1, a CCD sensor with 3 million pixels is used.

An image of an object that is formed on the image-pickup device 440 is converted into an electrical signal with a charge amount at each pixel that corresponds to the brightness of the image at that pixel. After the electrical signal has been amplified by an amplification circuit 441, it is subjected to a γ-correction process or the like with an image signal processing circuit 442. This process may also be performed as a digital signal process after A/D conversion. The thusly produced image signal is stored in a memory 443. The memory 443 may be a semiconductor memory such as a flash ROM, an optical memory such as an optomagnetic disk, or a magnetic memory such as a magnetic tape or the like.

Reference numeral 421 denotes a display device, such as a liquid crystal display, which displays the object that has been picked up with the image-pickup device 440 and the operating condition of the optical apparatus. Reference numeral 422 denotes a control switch unit made of a zoom switch, an image-taking preparation switch, an image-taking start switch, an image-taking mode selection switch for selecting either a still-image mode or a moving-image mode, and an image-taking condition switch for setting an exposure control mode or an AF mode. Reference numeral 423 denotes a zoom actuator, which drives the zoom lens unit 402 and changes the focus length of the image-forming optical system 400. Reference numeral 424 denotes a focus actuator, which drives the focus lens unit 403 and adjusts the focus condition of the image-forming optical system 400.

Reference numeral 431 denotes a CPU, which controls an operation of the overall image-taking apparatus. Reference numeral 432 denotes a filter driving circuit, which drives the advancing and retracting of the apodization filter 151 into and out of the light flux transmitted through the aperture by controlling the current flowing through the actuator 173 shown in FIG. 1. Reference numeral 433 denotes a diaphragm driving circuit, which drives the stepper motor 171 while monitoring the output of the optical position detection unit 172 shown in FIG. 1. Thus, the diaphragm driving circuit 433 adjusts a rotation angle of the windmill wheel 131 and controls an F number to a predetermined value. Reference numeral 434 denotes a shutter driving circuit, which drives a shutter mechanism 406 and controls the exposure time for the image-pickup device 440.

FIG. 6 shows an embodiment in which the image-forming optical system and an image-pickup system including for example the image-pickup device are formed in an integrated manner, but it is also possible to make the image-forming optical system incorporating the light amount adjusting apparatus freely mountable/removable with respect to the image-pickup system. That is to say, a structure as that of a single-lens reflex camera in which an optical apparatus including the image-forming optical system and an image-pickup device including the image-pickup system can be separated from one another is also possible.

Figure 7:
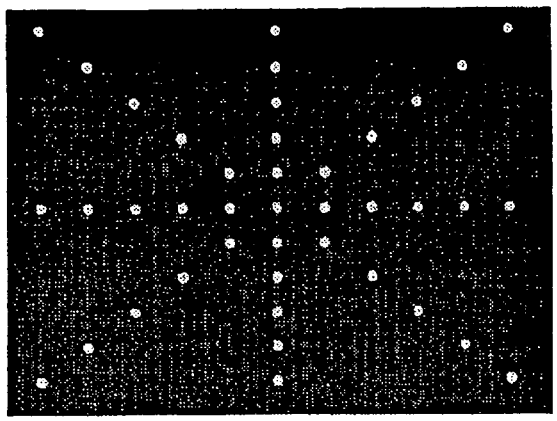
FIGS. 7(A) to 7(D) illustrate an effect of improving blurred images with an apodization filter according to Embodiment 1.
Figure 7:
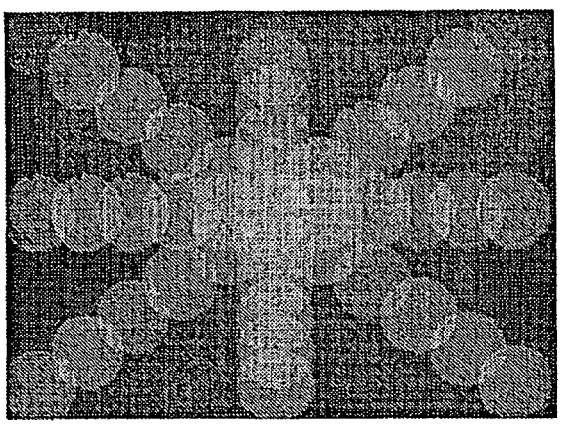
Figure 7:
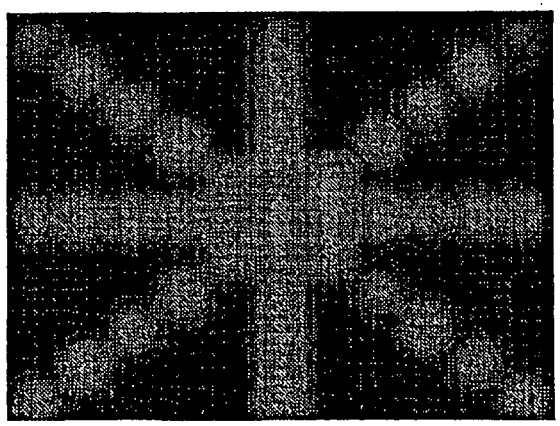
Figure 7:
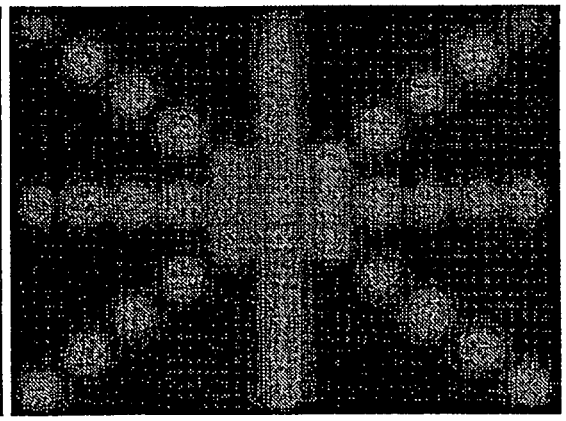

FIG. 7 illustrates an effect of adjusting the contours of blurred images when an image of bright spots is taken using the optical filter according to the present Embodiment 1. This was evaluated by the following procedure:

(1) Small holes were opened at predetermined intervals in the horizontal, vertical and diagonal directions in a black, light-blocking piece of paper of A4 size arranged in landscape orientation.

(2) This light-blocking piece of paper was placed on a light box, whose illumination light source was turned on, thus obtaining an object of bright spots lined up on a dark background.

(3) The image-taking apparatus of FIG. 6 was set up squarely facing the object, the focal length of the image-taking optical system was set to the telephoto end, and the aperture value was set to "open." Then, the apodization filter 151 was retracted out of the image-taking light flux, the bright spots were focused using the autofocus (AF) function, and an image was taken. The resulting image is shown in FIG. 7(A).

(4) Next, the AF function was canceled, the focus was set to a position in front of the bright spots using the manual focusing function, and an image was taken. The resulting image is shown in FIG. 7(B).

(5) Next, the apodization filter 151 was advanced into the image-taking light flux, and an image was taken under the same conditions as for (4). The resulting image is shown in FIG. 7(C).

(6) For comparison, an image-taking apparatus incorporating an apodization filter 151 whose transmission rate followed a Gauss distribution was prepared, and an image was taken under the same conditions as for (5). The resulting image is shown in FIG. 7(D).

The following becomes clear from comparing the three blurred images obtained with the above-described procedure: In the blurred image of FIG. 7(B), which was taken without a filter, the edges of the contours are sharp, and there is not only an unnaturalness about single blurred image (spots), but the unnaturalness increases when a plurality of the blurred images (spots) overlap.

The blurred image of FIG. 7(D) provides naturally blurred shapes whose contours are eased smoothly, but the diameters are diminished, and there is the risk that an image with poor three-dimensional effect results in scenes in which there is only a small distance between a main object and a background.

In the blurred image of FIG. 7(C) on the other hand, the contours are suitably smoothened and the size of the blurred images (spots) is maintained, striking a good balance between the two. That is to say, an image with ample three-dimensional effect is attained by using an apodization filter 151 with a linear transmission rate distribution according to the present embodiment, the contours of the blurred image are adjusted without unnaturalness and the size of the blurred spots is greatly diminished.

It should be noted that even when a shape of the transmission rate distribution of the optical filter diverts slightly from an ideal linear shape, it is still possible to maintain the above-described effect. According to investigations performed by the applicant, the effect of FIG. 7(C) can be attained with a design in which the transmission rate distribution decreases linearly from the center of the filter toward the outer circumference of the effective portion, but also with a substantially linear distribution in which a given transmission rate is kept within a range of plus-minus 20% of the design value, that is, within the tolerance range shown by the thin solid line in FIG. 3(A)

Embodiment 2

The apodization filter 151 used in Embodiment 1 has only one filter portion in which the transmission rate distribution decreases linearly from the center to the periphery, and the actuator only advances or retracts the filter with respect to the light flux transmitted through the light-flux transmission aperture, whereas Embodiment 2 explained below is an example in which a plurality of apodization filters are arranged on one filter substrate, and the most appropriate effective filter portion can be selected in accordance with the image-taking intentions.

Figure 8:
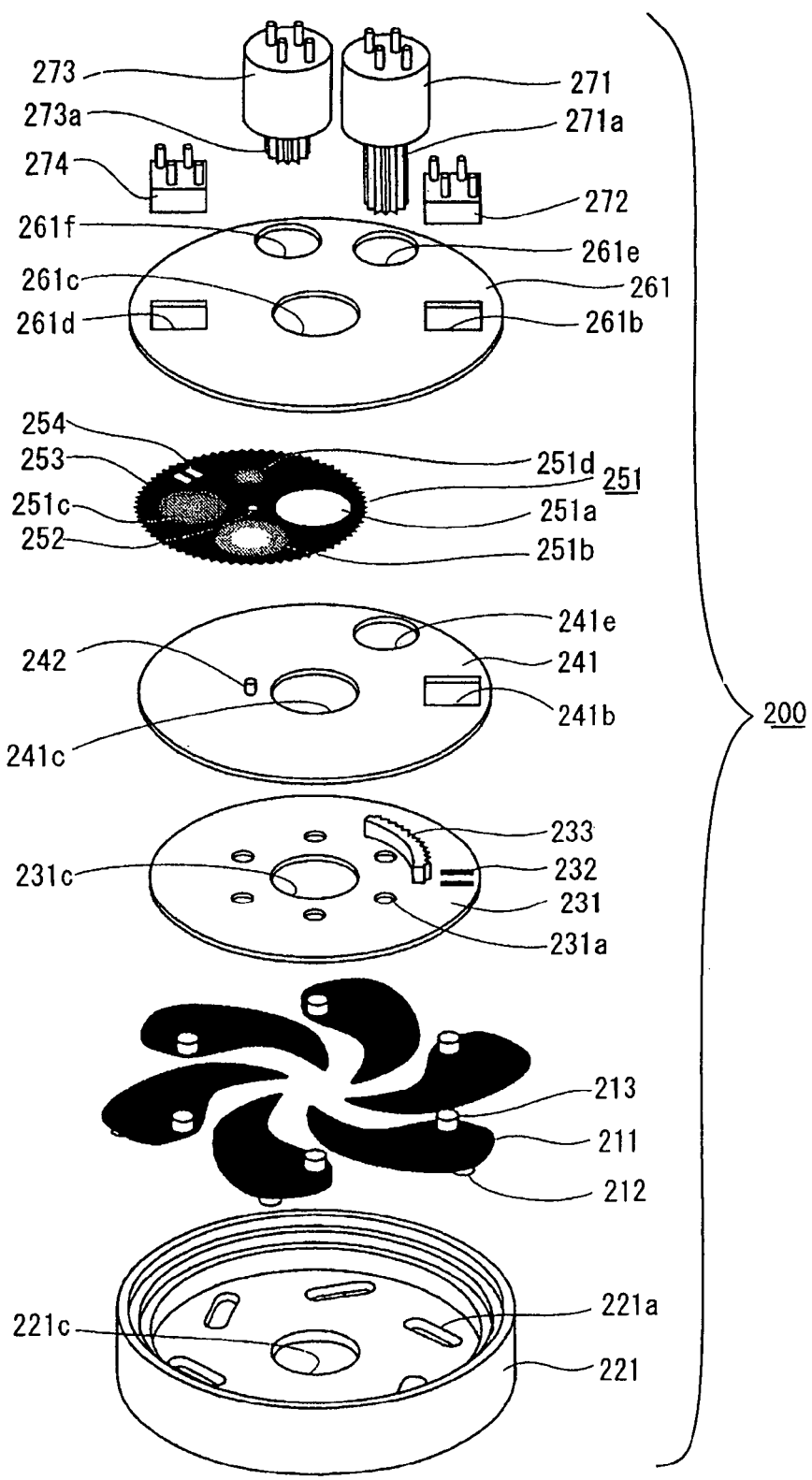
FIG. 8 is an exploded perspective view of a light amount adjusting apparatus according to Embodiment 2 of the present invention.

FIG. 8 is an exploded perspective view illustrating a structure of a light amount adjusting apparatus 200 according to Embodiment 2 of the present invention, and corresponds to FIG. 1 in Embodiment 1.

In FIG. 8, reference numeral 211 denotes diaphragm blades having a property of blocking light across their entire region. Driven pins 212 and 213 are arranged upright on a lower and an upper surface of the diaphragm blades 211. Six diaphragm blades 211 of the same shape are used, forming a diaphragm aperture. Reference numeral 221 denotes a bottom plate holding the diaphragm blades 211, which is provided, in the middle of a planar bottom surface, with an aperture 221c limiting the-maximum diameter of the light flux when the diaphragm blades are spread open. Six cam grooves 221a are provided around this aperture 221c. The pins 212 of the diaphragm blades 211 engage these cam grooves 221a and can be moved through them in a sliding manner.

Reference numeral 231 denotes a driving member also referred to as "windmill wheel," which is provided with six holes 231a for driving the diaphragm blades arranged at equal intervals around an aperture 231c in the center. The pins 213 of the diaphragm blades 211 engage these holes 231a in a rotatable manner. Accordingly, when the windmill wheel 231 is turned in counterclockwise direction, the diaphragm aperture diameter is continually diminished in the same manner as in Embodiment 1, performing a constricting action. A mark 232 for detecting the initial position of the windmill wheel 231 as well as a driven gear 233 are provided on an upper surface of the windmill wheel 231.

Reference numeral 241 denotes a partition plate. A predetermined space is formed between the partition plate 241 and the bottom plate 221, and the diaphragm blades 211 and the windmill wheel 231 are accommodated in this space. An aperture 241c for transmitting light flux is provided in the middle of the partition plate 241. A rotation support shaft 242 of the apodization filter (explained below) is arranged upright next to the aperture 241c. The partition plate 241 is further provided with a phase detection window 241b for detecting the presence of the mark 232 on the windmill wheel 231 as well as an escape hole 241e of a later-described pinion gear.

Reference numeral 251 denotes a disk-shaped apodization filter made by forming later-described apodization patterns by inkjet printing on an about 0.1 mm thick transparent resin film, such as a PET (polyethylene terephthalate) film, in the same manner as in Embodiment 1. The apodization filter 251 is provided in its middle with a bearing 252, and is rotatably supported by the rotation support shaft 242 of the partition plate. A gear 253 made of a metal plate is adhered to an outer circumferential portion of the apodization filter 251. It should be noted that it is also possible to form the outer circumferential portion of the transparent film serving as the substrate for the apodization filter into gear shape. Moreover, a mark 254 for detecting the initial position of the rotation direction of the filter is provided on the upper surface of the apodization filter 251.

In Embodiment 2, a light attenuation pattern of the apodization filter 251 is constituted by the following four regions. Reference numeral 251a denotes a transparent filter region in which a circular hole is provided in the effective region. Reference numeral 251b denotes a linear filter region with the same transmission distribution as the effective filter portion 151a in Embodiment 1. Reference numeral 251c denotes a filter region with a Gauss-shaped transmission rate distribution as explained as a conventional example in Embodiment 1. Reference numeral 251d denotes an ND filter also serving as an apodization filter, with a predetermined optical absorption capability in its center and with a linear transmission rate distribution. This is explained more specifically later with reference to FIG. 10.

Reference numeral 261 denotes a cover plate. A predetermined space is formed between this cover plate 261 and the partition plate 241, and the filter 251 is accommodated in this space. An aperture 261c for transmitting light flux is provided in the middle of the cover plate 261. The cover plate 261 is further provided with detection windows 261b and 261d for detecting the presence of the mark 232 on the windmill wheel 231 and the mark 254 on the filter, as well as escape holes 261e and 261f of later-described pinion gears.

Reference numeral 271 denotes a stepper motor for driving the windmill wheel 231. A pinion gear 271a of the stepper motor 271 passes through the escape holes 261e and 241e, and meshes with the gear 233 provided on the windmill wheel 231. Reference numeral 272 denotes an optical position detection unit incorporating a light projector element and a photodetector element, and detecting light that has been reflected from the upper surface of the windmill wheel 231. The optical position detection unit 272 is configured such that when the mark 232 is arranged in opposition directly below the position detection unit 272, then a predetermined signal is output, so that it can be detected whether a phase angle of the windmill wheel 231 has returned to the initial state.

With this structure, the stepper motor 271 is driven to return the windmill wheel 231 to its initial position and the diaphragm aperture is returned to the open state, while observing the output of the position detection unit 272. By driving the stepper motor 271 from this position in accordance with a predetermined program, the diaphragm aperture can be controlled to a desired size. Also in this embodiment, when the diaphragm mechanism is incorporated in the later-described image-forming optical system, an F number can be adjusted from F2 on the open side to F8 on the constricted side.

Reference numeral 273 denotes a stepper motor for driving the apodization filter 251. A pinion gear 273a passes through the hole 261f and meshes with the gear 253 provided on the filter 251. Reference numeral 274 denotes an optical position detection unit incorporating a light projector element and a photodetector element, and detecting light that has been reflected from the upper surface of the filter 251. The optical position detection unit 274 is configured such that when the mark 254 is arranged in opposition directly below the position detection unit 274, then a predetermined signal is output, so that it can be detected whether a phase angle of the filter 251 has returned to the initial state.

With this structure, the stepper motor 273 is driven to return the apodization filter 251 to its initial state, that is, to a state in which the transparent portion 251a covers the aperture 241c, while observing the output of the position detection unit 274. Moreover, by driving the stepper motor 273 from this position in accordance with a predetermined program, it is possible to advance a desired pattern into the light flux transmitting aperture 241c, and to alter an effect for improving blurred images.

Moreover, since a plurality of driving control units, that is, the two stepper motors 271 and 273 are arranged next to one another in the ring-shaped space enclosing the apertures 221c and 241c, it is possible to keep a size to approximately the same size as that of the light amount adjusting apparatus in Embodiment 1.

Figure 9:
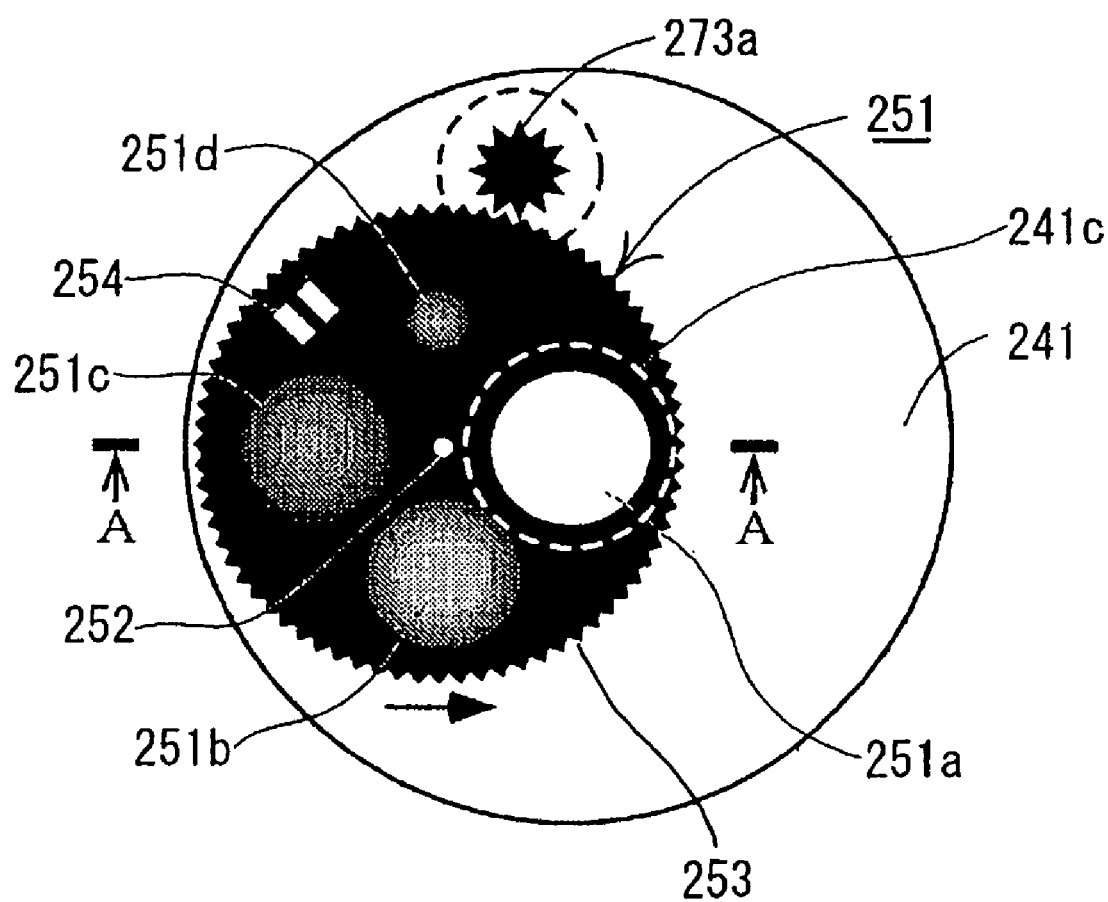
FIG. 9 shows a top view of an apodization filter in Embodiment 2.

FIG. 9 is a plan view illustrating in more detail a structure of the apodization filter 251, and corresponds to FIG. 2 in Embodiment 1.

Reference numeral 273a denotes a pinion gear of the stepper motor 273 for driving the filter. This pinion gear 273a meshes with the gear 253 provided at the circumference of the filter. Consequently, when the pinion gear 273a is driven in clockwise direction, the apodization filter 251 is rotated in counterclockwise direction, and the effective portions 251a to 251d are successively inserted into an optical path of the light flux transmitted through the light flux transmitting aperture 241c.

Figure 10:
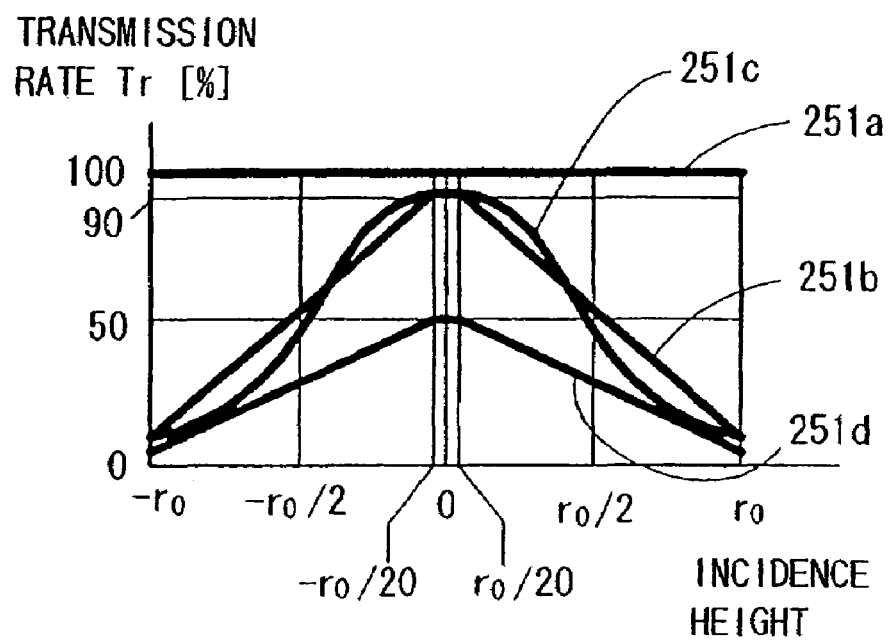
FIG. 10(A) shows a transmission rate distribution of an apodization filter in Embodiment 2.
FIG. 10(B) shows an optical density distribution of an apodization filter in Embodiment 2.
Figure 10:
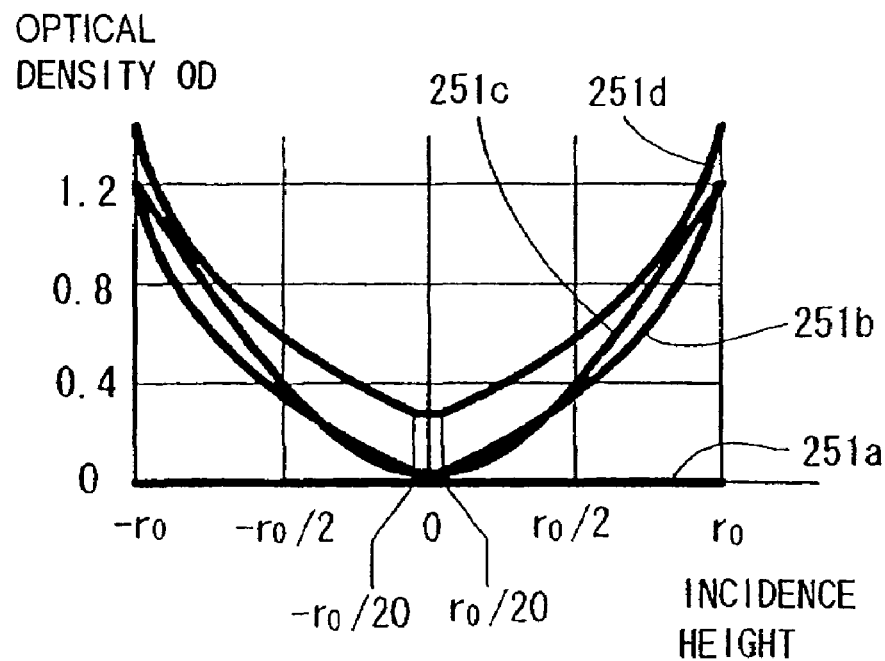

FIG. 10 shows graphs illustrating a pattern characteristics of the filter portions 251a to 251d of the apodization filter 251 according to Embodiment 2. FIG. 10(A) shows a transmission rate distribution and corresponds to FIG. 3(A) in Embodiment 1. FIG. 10(B) shows an optical density (OD) and similarly corresponds to FIG. 3(B) in Embodiment 1. The reference numerals 251a to 251d in FIG. 10 indicate a transmission rate Tr and an optical density of the filter portions 251a to 251d in FIG. 8 In Embodiment 2, the transmission rate distributions of the four filter portions have the following characteristics, so that by selecting the appropriate filter in accordance with the image-taking conditions, it is possible to attain a picture that is suitable for the image-taking intentions of the camera operator. The following is an explanation of the characteristics of the effective filter portions.

The filter portion 251a is transparent, so that it is used in image-taking situations in which a smoothing of the blurred image (spots) is unnecessary and in image-taking situations in which the attenuation of the light amount by the filter is to be avoided. More specifically, it is used when the entire image region is in focus, in scenes without blurring and in dark scenes.

The filter portion 251b is an apodization filter with a linear transmission rate distribution as explained in Embodiment 1, and it is a filter portion balancing the effect of smoothing of blur and maintaining the size of the blurred images. Consequently, it is suitable for all scenes in which blurred images are to be smoothened, and more specifically for macro photography, still-picture image-taking, and snapshots using a medium zoom.

The filter portion 251c is an apodization filter with a Gauss-shaped transmission rate distribution as explained in Embodiment 1, and is a filter placing more weight on the naturalness of blurred images than on maintaining the size of blurred images, so that it is particularly suited for image-taking scenes necessitating naturally blurred images. More specifically, it is suitable for portrait image-taking using a telephoto lens for close-ups of people, and blurring of the background.

The filter portion 251d is a filter portion obtained by combining the filter portion 251b having a linear transmission rate distribution and an ND filter of predetermined optical density, and is suitable for image-taking scenes in which the effect of smoothening blur is necessary and a strong light attenuation effect is desired. That is to say, the maximal effect of the apodization filter is attained when the aperture is completely open, but when taking images with open aperture at high brightness, overexposure may occur even when the shutter speed is set to the fastest speed. In this case, it becomes necessary to use both an apodization filter and an ND filter, and by using the filter portion 251d of the present embodiment, a smoothening of blurred images and a strong attenuation of the light amount is attained with one filter, and it is possible to reduce the decrease of the image quality that is caused by use of the filter to a minimum. It should be noted that in the present embodiment, the transmission rate at the center is set to 50%, but in practice it is also possible to attain a suitable exposure by combination with a high shutter speed when the transmission rate at the center is set to 70%.

Figure 11:
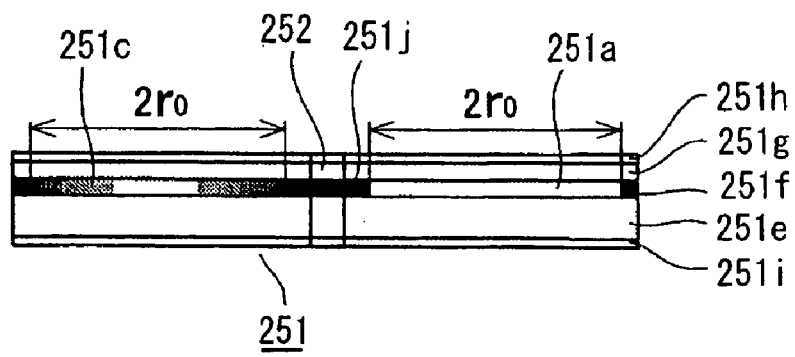
FIG. 11 is a cross-sectional view of an apodization filter in Embodiment 2.

FIG. 11 is a diagram illustrating a structure of the apodization filter 251, and is a cross-sectional view taken along A—A in FIG. 9.

Reference numeral 251e denotes a PET film serving as a transparent substrate. An ink-accepting layer 251f is applied to the upper surface of the PET film 251e. A dye-based coloring material having a low dispersion and a flat spectral transmission rate in the visible light spectrum is ejected onto the ink-accepting layer 251f by a micro-drop ejecting apparatus, namely a so-called inkjet recording apparatus, thus forming effective filter portions 251a to 251d with a diameter of 2r0. On the other hand, in regions of the ink-accepting layer outside the three effective filter portion, a light-blocking portion 251j is formed, for example, by a pigment-based coloring material having a higher optical density than the dye-based coloring material. Then, a flattening layer 251g is applied, and the irregularities in the surface of the ink-accepting layer occurring due to the printing process are flattened out. Furthermore, anti-reflective layers 251h and 251i are formed on the upper surface of the flattening layer 251g and the lower surface of the transparent substrate 251e by vapor deposition method.

With this process, a large number of apodization filters are formed on the transparent substrate 251e of large surface area, and when separating them by punching into individual filters in a final pressing step, the transparent portion 251a and the bearing hole 252 for rotational driving is also punched out at the same time, thus obtaining the filter 251.

Figure 12:
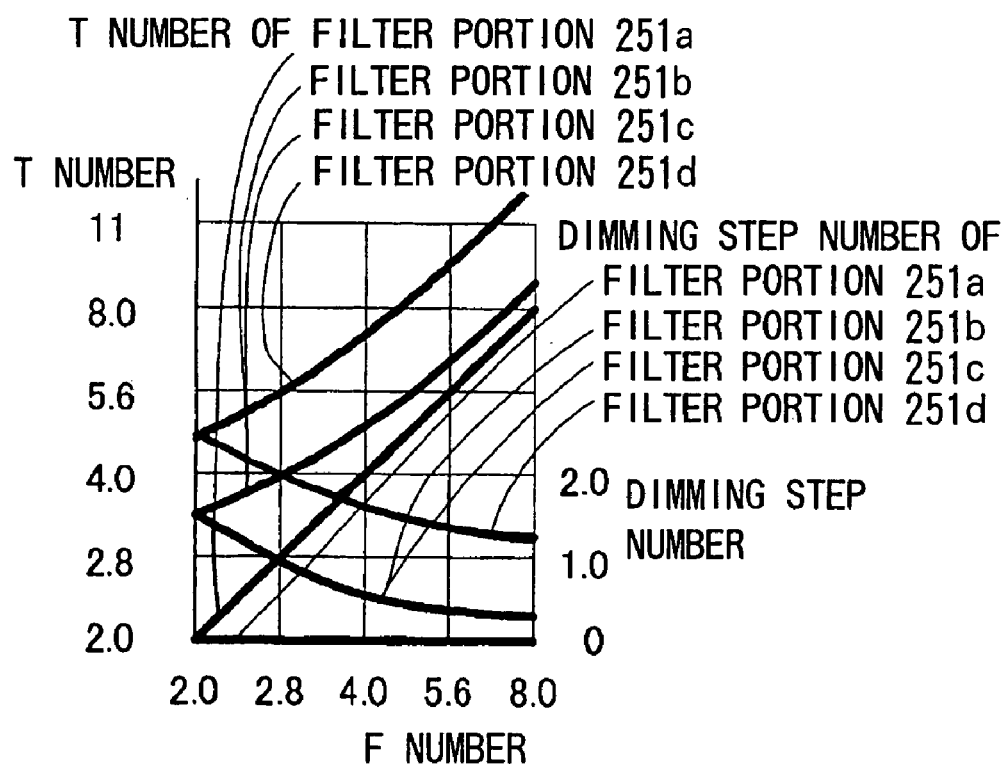
FIG. 12 is a graph illustrating a light amount adjusting action of an apodization filter in Embodiment 2.

FIG. 12 is a diagram illustrating a T number and a dimming step number for the case that an apodization filter 251 as explained with FIGS. 9 to 11 is incorporated in the light amount adjusting apparatus of FIG. 8, which is then used in an image-forming optical system. FIG. 12 corresponds to FIG. 5 in Embodiment 1.

In FIG. 12, the horizontal axis is an F number adjusted by the diaphragm mechanism incorporated in the light amount adjusting apparatus 200. An open-state F number of the image-forming optical system according to this embodiment is F2.0 as in Embodiment 1, and the diaphragm mechanism has a diaphragm adjustment function from F2.0 (open) to F8.0 (smallest aperture). The vertical axis is a T number (left scale) and a dimming step number (right scale). As can be seen in FIG. 12, the transparent portion 251a is transparent across its entire region, so that in FIG. 12 the F number matches the T number, and the dimming step number is zero. The dimming step number becomes greater for the effective filter portions 251b, 251c and 251d in that order, and accordingly the estrangement of the F number and the T number increases. However, the difference between the T numbers and the dimming step numbers of the filters 251b and 251c is miniscule, so that they appear as one curve in FIG. 12.

Figure 13:
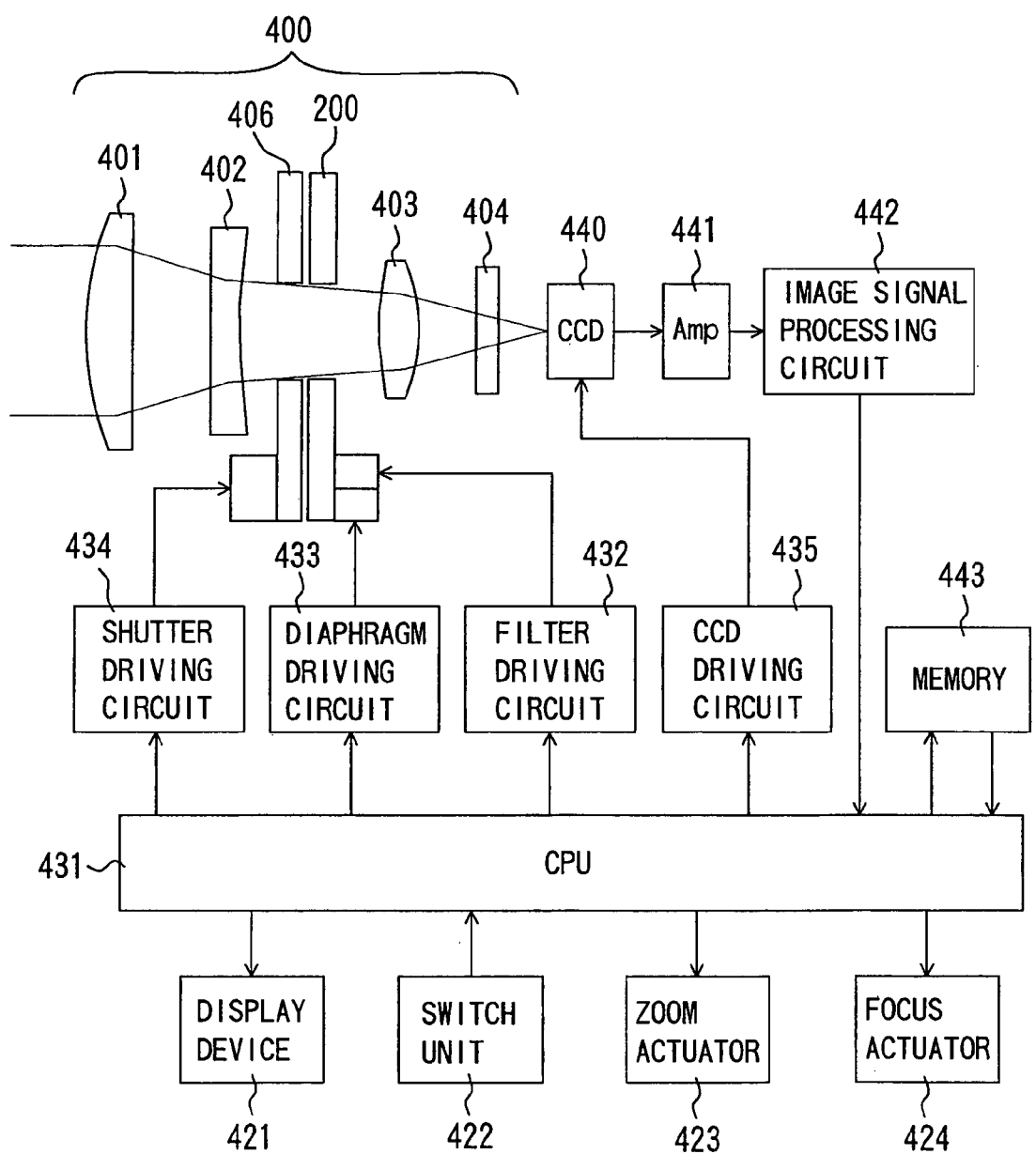
FIG. 13 is a diagram showing a structure of an image-taking apparatus according to Embodiment 2.

FIG. 13 illustrates an image-taking apparatus to which the light amount adjusting apparatus 200 shown in FIG. 8 has been mounted. This image-taking apparatus has the same structure as in Embodiment 1, so that further explanations have been omitted.

With the above-described embodiments, filters (the effective filter portion 151a and the filter portion 251b) whose light flux transmission rate decreases linearly from the center to the periphery are used in an image-taking optical system or the like, so that the function of adjusting the contours of a blurred image is suitably attained, and it becomes possible to provide and image in which the size of the blurred image is maintained.

Moreover, since the design value of the transmission rate distribution of the effective filter portion 151a and the filter portion 251b is of linear shape, there is no need to limit the tolerances for manufacturing discrepancies to overly small values, and the degree of freedom for the manufacturing method can be increased and cost reductions can be achieved due to alleviation of manufacturing specifications.

Moreover, in Embodiment 2, the filter portion 251b (in which the light flux transmission rate decreases substantially linearly from a first center to the periphery and which achieves both the function of adjusting the contours of a blurred image and the function of maintaining the size of a blurred image) and the filter portion 251c (in which the light flux transmission rate decreases substantially with a Gauss distribution from a second center to the periphery and in which the function of adjusting the contours of blurred images is given more weight) can be used selectively, so that it is possible to attain a high-quality image in accordance with the image-taking intentions.

Moreover, the effective filter portion 151a and the filter portion 251b have a predetermined optical absorption capability at their center and a light flux transmission rate that decreases substantially linearly from their center to the periphery, and their light flux transmission rate distribution is axially symmetric with respect to their center, so that also in high-bright scenes, it is possible to attain an image with suitable exposure while attaining the effect of adjusting the contours of blurred images, because image-taking with open aperture and while attaining the apodization effect is possible.

Moreover, as shown in FIGS. 6 and 13, by arranging the apodization filter (the effective filter portion 151a or the filter portion 251b) near the pupil position of an image-taking apparatus such as a digital camera, it becomes easy to take high-quality images while achieving both the effect of adjusting the contours of blurred images and the effect of maintaining the size of the blurred images.

It thus becomes possible to select whether to achieve both these effects, whether to give preference to the effect of improving blurred images, or whether to give preference to maintaining the light quantity, and it becomes possible to obtain high-quality images with a good balance between the depth of field and the improvement of blur.

Embodiment 3

FIGS. 14 to 25 illustrate Embodiment 3 of the present invention.

Figure 14:
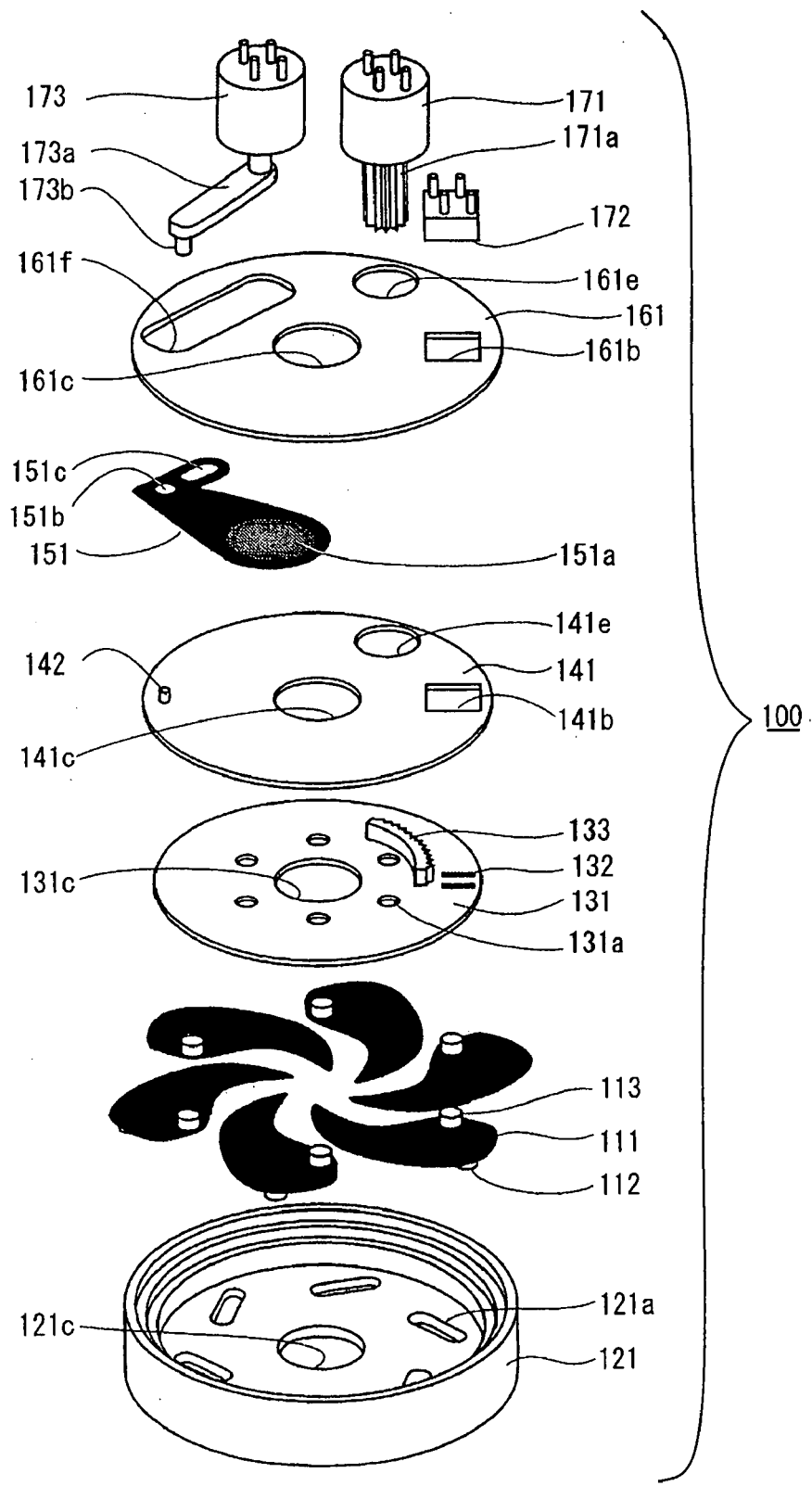
FIG. 14 is an exploded perspective view of a light amount adjusting apparatus according to Embodiment 3 of the present invention.

FIG. 14 is an exploded perspective view showing essential parts of a light amount adjusting apparatus 100 incorporating an apodization filter according to the present invention. In FIG. 14, reference numeral 111 denotes diaphragm blades having a property of blocking light across their entire region. Driven pins 112 and 113 are arranged upright on a lower and an upper surface of the diaphragm blades 111. Six diaphragm blades 111 of the same shape are used, forming a diaphragm aperture. It should be noted that a larger the number of diaphragm blades 111 is, the closer a shape of an aperture becomes to being circular when the diaphragm blades 111 are constricted, improving a naturalness of a blurred image and easing a diffraction phenomenon due to vertices of the polygonal aperture, but a larger number of blades also incurs greater manufacturing costs. Consequently, in the present diaphragm mechanism, it is preferable that a number of diaphragm blades is 5 to 9. In the present embodiment, six diaphragm blades are used, as shown in FIG. 14, striving for an optimum balance between optical performance and manufacturing costs.

Reference numeral 121 denotes a bottom plate holding the diaphragm blades 111, which is provided, in the middle of a planar bottom surface, with an aperture 121c limiting a maximum diameter of a light flux when the diaphragm blades are spread open. Six cam grooves 121a are provided around this aperture 121c. The pins 112 of the diaphragm blades 111 engage these cam grooves 121a and can be moved through them in a sliding manner. The six cam grooves 121a all have the same shape and are arranged at intervals of 60° around the aperture 121c.

Reference numeral 131 denotes a driving member also referred to as "windmill wheel," which is provided with six holes 131a for driving the diaphragm blades arranged at equal intervals around an aperture 131c in the center. The pins 113 of the diaphragm blades 111 engage these holes 131a in a rotatable manner. Accordingly, when the windmill wheel 131 is turned in counterclockwise direction, the six diaphragm blades 111 are driven by the driven pins 113 on the upper side, but at the same time the driven pins 112 on the lower side slide under the restriction of the cam grooves 121a, so that the diaphragm blades 111 are constricted from an open state to a minimum aperture value. When the windmill wheel 131 is turned back in clockwise direction, then the diaphragm blades 111 are restored from their minimum aperture value to their open state. Furthermore, a mark (an index) 132 for detecting an initial position of the windmill wheel as well as a driven gear 133 are provided on the upper surface of the windmill wheel 131.

Reference numeral 141 denotes a partition plate. A predetermined space is formed between the partition plate 141 and the bottom plate 121, and the diaphragm blades 111 and the windmill wheel 131 are accommodated in this space. An aperture 141c for transmitting light flux is provided in the middle of the partition plate 141. A rotation support shaft 142 of an apodization filter (explained below) is arranged upright next to the aperture 141c. The partition plate 141 is further provided with a phase detection window 141b for detecting the presence of the mark 132 on the windmill wheel as well as an escape hole 141e of a later-described pinion gear.

Reference numeral 151 denotes an apodization filter made by forming a later-described apodization pattern (effective filter portion) 151a by inkjet printing on an about 0.1 mm thick transparent resin film, such as a PET (polyethylene terephthalate) film, and provided on its base end with a bearing hole 151b for rotational support and a long hole 151c for driving the apodization filter. The bearing hole 151c engages with the rotation support shaft 142 on the partition plate 141, rotatively supporting the filter 151. The transmission rate distribution, that is, the optical density pattern of the effective filter portion 151a is explained further below.

Reference numeral 161 denotes a cover plate. A predetermined space is formed between the cover plate 161 and the partition plate 141, and the apodization filter 151 is accommodated in this space. An aperture 161c for transmitting light flux is provided in the middle of the cover plate 161. The cover plate 161 is further provided with a detection window 161b for detecting the presence of the mark 132 on the windmill wheel 131 as well as an escape hole 161f of a later-described driving lever.

Reference numeral 171 denotes a stepper motor for driving the windmill wheel 131. A pinion gear 171a of the stepper motor 171 passes through the holes 161e and 141e, and a front end portion (lower portion) of the gear 171a meshes with the gear 133 provided on the windmill wheel 131. Reference numeral 172 denotes an optical position detection unit incorporating a light projector element and a photodetector element and detecting light that has been reflected from the upper surface of the windmill wheel 131. The optical position detection unit 172 is configured such that when the mark 132 is arranged in opposition directly below the position detection unit 172, then a predetermined signal is output, so that it can be detected whether the phase angle of the windmill wheel 131 has returned to the initial state.

With this structure, the stepper motor 171 is driven to return the windmill wheel 131 to its initial state while observing the output of the position detection unit 172, and the diaphragm aperture is returned to the open state. By driving the stepper motor 171 from this position in accordance with a predetermined program, the diaphragm aperture can be controlled to a desired size.

Reference numeral 173 denotes a rotative actuator for driving the apodization filter 151, which is a bistable actuator, which can stop stably at both ends of a rotatable range when no current is sent through it. A driving lever 173a is fixed to the tip of an output shaft of the actuator 173, and a driving shaft 173b is arranged vertically on the lower surface at the front end of this driving lever 173a. The driving shaft 173b engages the long hole 151c for driving the apodization filter 151. With this structure, by controlling the direction of the current flowing through the actuator 173, the rotation of the driving lever 173a is controlled, and the effective filter portion 151a of the apodization filter 151 can be advanced into or retracted from an optical path of the light flux transmitted through the aperture hole 141c.

It should be noted that by arranging the actuator 173 and the stepper motor 171 next to one another in a ring-shaped space (in a plane that is perpendicular to the optical axis), an usage efficiency of the space can be improved and an overall apparatus can be made compact.

On the other side, a shutter mechanism as known in the art is arranged below the light amount adjusting apparatus 100. In FIG. 14, a downward direction is an object side, and an upward direction is an image-forming plane side. That is to say, the image-taking light flux is transmitted through the shutter mechanism, the diaphragm mechanism, and the apodization filter in that order. In the optical apparatus to which this light amount adjusting apparatus is mounted, when not image-taking, the shutter mechanism is in a light flux blocking state, that is, the shutter blades are in a closed position, and the diaphragm mechanism is kept in a minimum aperture state. In this situation, the apodization filter 151 is placed in the dark, so that a deterioration of its filter pigments due to harmful light, such as UV light, can be avoided.

Furthermore, the diaphragm blades and the apodization filter 151 are layered in a direction of the optical axis, and are overall configured as one unit. The stepper motor 171 for driving the diaphragm blades and the filter for driving actuator 173 are arranged next to one another in this unit, so that the apodization filter 151 and the mechanism for driving it can be incorporated in a space that is substantially the same as in a conventional diaphragm mechanism, which contributes to the compactness of the overall apparatus.

The present embodiment is configured such that when the diaphragm mechanism is incorporated in a later-described image-forming optical system, the F number can be adjusted from F2 for the open state to F8 for the smallest aperture.

Figure 15:
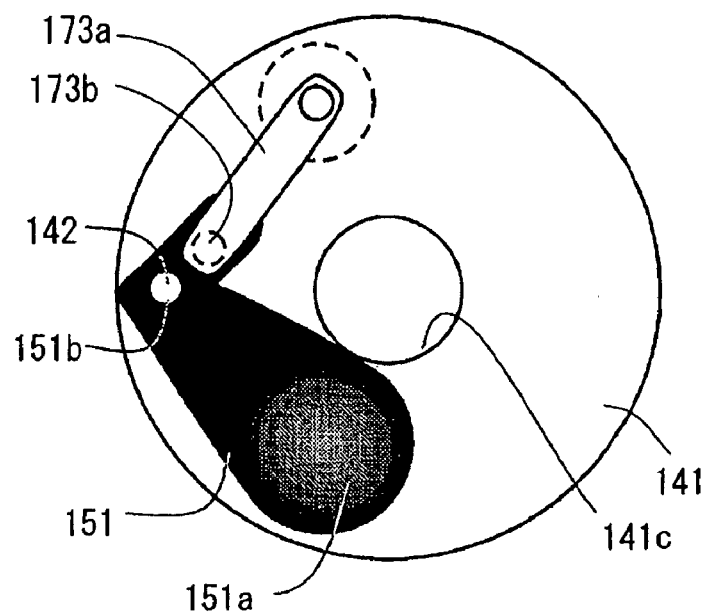
FIGS. 15(A) and 15(B) are top views of the apodization filter in Embodiment 3.
Figure 15:
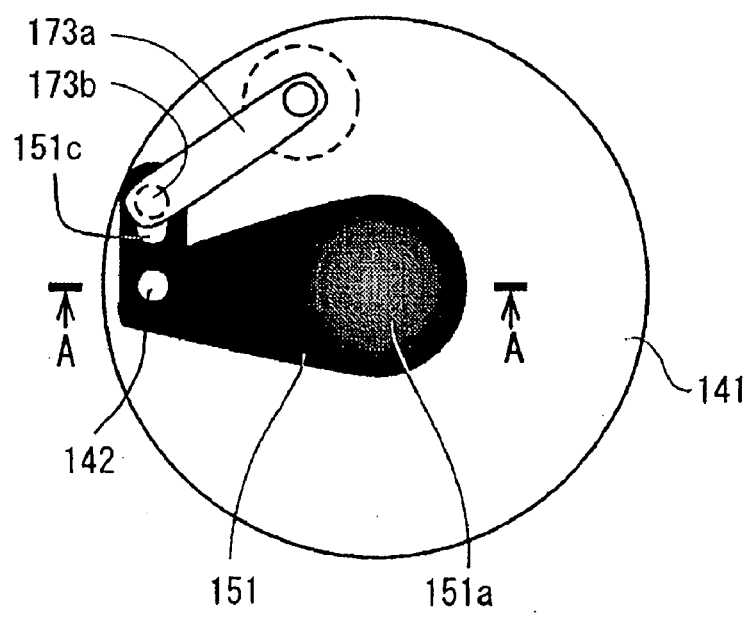

FIG. 15 is a top view illustrating the advancing/retracting operation of the apodization filter 151. FIG. 15(A) shows a state when the filter is retracted from the light flux transmitting aperture. In FIG. 15(A), reference numeral 141 denotes the partition plate explained in FIG. 14. The light flux transmitting aperture 141c is arranged in the middle, and the rotation support shaft 142 of the apodization filter is arranged upright at the edge portion of the partition plate 141.

Reference numeral 151 denotes the apodization filter, which is provided with the bearing hole 151b for rotational support, rotatably engaging the support shaft 142. Reference numeral 173a denotes the driving lever, which is fixed to the output shaft of the actuator 173 (not shown in FIG. 15). The driving shaft 173b on the lower side at the tip of the driving lever 173a engages the driven long hole 151c provided in the apodization filter 151. In FIG. 15(A), the driving lever 173a is turned in counterclockwise direction, so that the apodization filter 151 is turned in clockwise direction, and the effective filter portion 151a is retracted away from the light flux transmitting aperture 141c.

Next, when a current of a predetermined direction is sent through the actuator 173, the driving lever 173a turns in clockwise direction. Thus, the apodization filter 151 turns in counterclockwise direction and is advanced such that the effective filter portion 151a covers the light flux transmitting aperture 141c, resulting in the state shown in FIG. 15(B). And when the current sent through the actuator 173 is inverted, also the apodization filter 151 is inverted, and returns to the state shown in FIG. 15(A). By using the bistable actuator 173, the apodization filter 151 can be kept stably in both the states shown in FIG. 15(A) and FIG. 15(B) when the current is stopped.

The following is an explanation of the optical characteristics of the apodization filter 151.

The optical absorption capability of the apodization filter 151 differs depending on a position on its effective region, but the spectral transmission rate in a visible light spectrum is substantially uniform at any position within the effective region. Ordinarily, an optical density or a transmission rate is used as an index for expressing the optical characteristics of such a filter. An optical density (OD) and a transmission rate Tr (%) are related by the following equation:

$$Tr = 100 \times 10^{(-OD)} \quad \text{(Eq. 1)}$$

$$OD = -\log_{10}(Tr/100) \quad \text{(Eq. 2)}$$

Figure 16:
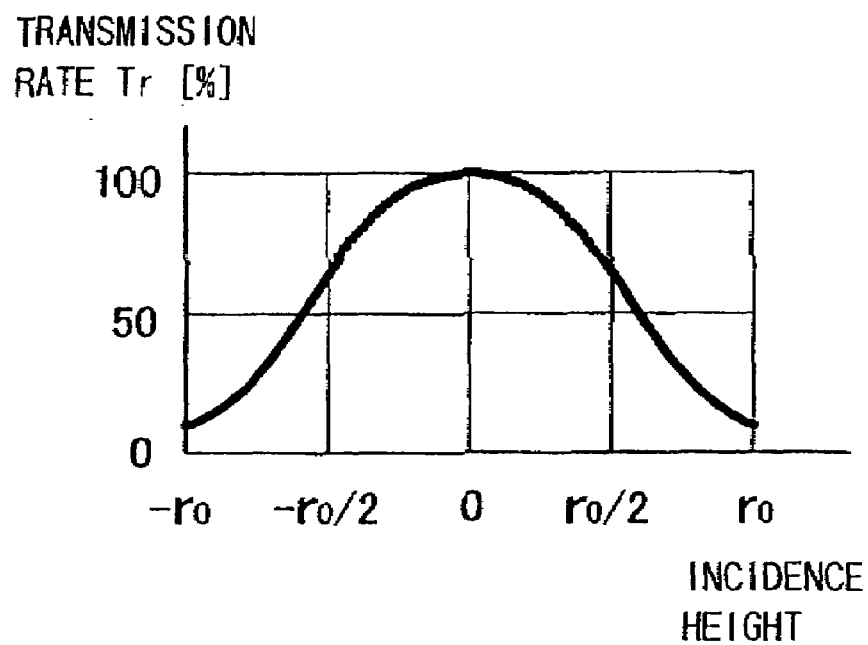
FIG. 16(A) shows a transmission rate distribution of an apodization filter in Embodiment 3.
FIG. 16(B) shows an optical density distribution of an apodization filter in Embodiment 3.
Figure 16:
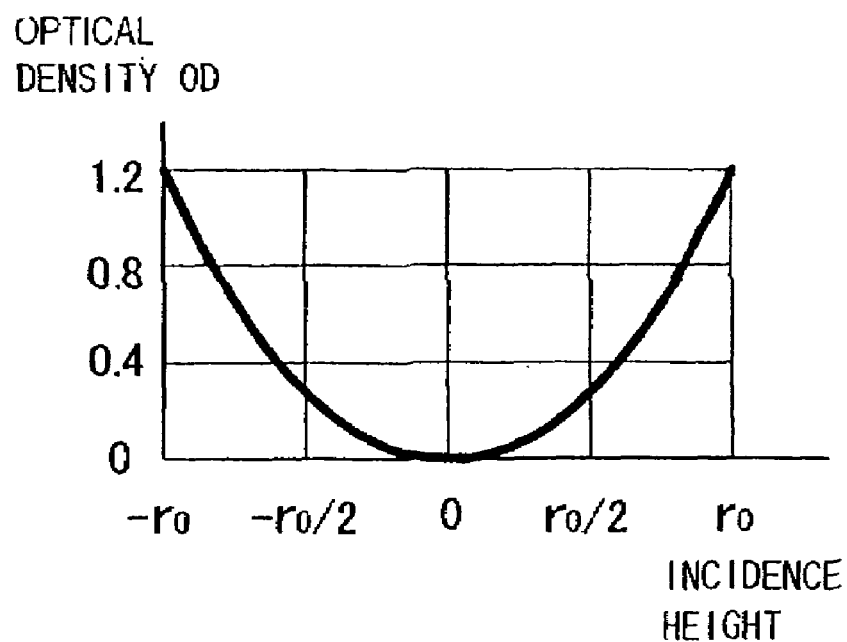

FIG. 16 shows graphs illustrating the pattern characteristics of the effective filter portion 151a of the apodization filter 151. FIG. 16(A) shows a transmission rate distribution. The horizontal axis in FIG. 16(A) is a light ray incidence height on the filter, that is, the distance from the center of the filter, with r0 being an effective radius of the filter. The vertical axis in FIG. 16(A) is a transmission rate Tr (%). FIG. 16(B) shows an optical density (OD). The horizontal axis in FIG. 16(B) similarly is an incidence height, and the vertical axis is an optical density.

In the present embodiment, the transmission rate Tr(r) at a given incidence height r shown in FIG. 16(A) is set to satisfy the following Equation 3a:

$$Tr(r) = 100 \times \exp(\alpha \times r \times r) \quad \text{(Eq. 3a)}$$

Here, α represents a predetermined negative factor, and Eq. 3a is the equation for a Gauss distribution. The optical density distribution calculated by substituting Eq. 3a in Eq. 2 is as given in FIG. 16(B).

Figure 17:
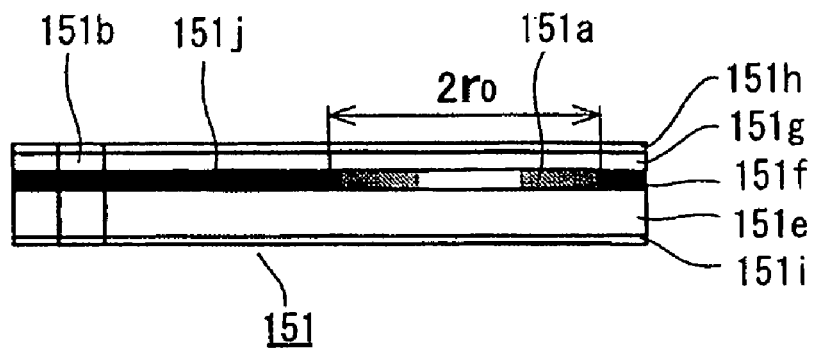
FIG. 17 is a cross-sectional view of an apodization filter in Embodiment 3.

FIG. 17 is a diagram illustrating the fabrication and the structure of a thin, light-weight and inexpensive apodization filter 151 with a high degree of design freedom, and is a cross-sectional view taken along A—A in FIG. 15(B). Reference numeral 151e denotes a PET film serving as a transparent substrate. An ink-accepting layer 151f is applied to the upper surface of the PET film 151e. A dye-based coloring material having a low dispersion and a flat spectral transmission rate in the visible light spectrum is ejected onto the ink-accepting layer 151f by a micro-drop ejecting apparatus, namely a so-called inkjet recording apparatus, thus forming an effective filter portion 151a with a diameter of 2r0. On the other hand, in regions of the ink-accepting layer outside the effective filter portion 151a, a light-blocking portion 151j is formed, for example, by a pigment-based coloring material having a higher optical density than the dye-based coloring material. Then, a flattening layer 151g is applied, and the irregularities in the surface of the ink-accepting layer occurring due to the printing process are flattened out. Furthermore, anti-reflective layers 151h and 151i are formed on the upper surface of the flattening layer 151g and the lower surface of the transparent substrate 151e by vapor deposition method.

With this process, a large number of apodization filters are formed on the transparent substrate 151e of large surface area, and when separating them by punching into individual filters in a final pressing step, the bearing hole 151b for rotational driving is also punched out at the same time, thus obtaining the filter 151. It should be noted that details regarding the materials for the various layers, the application process and the drying process are described in Japanese Patent Application No. 2002-041634 by the applicant of the present application. For the process of manufacturing the apodization filter according to the present invention, the above-described process is preferable, but there is no limitation to this. For example, it is also possible to fabricate by inkjet printing process only the portion of the filter through which the light flux is transmitted, then separate this portion by punching, and attach it to a holding lever made of a metal thin sheet. Moreover, it is also possible to continually change the film thickness of an optically absorbing thin film of titanium oxide or the like by using a vacuum deposition apparatus.

The following is an explanation of a light amount adjusting function for the case that the light amount adjusting apparatus of FIG. 14 is applied to an image-taking apparatus.

Ordinarily, the following APEX equation is used as a equation for determining an adequate exposure with a still camera:

$$AV+TV=BV+SV=EV \quad \text{(Eq. 4)}$$

In Eq. 4, AV represents an aperture value, TV represents a time value, BV represents a luminance value, SV represents the film speed value, and EV represents an exposure value.

The above-described apodization filter has the function to attenuate the light flux in the visible light spectrum, so that it can be regarded as one type of ND filter (neutral optical density filter). If both the diaphragm mechanism and the ND filter are used to adjust the light amount, then it is necessary to consider not only the F number, which indicates the diaphragm aperture, but also the T number, which takes into account a decrease of the transmission rate due to the ND filter. Here, the dimming step number, the T number and the AV value due to using the ND filter can be expressed by the following equations:

$$\text{dimming step number} = -\text{Log}_2(Tr/100) \quad \text{(Eq. 5)}$$
$$= -3.32 \times \text{Log}_{10}(Tr/100)$$
$$= 3.32 \times OD$$

$$T \text{ number} = F \text{ number}/(Tr/100)^{0.5} \quad \text{(Eq. 6)}$$

$$AV \text{ value (corresponding to } T \text{ number)} = AV \text{ value} \quad \text{(Eq. 7)}$$
$$\text{(corresponding to } F \text{ number)} -$$
$$\text{Log}_2(Tr/100) =$$
$$AV \text{ value (corresponding to } F \text{ number)} +$$
$$\text{dimming step number}$$

Herein, the transmission rate and the OD value of Eq. 1 and Eq. 2 are the values for a predetermined location on the filter, whereas for the transmission rate and the OD value in Eq. 5 to Eq. 7, the averages values across the entire region within the light flux transmitting aperture as formed by the diaphragm blades are used.

Figure 18:
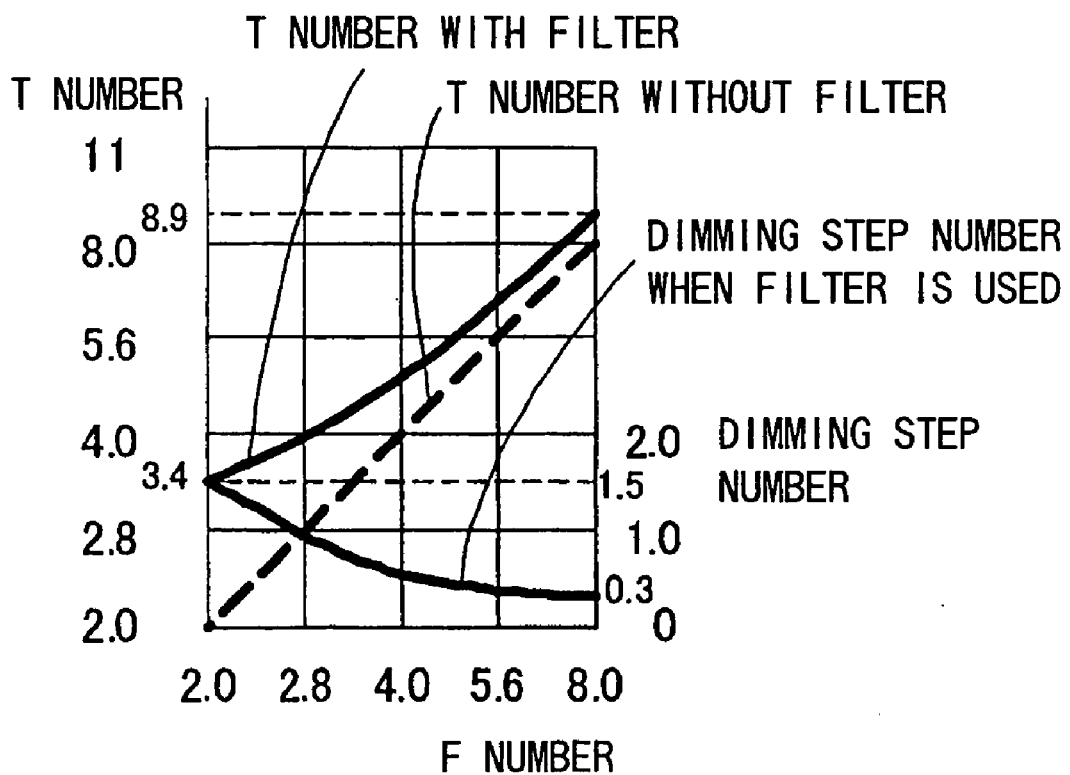
FIG. 18 is a graph illustrating a light amount adjusting action of an apodization filter in Embodiment 3.

FIG. 18 is a diagram illustrating the T number and the dimming step number for the case that an apodization filter having the characteristics shown in FIG. 16 is incorporated in the light amount adjusting apparatus of FIG. 14, which is then used in an image-forming optical system. In this diagram, the horizontal axis is the F number adjusted by the diaphragm mechanism incorporated in the light amount adjusting apparatus 100. An open-state F number of the image-forming optical system according to this embodiment is F2.0 as explained below, and the diaphragm mechanism has a diaphragm adjustment function from F2.0 (open) to F8.0 (smallest aperture). The vertical axis is the T number (left scale) and the dimming step number (right scale). In FIG. 18, if the apodization filter is retracted from the light flux transmitting aperture, then the F number and the T number coincide, as indicated by the broken line. On the other hand, if the apodization filter has been advanced into the light flux transmitted through the aperture, then the T number and the dimming step number become as indicated by the solid lines. That is to say, the effect of the apodization filter becomes maximal when the aperture is open, but in this case also the light loss becomes maximal, and with a dimming step number of about 1.5 steps, and a T number of about 3.4. Then, as the F number is increased by constriction with the diaphragm mechanism, the dimming step number decreases and the T number approaches the F number, but the effect of the apodization filter is diminished. At the smallest aperture F8, the dimming step number becomes 0.3 steps and the T number becomes 8.9.

Figure 19:
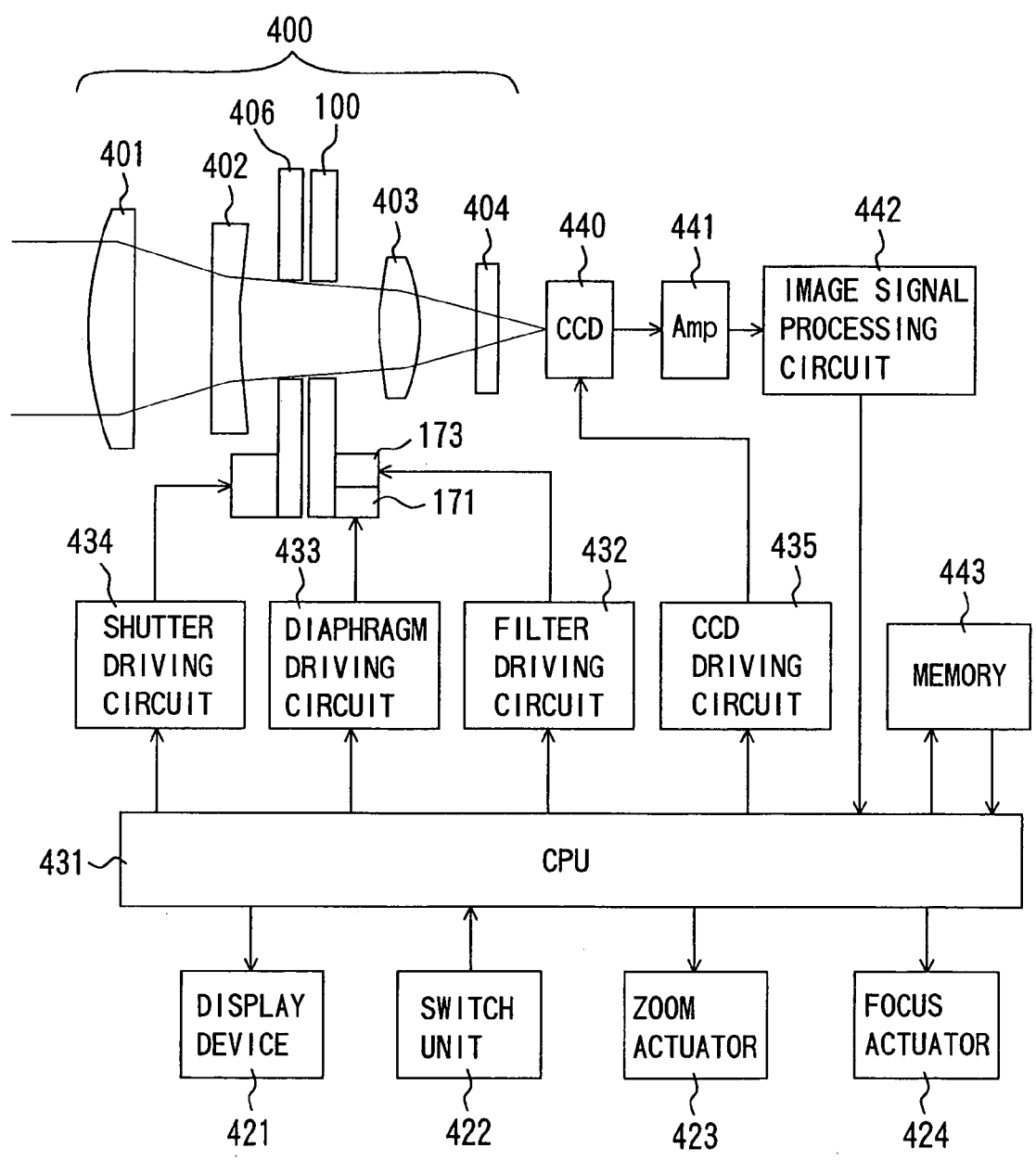
FIG. 19 is a diagram showing a structure of an image-taking apparatus according to Embodiment 3.

FIG. 19 shows an image-taking apparatus to which the light amount adjusting apparatus 100 shown in FIGS. 14 to 18 has been mounted. In the present embodiment, a digital camera is taken as an example of the image-taking apparatus, which photoelectrically converts an optical image with an image-pickup device into electrical signals, and records still images or moving images as digital data.

Reference numeral 400 denotes an image-forming optical system made of a plurality of lens unit, including a front lens unit 401, a variator lens unit 402, a focus lens unit 403, and an optical low-pass filter 404. The optical specifications of the image-forming optical system according to the present embodiment are a focal length of 35–200 mm in terms of a camera using a 35 mm film, and an open F number of 2.0. Reference numeral 100 denotes the light amount adjusting apparatus shown in FIG. 14, reference numeral 406 denotes a shutter mechanism as known in the art, which regulates an exposure time by driving a plurality of shutter blades.

Moreover, an image-pickup device 440 is arranged at a focus position (expected image surface) of the image-forming optical system 400. For this, a photoelectrical conversion system, such as a two-dimensional CCD is used, which is made of a plurality of photoelectrical conversion sections converting irradiated optical energy into electric charges, a charge accumulation section accumulating these charges, and a charge transfer section transferring these charges to the outside. In the present embodiment, a CCD sensor with 3 million pixels is used.

An image of an object that is formed on the image-pickup device 440 is converted into an electrical signal with a charge amount at each pixel that corresponds to the brightness of the image at that pixel. After the electrical signal has been amplified by an amplification circuit 441, it is subjected to a γ-correction process or the like with an image signal processing circuit 442. This process may also be performed as a digital signal process after A/D conversion. The thusly produced image signal is stored in a memory 443. The memory 443 may be a semiconductor memory such as a flash ROM, an optical memory such as an optomagnetic disk, or a magnetic memory such as a magnetic tape or the like.

Reference numeral 421 denotes a display device, such as a liquid crystal display, which displays the object that has been picked up with the image-pickup device 440 and the operating condition of the optical apparatus. Reference numeral 422 denotes a control operation switch unit made of a zoom switch, an image-taking preparation switch, an image-taking start switch, an image-taking mode selection switch for selecting either a still-image mode or a moving-image mode, and an image-taking condition switch for setting an exposure control mode or an AF mode. Reference numeral 423 denotes a zoom actuator, which drives the zoom lens unit 402 and changes the focus length of the image-forming optical system 400. Reference numeral 424 denotes a focus actuator, which drives the focus lens unit 403 and adjusts the focus condition of the image-forming optical system 400.

Reference numeral 431 denotes a CPU, which controls an operation of the overall image-taking apparatus. Reference numeral 432 denotes a filter driving circuit, which drives the advancing and retracting of the apodization filter 151 into and out of the light flux transmitted through the aperture by controlling the current flowing through the actuator 173 shown in FIG. 14. Reference numeral 433 denotes a diaphragm driving circuit, which drives the stepper motor 171 while monitoring the output of the optical position detection unit 172 shown in FIG. 14. Thus, the diaphragm driving circuit 433 adjusts a rotation angle of the windmill wheel 131 and controls an F number to a predetermined value. Reference numeral 434 denotes a shutter driving circuit, which drives the shutter mechanism 406 and controls the exposure time for the image-pickup device 440.

FIG. 19 shows an embodiment in which the image-forming optical system and the image-pickup system including for example an image-pickup device are formed in an integrated manner, but it is also possible to make the image-forming optical system incorporating the light amount adjusting apparatus freely mountable/removable with respect to the image-pickup system. That is to say, a structure as that of a single-lens reflex camera in which an optical device including the image-forming optical system and an image-pickup apparatus including the image-pickup system can be separated from one another is also possible.

FIGS. 20 to 24 illustrate an exposure control method for the image-taking apparatus shown in FIG. 19. First, the image-taking modes with which this image-taking apparatus is provided are explained with reference to FIG. 20.

In still-cameras and video-cameras, a plurality of image-taking modes are available, and ordinarily, the camera operator can select a desired image-taking mode with a control switch. When the desired image-taking mode is selected, the exposure control mode, AF mode, driving mode (continuous shooting/single shot) and photographic sensitivity distribution and the like that are most suitable for the image-taking mode are set automatically. Accordingly, in this embodiment, the apodization filter is driven in accordance with the selected image-taking mode.

FIG. 20 is a table illustrating the exposure-control modes with which the image-taking apparatus of the above-described structure is provided. The names of the image-taking modes are listed on the left side, whereas the exposure control, AF control and apodization filter control modes for the respective image-taking modes are listed in the middle and on the right side.

The camera operator first selects the still-picture mode and the moving-picture mode using the still-picture/moving-picture selection switch, which is one of the control switches in the control switch unit 422 of the image-taking apparatus in FIG. 19. Subsequently, the desired image-taking mode is selected from (1) to (16) using the image-taking mode selection switch. Thus, the image-taking apparatus selects and executes the "exposure control mode," the "AF mode" and the "filter control mode" listed in the middle and right columns in FIG. 20, in order to attain the photographic effects in accordance with the photo-shooting circumstances of those modes. In this example, not much weight is given to the photographic effect of the blurred background in the image-taking modes (1) to (3) for still-picture image-taking, so that the apodization filter is ordinarily retracted, but the apodization filter is used as an ND filter if an object is too bright and using only the diaphragm mechanism would result in overexposure. That is to say, in the image-taking modes (1) to (3), it depends on the object brightness whether the apodization filter is used or not, which means that the apodization filter is advanced and retracted automatically.

On the other hand, the image-taking modes (4) and (5) are modes in which the photographic effect of a blurred background is given much weight, so that the apodization filter is automatically inserted. Thus, the camera operator is relieved of the effort of having to manually insert the filter, and it can be avoided that the camera operator forgets to insert the filter or misses a good photo opportunity due to being distracted while having to insert the filter.

In the image-taking modes (6) to (9), the degree of freedom for exposure adjustment and photographic effect is raised, so that the camera operator can select freely whether or not to use the apodization filter.

When taking moving pictures, the various modes can be set so as to attain the same photographic effects as for still-picture image-taking, and whether the apodization filter is used or not may be controlled in the same manner as during still-picture image-taking.

FIGS. 21 to 24 are flowcharts and exposure control charts for the control of the image-taking apparatus according to the present embodiment.

First, a main control flow during image-taking is explained with reference to FIG. 21.

After Step S101, at Step S102, it is discriminated whether the main switch has been turned on by the camera operator, and if it has not been turned on, the procedure remains at Step S102. If it is determined at Step S102 that the main switch has been turned on, then the CPU 431 is awakened from the sleep mode, and the Steps S103 and onward are executed.

At Step S103, the image-taking apparatus is initialized. More specifically, after the image-forming optical system has been reeled out from the collapsed state to the image-taking enabled state, the apodization filter and the windmill wheel for driving the diaphragm blades in the light amount adjusting apparatus 100 are reset to their initial positions. At Step S104, a selection of an image-taking mode determining whether still-picture image-taking or moving-picture image-taking is carried out is received. At Step S105, a selection of the image-taking modes corresponding to (1) to (16) in FIG. 20 is received. At Step S106, detailed settings of the various image-taking conditions, such as single shot/continuous shooting mode, white balance mode, picture size for still-picture image-taking etc. are received. Moreover, if the control mode of the apodization filter (in the following also referred to simply as "filter") is the manual selection mode, then the settings for usage of the filter are also received.

At Step S107, a discrimination of the filter control modes set at Step S104 and Step S106 is performed. If the filter control mode is the automatic selection mode (A), then the procedure jumps to Step S110 without inserting the filter. On the other hand, if the filter control mode is the forced insertion mode (B), then the procedure jumps to Step S109 and the filter is inserted. And if the filter control mode is the manual selection mode (C), then the procedure advances to Step S108, and discriminates the selection state of filter usage by the camera operator. If the filter settings are off due to an operation of the filter selection switch (first switch) which is one of the switches of the switch unit 422, that is, if "filter not used" has been set, then the procedure jumps to Step S110, and the filter is not inserted. On the other hand, if the filter is on, that is, if "insert filter" has been set, then the filter is inserted at Step S109.

At Step S110, the moving-picture/still-picture mode set at Step S104 is discriminated. In case of the moving-picture image-taking mode, the procedure advances to the moving-picture image-taking subroutine of Step S111, whereas in case of the still-picture image-taking mode, the procedure advances to the still-picture image-taking subroutine of Step S131.

Figure 21:
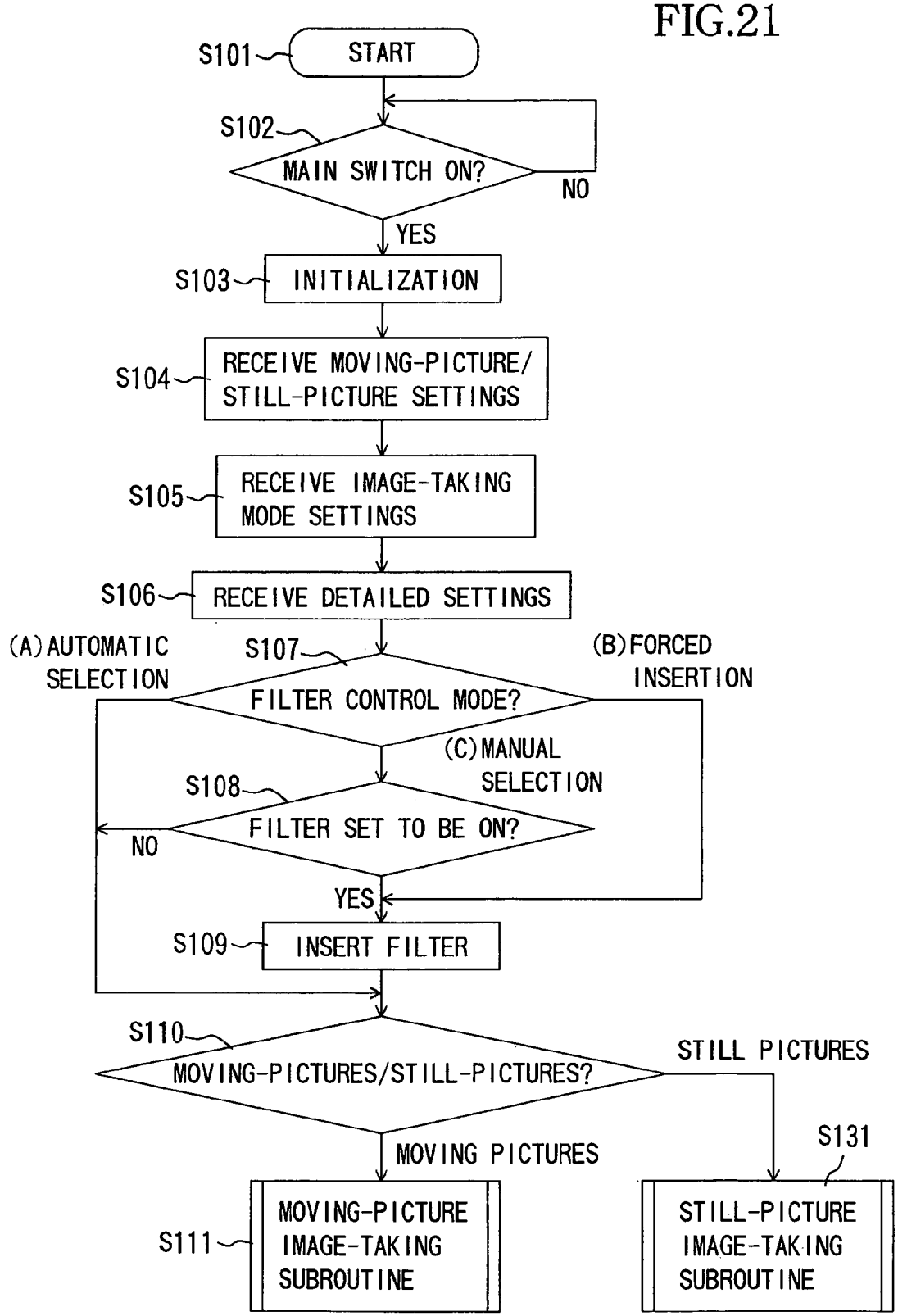
FIG. 21 is a flowchart showing a main control of an image-taking apparatus according to Embodiment 3.
Figure 22:
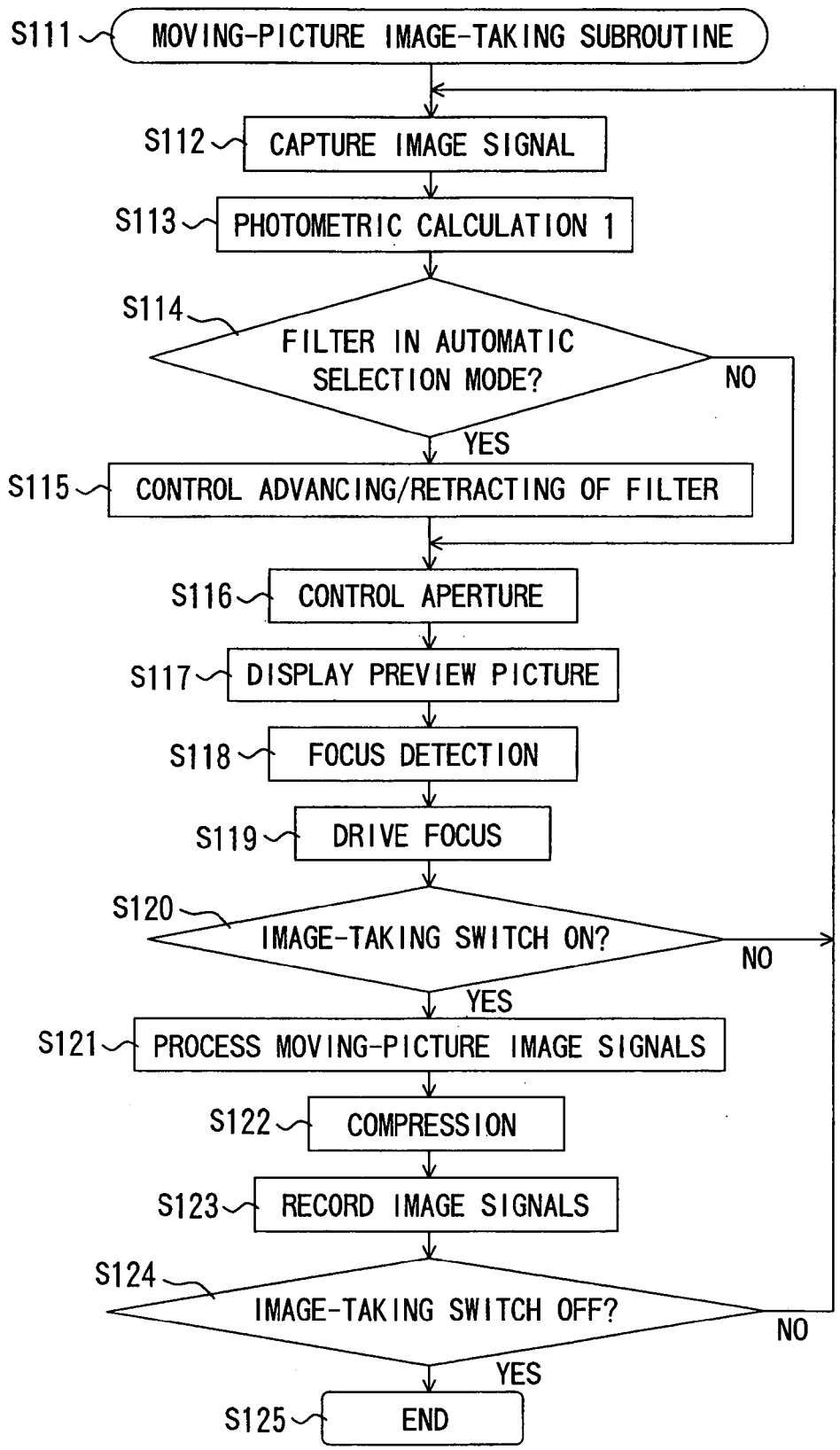
FIG. 22 is a flowchart showing a moving-picture image-taking subroutine in Embodiment 3.

FIG. 22 is a flowchart of the subroutine for moving-picture image-taking, and shows the control flow for the case that the procedure has branched off to Step S111 in FIG. 21.

After Step S111, at Step S112, an image-signal is obtained with the image-taking device 440 and subjected to a predetermined image process with the image signal processing circuit 442. At Step S113, a photometric calculation 1 is carried out. This is a photometric calculation for moving-picture image-taking, which calculates the brightness of the object using the maximum value, the minimum value and the average value of the image signal obtained at Step S112. Then, using the equations relating to the exposure control from Eq. 4 to Eq. 7, the diaphragm control value of the light amount adjusting apparatus 100 is calculated. For this, the characteristic value relating to the dimming step number of the apodization filter explained in FIG. 18 is stored in a ROM of the CPU 431, so that during usage of the apodization filter, these characteristics are looked up, and the appropriate diaphragm control value is calculated. At Step S114, the control mode of the apodization filter that was set in the main routine of FIG. 21 is discriminated. When this control mode is the automatic selection mode, then the procedure advances to Step S115, and the apodization filter is advanced or retracted based on the result of the photometric calculation performed at Step S113. On the other hand, when the filter control mode is in the forced insertion mode or the manual insertion mode, then the insertion or retraction of the filter has already been carried out at Steps S107 to S109 of FIG. 21, so that the procedure jumps to Step S116 without executing Step S115.

At Step S116, the aperture control is carried out. More specifically, the stepper motor 171 of FIG. 14 is driven by a predetermined amount, and the windmill wheel rotation angle is controlled such that a predetermined F number is attained. At Step S117, the image signal obtained at Step S112 is converted into a preview picture, which is displayed on the display device 421. At Step S118 and Step S119, a focus adjustment of the image-forming optical system 400 is performed. The focus adjustment is performed by a technique known as "hill-climbing servo AF", in which the focus position at which the high-frequency components of the image signal become maximal is searched, and the lens is stopped at this position.

At Step S120, it is discriminated whether the camera operator has turned on the image-taking switch for moving-picture image-taking. If the image-taking switch is not turned on, then the procedure returns to Step S112, and the light amount adjustment control, the focus adjustment control and the preview picture display are performed again. If it is determined at Step S120 that the image-taking switch has been turned on, then the procedure advances from Step S120 to Step S121.

After the image signal obtained with the image-pickup device 440 has been miniaturized at Step S121 to 300,000 pixels, which is the pixel number of images for moving-picture recording, image processing for moving images is carried out. At Step S122, an image compression for moving-picture recording is carried out, and at Step S123, the compressed image signal is recorded in the memory 443.

At Step S124, it is discriminated whether the camera operator has turned off the image-taking switch. If it has not been turned off, then the procedure returns to Step S112, and the light amount adjustment control, the focus adjustment control, the preview picture display, and the recording of the moving images into the memory are performed again. If it is determined at Step S124 that the image-taking switch has been turned off, then the image-taking is terminated at Step S125.

With this control flow, if the filter control mode is the automatic selection mode and the object brightness changes during image-taking, then the apodization filter may be advanced or retracted during the image-taking, resulting in a momentary discontinuity of the light amount on the image-pickup device, but since the exposure control function is continuously activated, a proper exposure is attained after a predetermined time has passed. Moreover, in order to avoid the phenomenon of light amount discontinuities due to insertion or retraction of the filter, it is also possible to devise an embodiment in which the filter state at the beginning of the image-taking is maintained during the image-taking.

Figure 23:
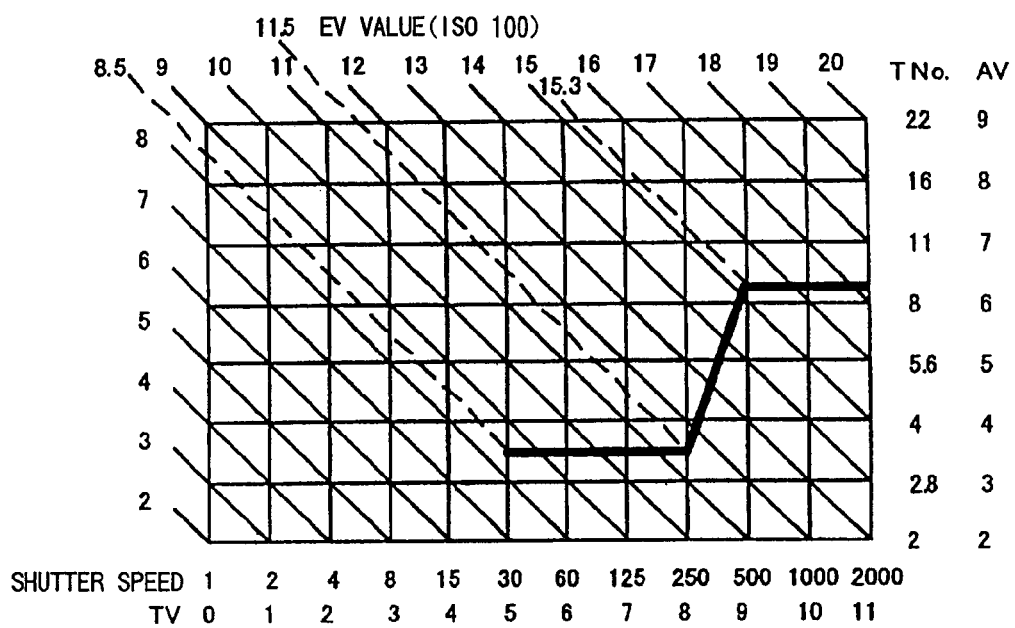
FIGS. 23(A) and 23(B) are graphs illustrating an exposure control during moving-picture image-taking in Embodiment 3.
Figure 23:
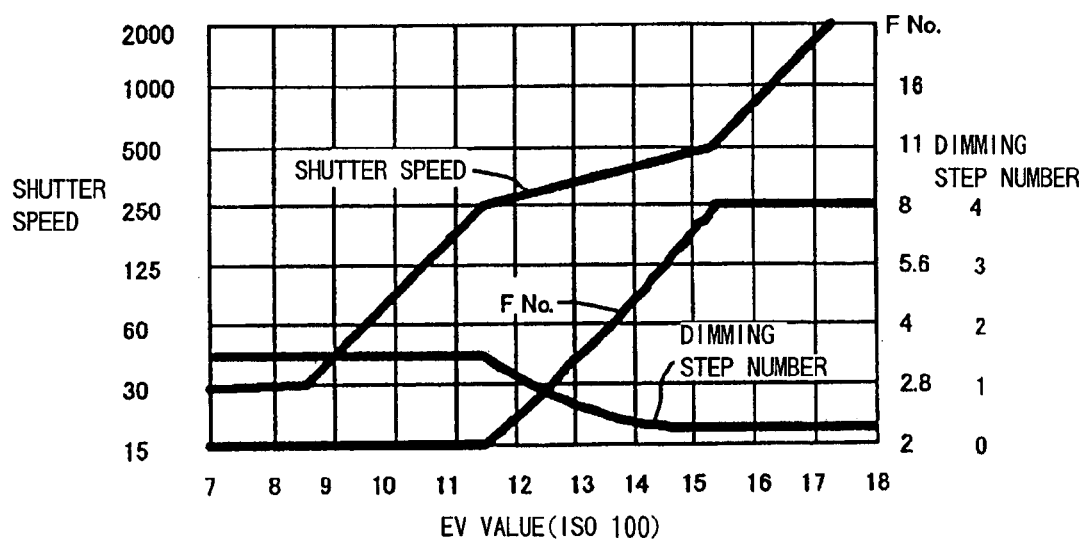

FIG. 23 is a diagram illustrating a control method for the photometric calculation 1 at Step S113 in FIG. 22, illustrating, as an example, the exposure control for the portrait mode (14) in FIG. 20. FIG. 23(A) is a so-called EV chart used to illustrate the exposure control program of the still-camera. FIG. 23(B) is a diagram illustrating the control state of the F number, the shutter speed, and the dimming step number due to the apodization filter with respect to the brightness of the object during moving-picture image-taking.

First, FIG. 23(A) is explained.

For the equation for calculating the appropriate exposure with a still-camera, the APEX equation shown above in Eq. 4 is used, which is repeated below:

$$AV+TV=BV+SV=EV \qquad (Eq. 4)$$

In Eq. 4, AV represents an aperture value, TV represents a time value, BV represents a luminance value, SV represents a film speed value, and EV represents an exposure value. The horizontal axis in FIG. 23(A) is the shutter speed (more precisely, the actual exposure time is the inverse of the listed values) and the corresponding TV value, whereas the vertical axis is the F number of the diaphragm mechanism and the corresponding AV value. In this example, the iris diaphragm and the apodization filter are both used for the light amount adjustment, so that the vertical axis lists the T number in consideration of the dimming due to the apodization filter on the F number. Here, the T number and the AV value are as explained for Eq. 6 and Eq. 7.

Moreover, the lines slanted 45° in FIG. 23(A) indicate lines with the same EV value, and the EV values at which the sensitivity of the image-pickup device corresponds to ISO 100 are marked on the upper left side of those 45° lines.

FIG. 23 is an exposure control chart for the moving-picture image-taking mode, but during moving-picture image-taking, the mechanical shutter 406 that is arranged in the image-forming optical system is not used, but the electronic shutter of the image-pickup device 440 is used. The minimum shutter speed for moving-picture images is limited by the moving-picture image-taking intervals, that is, the so-called frame rate. In this example, the frame rate is set to 30 frames/sec, so that the minimum shutter speed becomes about $\frac{1}{30}$ sec. In the portrait mode, on the other hand, an apodization filter with a dimming step number of 1.5 for an open aperture is forcibly inserted, so that even when the F number is F 2.0 (open), the T number becomes 3.4. The program chart for exposure control is explained for these conditions.

First, in the region of EV values of at least 3.5 and less than 8.5, the shutter speed is fixed at $\frac{1}{30}$ sec and the T number is fixed at 3.4. Thus, at an EV of 8.5 or less, an appropriate light amount may not be obtained, and in this case, the image signal from the image-pickup device 440 is amplified by a certain amplification gain. In the region of EV values of at least 8.5 and less than 11.5, the T number is fixed at 3.4, and the shutter speed is changed from $\frac{1}{30}$ sec to $\frac{1}{250}$ sec to obtain the appropriate exposure amount. In the region of EV values of at least 11.5 and less than 15.3, the T number of the lens is changed from 3.4 to 8.9, and the shutter speed is changed by the electronic shutter from $\frac{1}{250}$ sec to $\frac{1}{500}$ sec to obtain the appropriate exposure amount. And in the region of EV values of at least 15.3 and less than 17.3, the T number is fixed at 8.9, and the shutter speed is changed by the electronic shutter from $\frac{1}{500}$ sec to $\frac{1}{200}$ sec to obtain the appropriate exposure amount.

Subsequently, the combination of the shutter speed, the F number, and the dimming step number due to the apodization filter at each EV value during moving-picture image-taking is explained using FIG. 23(B). The horizontal axis in FIG. 23(B) is a EV value, whereas the vertical axis on the left side is a shutter speed and the vertical axis on the right side is an F number and a dimming step number. In the region of EV values of at least 2 and less than 8.5, a shutter speed of $\frac{1}{30}$ sec is selected and the aperture control selects the F number F2 (open). In this situation, the dimming step number of the apodization filter is 1.5. In the region of EV values of at least 8.5 and less than 11.5, the shutter speed is changed from $\frac{1}{30}$ sec to $\frac{1}{250}$ sec, but the F number is kept by the aperture control at F2 (open). Also in this situation, the dimming step number of the apodization filter is 1.5. In the region of EV values of at least 11.5 and less than 15.3, the shutter speed is changed from $\frac{1}{250}$ sec to $\frac{1}{500}$ sec, and also the F number is changed by the aperture control from F2 (open) to F8 (smallest aperture). In this situation, the dimming step number of the apodization filter is gradually reduced from 1.5 to 0.3, as explained with FIG. 18. In the region of EV values of at least 15.3 and less than 17.3, the shutter speed is changed from $\frac{1}{500}$ sec to $\frac{1}{2000}$ sec, the F number is kept by the aperture control at the smallest aperture F8, and the dimming step number of the apodization filter is maintained at 0.3 steps.

With the control as explained above, when the portrait mode is selected during moving-picture image-taking, the gain of the image-pickup device needs to be increased in the region of EV values of less than 8.5 in order to compensate for the insufficient exposure, but in the region of EV values of at least 8.5, an exposure control chart is selected in which the apodization filter is inserted and the open aperture value is used preferentially. Consequently, the blur of the background is large and the contours in the blurred images become soft, attaining a high-quality picture in which the main object looks attractive.

Figure 24:
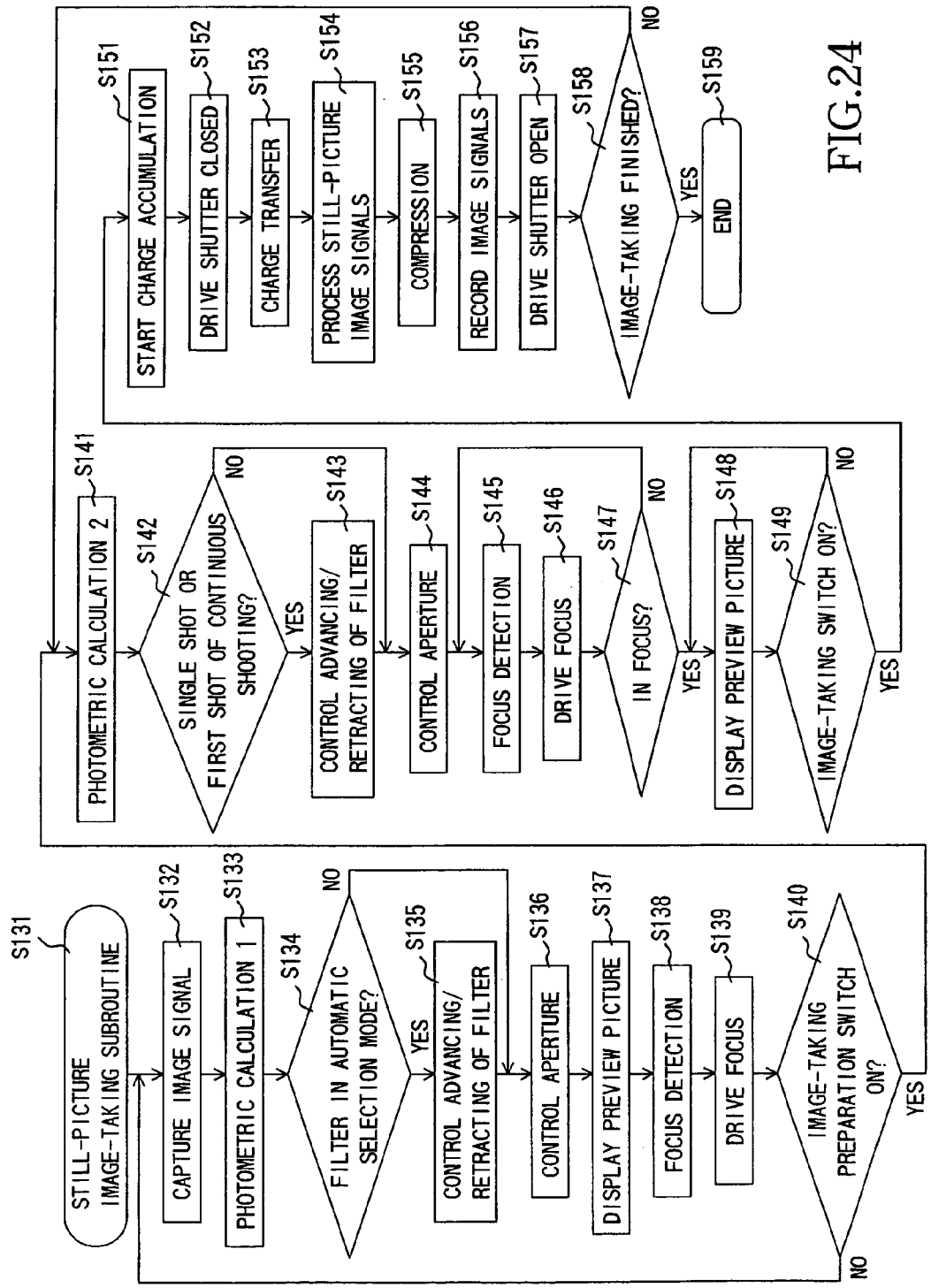
FIG. 24 is a flowchart showing a still-picture image-taking subroutine in Embodiment 3.

FIG. 24 is a flowchart of the subroutine for still-picture image-taking, and shows the control flow for the case that the procedure has branched off to Step S131 in FIG. 21.

After Step S131, at Step S132, an image-signal is obtained with the image-taking device 440 and subjected to a predetermined image process with the image signal processing circuit 442. At Step S133, the photometric calculation 1 is carried out. This flowchart shows the subroutine for still-picture image-taking, but during the preview before the still-picture image-taking, images are taken at the moving-picture mode, so that for the photometric calculation here, the same calculation as in Step S113 of FIG. 22 is carried out. At Step S134, the control mode of the apodization filter set in the main routine of FIG. 21 is discriminated. If this control mode is the automatic selection mode, then the procedure advances to Step S135, and the apodization filter is advanced or retracted depending on the result of the photometric calculation carried out at Step S133. On the other hand, if the filter control mode is the forced insertion mode or the manual selection mode, then the advancing or retracting of the filter has already been performed at Steps S107 to Step S109 in FIG. 21, so that the procedure advances to Step S136 without executing Step S135.

At Step S136, the aperture control is carried out. More specifically, the stepper motor 171 of FIG. 14 is driven by a predetermined amount, and the windmill wheel rotation angle is controlled such that a predetermined F number is attained. At Step S137, the image signal obtained at Step S132 is converted into a preview picture, which is displayed on the display device 421. At Step S138 and Step S139, a focus adjustment of the image-forming optical system 400 is performed.

At Step S140, it is discriminated whether the camera operator has turned on the image-taking preparation switch for still-picture image-taking. If the image-taking preparation switch is not turned on, then the procedure returns to Step S132, and the light amount adjustment control, the focus adjustment control and the preview picture display are performed again. If it is determined at Step S140 that the image-taking switch has been turned on, then the procedure advances from Step S140 to Step S141.

At Step S141, a photometric calculation 2 is carried out. This is a photometric calculation for still-picture image-taking, which calculates the brightness of the object using the maximum value, the minimum value and the average value of the image signal obtained immediately before Step S141. Then, by using the equations relating to the exposure control from Eq. 4 to Eq. 7, the diaphragm control value of the light amount adjusting apparatus 100 is calculated. Also for this, when using the apodization filter, the characteristic value relating to the dimming step number that is stored in the ROM of the CPU 431 are looked up, and the appropriate diaphragm control value is calculated.

At Step S142, the control mode of the apodization filter that was set in the main routine of FIG. 21 is discriminated. When this control mode is the automatic selection mode, then the procedure advances to Step S143, and performs the advance/retraction control of the apodization filter based on the result of the photometric calculation performed at Step S141. On the other hand, when the filter control mode is in the forced insertion mode or the manual insertion mode, then the advance or retraction of the filter has already been carried out at Steps S107 to S109 of FIG. 21, so that the procedure jumps to Step S144 without executing Step S143.

At Step S144, the aperture control is carried out again. At Step S145 and Step S146, the focus adjustment of the image-forming optical system 400 is carried out again. At Step S147, it is determined whether it is in focus, and if it is not in focus, then Step S145 and Step S146 are carried out again. If it is in focus, then the driving of the focusing lens unit is stopped, and the focused preview picture is displayed at Step S148.

At Step S149, it is discriminated whether the camera operator has turned on the image-taking switch for still-picture image-taking. If the image-taking switch has not been turned on, then the procedure returns to Step S148, and the display of the preview picture continues. If it is discriminated at Step S149 that the image-taking preparation switch has been turned on, then the procedure advances from Step S149 to Step S151.

At Step S151, the charge accumulation in the image-pickup device 440 for obtaining an image for still-picture recording starts. At Step S152, based on the shutter speed calculated by the photometric equation 2 of Step S141, the shutter blades of the shutter mechanism 406 are driven in the closing direction, and the light flux onto the image-pickup device 440 is shut off. At Step S153, the charges are transferred from the image-pickup device 440, and at Step S154 the image signal corresponding to the obtained 3 million pixels is subjected to image processing for still-picture images. At Step S155, an image compression for still-picture recording is performed, and at Step S156, the compressed image signal is recorded in the memory 443. Then, at Step S157, the shutter blades of the shutter mechanism 406 are driven back in the opening direction.

At Step S158, it is determined whether the image-taking has been finished or not. More specifically, if one frame has been taken in the single-shot mode, or if the image-taking switch has been turned off in the continuous-shooting mode, then the procedure advances to Step S159, and the image-taking is finished. On the other hand, if the image-taking switch is kept on in the continuous-shooting mode, then the procedure returns to Step S141 and the steps from Step S142 onward are performed again.

The following is an explanation of the exposure control in the still-picture image-taking mode.

Also in the still-picture image-taking mode, the same control as for the moving-picture image-control is performed during the preview operation from Step S132 to Step S140 in FIG. 24, so that the F number and the shutter speed are controlled as shown in FIG. 23.

Figure 25:
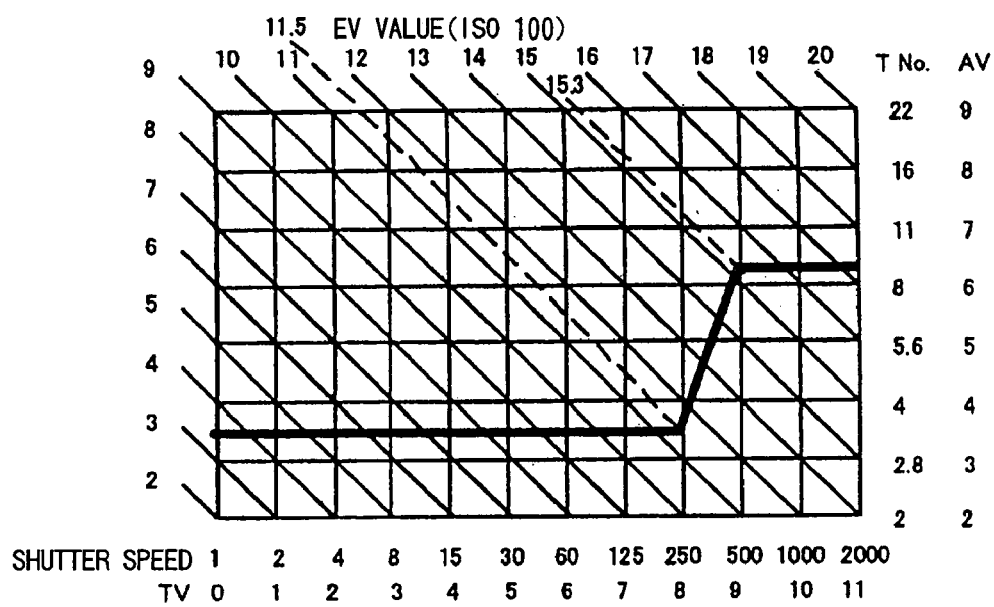
FIGS. 25(A) and 25(B) are graphs illustrating an exposure control during still-picture image-taking in Embodiment 3.
Figure 25:
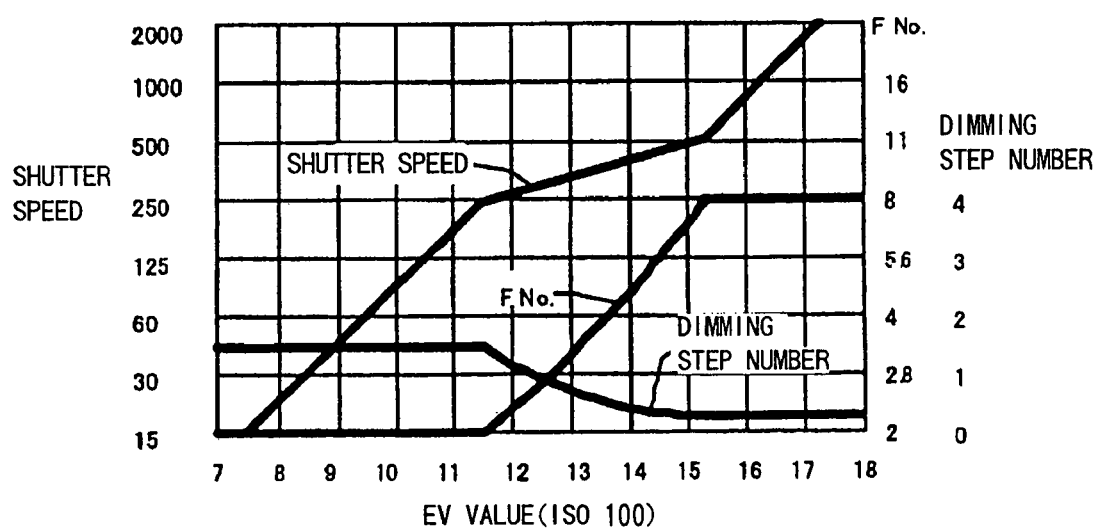

On the other hand, in the photometric calculation 2 at Step S141 of FIG. 24, a control that is particular to still-picture image-taking is performed, and this is illustrated in FIG. 25. Here, FIGS. 25(A) and 25(B) correspond to FIGS. 23(A) and 23(B).

FIG. 25 is an exposure control chart for the still-picture image-taking mode. During still-picture image-taking, the mechanical shutter 406 that is arranged in the image-forming optical system is used to prevent smear during the charge transfer. Moreover, during still-picture image-taking, there is no limitation by the frame rate during moving-picture image-taking, so that the minimum shutter speed can be set to slower speeds than 1/30 sec.

The program chart for exposure control is explained for these conditions using FIG. 25(A). The exposure chart shown in this figure is an example of the case that the portrait mode (4) in FIG. 20 has been selected.

First, in the region of EV values of at least 3.5 and less than 11.5, the T number of the lens is fixed at 3.4, and the shutter speed with the mechanical shutter is changed from 1 sec to 1/250 sec to obtain the appropriate exposure amount. In the region of EV values of at least 11.5 and less than 15.3, the T number of the lens is changed from 3.4 to 8.9, and the shutter speed is changed from 1/250 sec to 1/500 sec to obtain the appropriate exposure amount. And in the region of EV values of at least 15.3 and less than 17.3, the T number of the lens is fixed at 8.9, and the shutter speed is changed from 1/500 sec to 1/2000 sec to obtain the appropriate exposure amount.

Next, the combination of the shutter speed, the F number, and the dimming step number due to the apodization filter at each EV value during still-picture image-taking is explained using FIG. 25(B). The horizontal axis in FIG. 25(B) is an EV value, whereas the vertical axis on the left side is an shutter speed and the vertical axis on the right side is an F number and a dimming step number.

In the region of EV values of at least 3.5 and less than 11.5, the shutter speed is changed from 1 sec to 1/250 sec, but the F number due to the aperture control is kept at F2 (open). In this situation, the dimming step number of the apodization filter is 1.5. In the region of EV values of at least 11.5 and less than 15.3, the shutter speed is changed from 1/250 sec to 1/500 sec, and also the F number due to the aperture control is changed from F2 (open) to F8 (smallest aperture). In this situation, the dimming step number of the apodization filter is gradually reduced from 1.5 to 0.3, as explained with FIG. 18. In the region of EV values of at least 15.3 and less than 17.3, the shutter speed is changed from 1/500 sec to 1/2000 sec, the F number due to the aperture control is kept at the smallest aperture F8, and the dimming step number of the apodization filter is maintained at 0.3 steps.

With the control as explained above, when the portrait mode is selected during still-picture image-taking, the apodization filter is inserted automatically, and in the range of EV values of less than 11.5, an exposure control chart is selected in which the open aperture value is used preferentially. Consequently, the blur of the background is large and the contours in the blurred images become soft, attaining a high-quality still picture in which the main object looks attractive.

In this embodiment, the apodization filter 151, which has a predetermined optical density distribution, can be held in its advanced or retracted state in the image-forming optical system 400, and by driving the filter with the actuator 173, it becomes possible to advance the filter into the light flux transmitting aperture (aperture 122c) of the image-forming optical system only when it is necessary, thus obtaining a high-quality image in which the contours of the blurred image are softened.

Embodiment 4

The apodization filter used in Embodiment 3 has only one effective portion for attenuating the light flux, and the actuator performs only the driving control of whether the filter is used or not, whereas Embodiment 4 explained below is an example in which a plurality of apodization filters are arranged on one filter substrate, and the most appropriate effective filter portion can be selected in accordance with the image-taking conditions.

Figure 26:
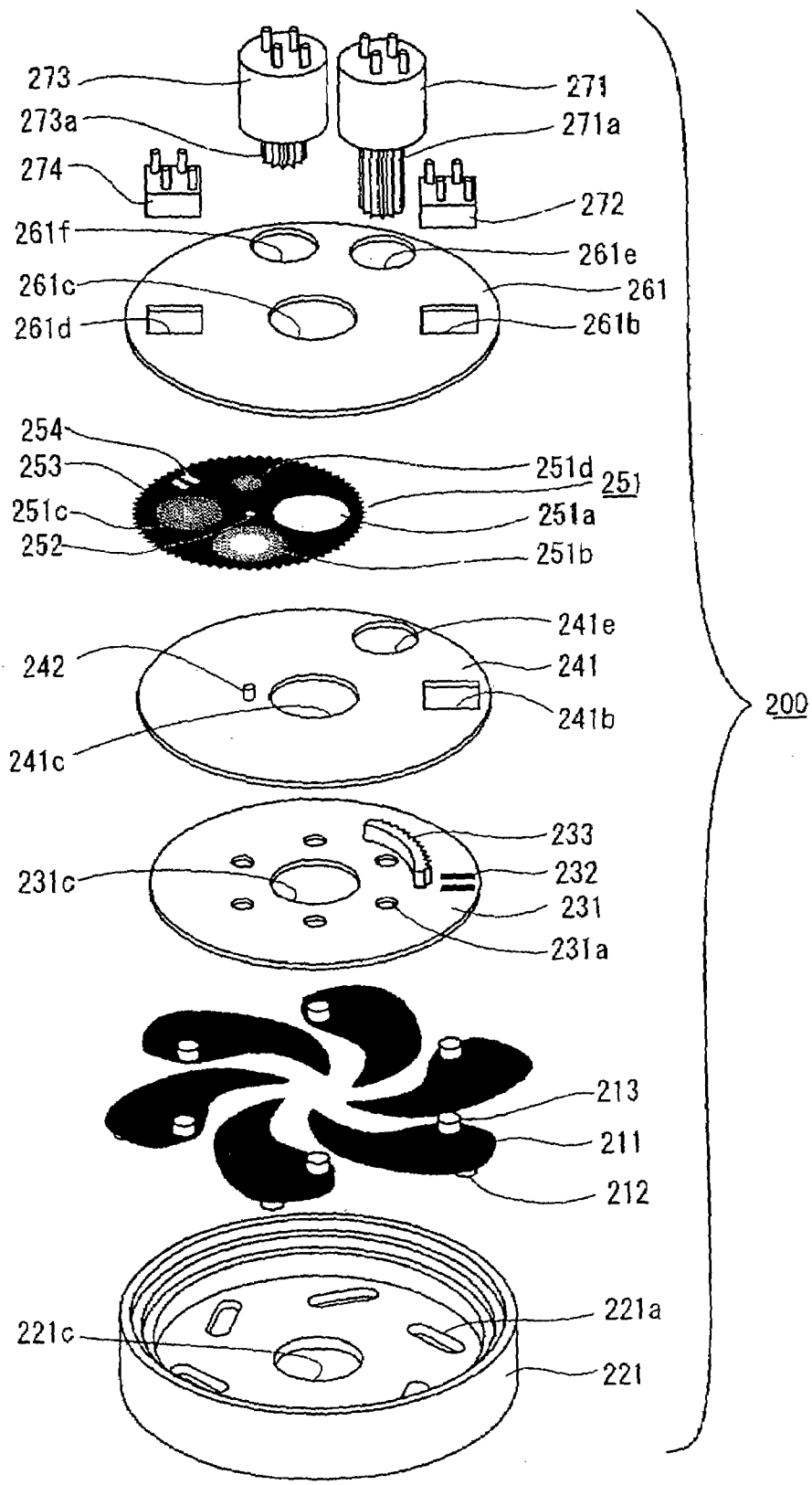
FIG. 26 is an exploded perspective view of a light amount adjusting apparatus according to Embodiment 4 of the present invention.

FIG. 26 is an exploded perspective view illustrating a structure of a light amount adjusting apparatus 200 according to Embodiment 4 of the present invention, and corresponds to FIG. 14 in Embodiment 3.

In FIG. 26, reference numeral 211 denotes diaphragm blades having a property of blocking light across their entire region. Driven pins 212 and 213 are arranged upright on a lower and an upper surface of the diaphragm blades 211. Six diaphragm blades 211 of the same shape are used, forming a diaphragm aperture. Reference numeral 221 denotes a bottom plate holding the diaphragm blades 211, which is provided, in the middle of a planar bottom surface, with an aperture 221c limiting the maximum diameter of the light flux when the diaphragm blades are spread open. Six cam grooves 221a are provided around this aperture 221c. The pins 212 of the diaphragm blades 211 engage these cam grooves 221a and can be moved through them in a sliding manner.

Reference numeral 231 denotes a driving member also referred to as "windmill wheel," which is provided with six holes 231a for driving the diaphragm blades arranged at equal intervals around an aperture 231c in the center. The pins 213 of the diaphragm blades 211 engage these holes 231a in a rotatable manner. Accordingly, when the windmill wheel 231 is turned in counterclockwise direction, the diaphragm aperture diameter is continually diminished in the same manner as in Embodiment 3, performing a constricting action. A mark (an index) 232 for detecting the initial position of the windmill wheel 231 as well as a driven gear 233 are provided on an upper surface of the windmill wheel 231.

Reference numeral 241 denotes a partition plate. A predetermined space is formed between the partition plate 241 and the bottom plate 221, and the diaphragm blades 211 and the windmill wheel 231 are accommodated in this space. An aperture 241c for transmitting light flux is provided in the middle of the partition plate 241. A rotation support shaft 242 of the apodization filter (explained below) is arranged upright next to the aperture 241c. The partition plate 241 is further provided with a phase detection window 241b for detecting the presence of the mark 232 on the windmill wheel 231 as well as an escape hole 241e of a later-described pinion gear.

Reference numeral 251 denotes a disk-shaped apodization filter made by forming later-described apodization patterns by inkjet printing on an about 0.1 mm thick transparent resin film, such as a PET (polyethylene terephthalate) film, in the same manner as in Embodiment 3. The apodization filter 251 is provided in its middle with a bearing 252, and is rotatably supported by the rotation support shaft 242 of the partition plate. A gear 253 made of a metal plate is adhered to an outer circumferential portion of the apodization filter 251. It should be noted that it is also possible to form the outer circumferential portion of the transparent film serving as the substrate for the apodization filter into gear shape. Moreover, a mark 254 for detecting the initial position of the rotation direction of the filter is provided on the upper surface of the apodization filter 251.

In Embodiment 4, a light attenuation pattern of the apodization filter 251 is constituted by the following four regions. Reference numeral 251a denotes a transparent filter region with a transmission rate of 100% across the entire effective region. Reference numeral 251b denotes a filter region whose middle portion within a predetermined radius is transparent. Reference numeral 251c denotes a similar filter region as reference numeral 131a in Embodiment 3. Reference numeral 251d denotes a filter region for small apertures in which the portion outside of a predetermined radius is a light-blocking portion. This is explained more specifically later with reference to FIG. 28.

Reference numeral 261 denotes a cover plate. A predetermined space is formed between this cover plate 261 and the partition plate 241, and the filter 251 is accommodated in this space. An aperture 261c for transmitting light flux is provided in the middle of the cover plate 261. The cover plate 261 is further provided with detection windows 261b and 261d for detecting the presence of the mark 232 on the windmill wheel 231 and the mark 254 on the filter, as well as escape holes 261e and 261f of later-described pinion gears.

Reference numeral 271 denotes a stepper motor for driving the windmill wheel 231. A pinion gear 271a of the stepper motor 271 passes through the holes 261e and 241e, and meshes with the gear 233 provided on the windmill wheel 231. Reference numeral 272 denotes an optical position detection unit incorporating a light projector element and a photodetector element, and detecting light that has been reflected from the upper surface of the windmill wheel 231. The optical position detection unit 272 is configured such that when the mark 232 is arranged in opposition directly below the position detection unit 272, then a predetermined signal is output, so that it can be detected whether a phase angle of the windmill wheel 231 has returned to the initial state.

With this structure, the stepper motor 271 is driven to return the windmill wheel 231 to its initial position and the diaphragm aperture is returned to the open state, while observing the output of the position detection unit 272. By driving the stepper motor 271 from this position in accordance with a predetermined program, the diaphragm aperture can be controlled to a desired size. Also in this embodiment, when the diaphragm mechanism is incorporated in the later-described image-forming optical system, an F number can be adjusted from F2 on the open side to F8 on the constricted side.

Reference numeral 273 denotes a stepper motor for driving the apodization filter 251. A pinion gear 273a passes through the hole 261f and meshes with the gear 253 provided on the filter 251. Reference numeral 274 denotes an optical position detection unit incorporating a light projector element and a photodetector element, and detecting light that has been reflected from the upper surface of the filter 251. The optical position detection unit 274 is configured such that when the mark 254 is arranged in opposition directly below the position detection unit 274, then a predetermined signal is output, so that it can be detected whether a phase angle of the filter 251 has returned to the initial state.

With this structure, the stepper motor 273 is driven to return the apodization filter 251 to its initial state, that is, to a state in which the transparent portion 251a covers the aperture 241c, while observing the output of the position detection unit 274. Moreover, by driving the stepper motor 273 from this position in accordance with a predetermined program, it is possible to advance a desired pattern into the light flux transmitting aperture, and to alter an effect for improving blurred images.

Moreover, since a plurality of driving control unit, that is, the two stepper motors 271 and 273 are arranged next to one another in the ring-shaped space enclosing the apertures 221c and 241c, it is possible to keep a size to approximately the same size as that of the light amount adjusting apparatus in Embodiment 3.

Figure 27:
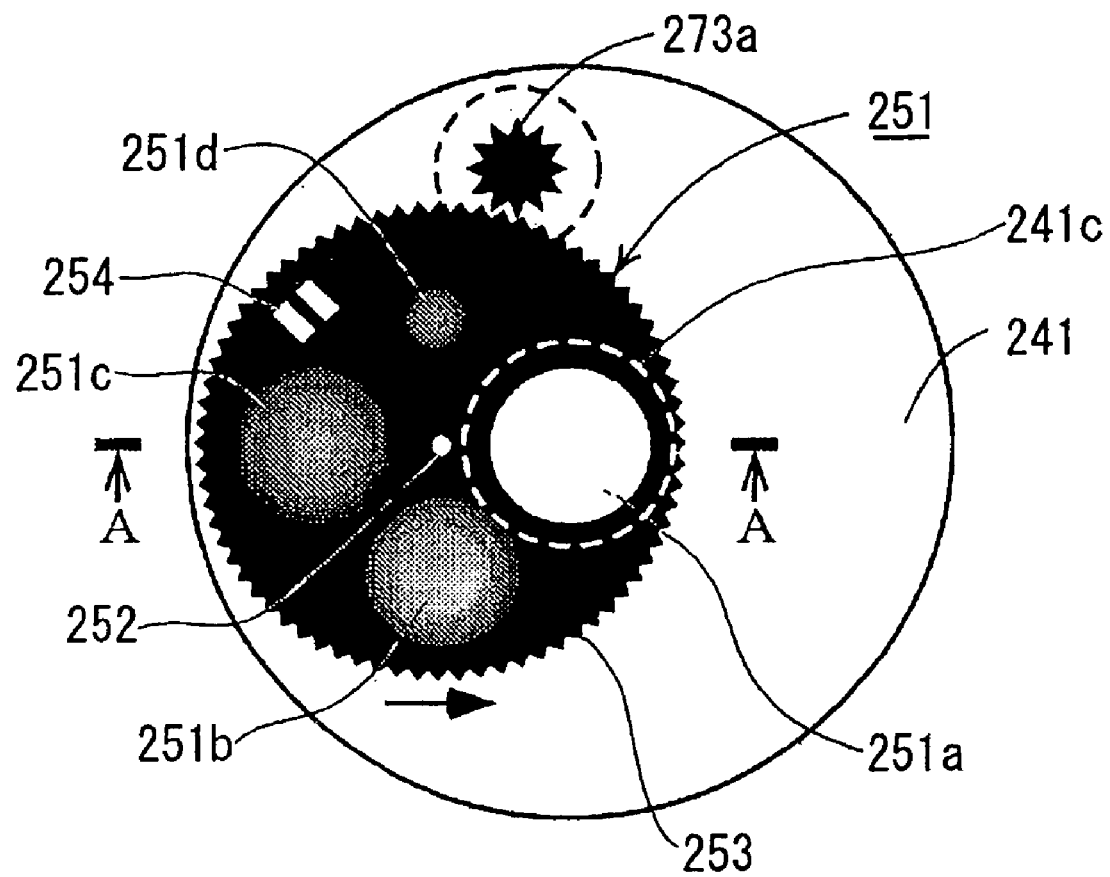
FIG. 27 are top views of an apodization filter in Embodiment 4.

FIG. 27 is a plan view illustrating in more detail the structure of the apodization filter 251, and corresponds to FIG. 15 in Embodiment 3.

Reference numeral 273a denotes a pinion gear of the stepper motor 273 for driving the filter. This pinion gear 273a meshes with the gear 253 provided at the circumference of the filter. Consequently, when the pinion gear 273a is driven in clockwise direction, the apodization filter 251 is rotated in counterclockwise direction, and the effective portions 251a to 251d are successively inserted into an optical path of the light flux transmitted through the light flux transmitting aperture 241c.

Figure 28:
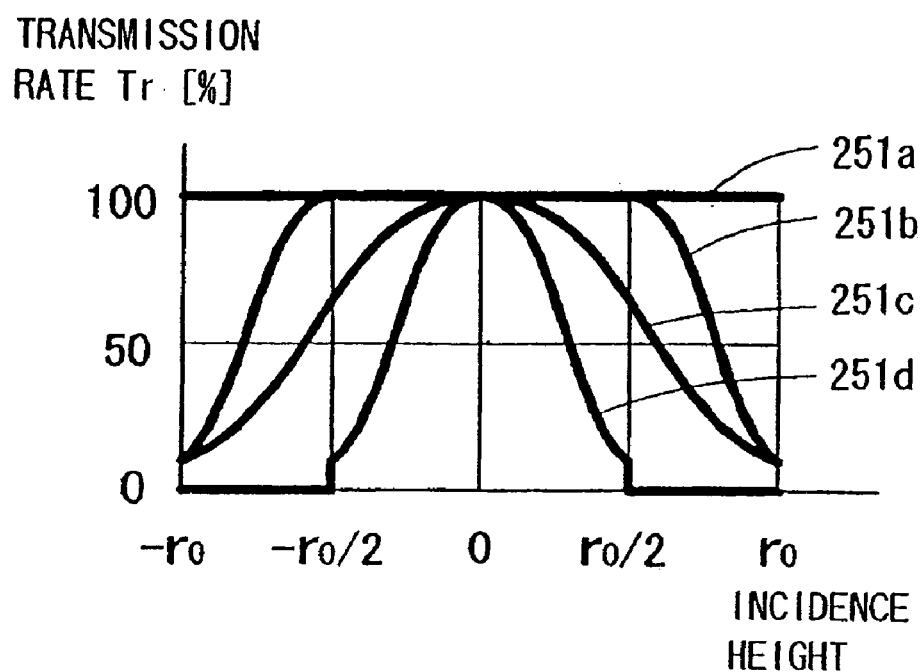
FIG. 28(A) shows a transmission rate distribution of an apodization filter in Embodiment 4.
FIG. 28(B) shows an optical density distribution of an apodization filter in Embodiment 4.
Figure 28:
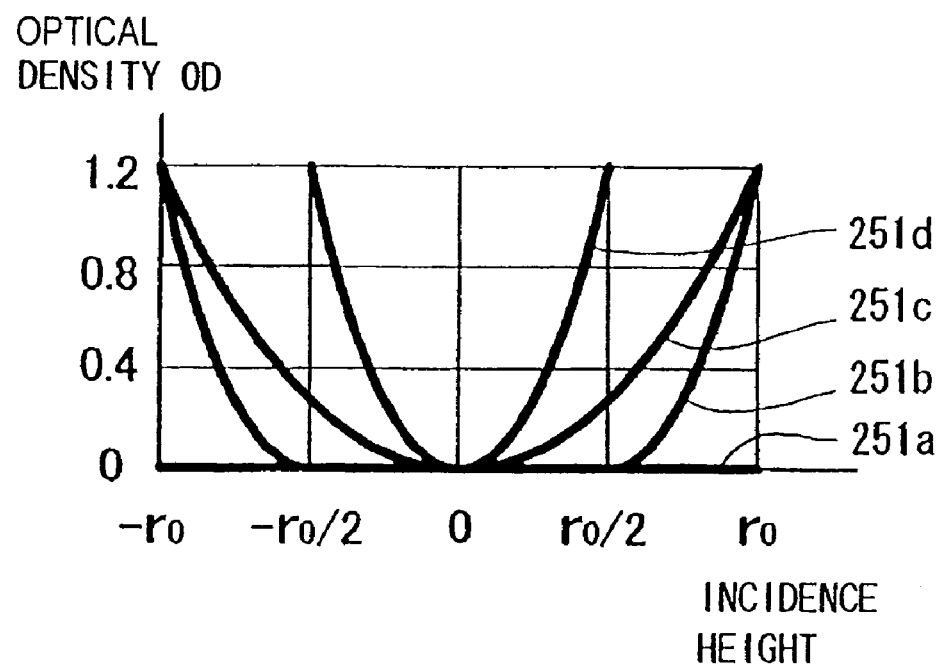

FIG. 28 shows graphs illustrating the pattern characteristics of the filter portions 251a to 251d of the apodization filter 251 according to the present embodiment. FIG. 28(A) shows a transmission rate distribution and corresponds to FIG. 16(A) in Embodiment 3. FIG. 28(B) shows an optical density (OD) and similarly corresponds to FIG. 16(B) in Embodiment 3. The reference numerals 251a to 251d in FIG. 28 indicate a transmission rate Tr and an optical density of the filter portions 251a to 251d in FIG. 27. In this embodiment, the transmission rate distributions of the four filter portions are different, so that by selecting the appropriate filter in accordance with the image-taking conditions, it is possible to attain a picture that is suitable for the image-taking intentions of the camera operator.

Figure 29:
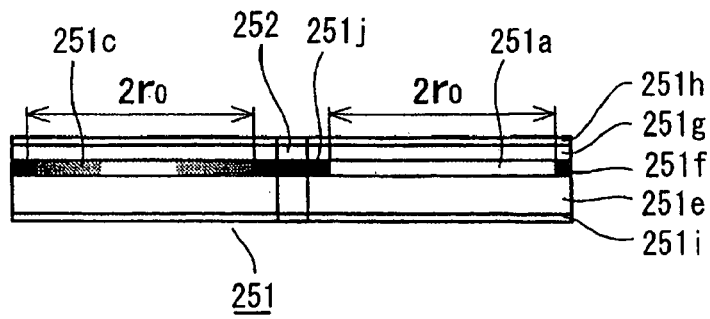
FIG. 29 is a cross-sectional view of an apodization filter in Embodiment 4.

FIG. 29 is a diagram illustrating a structure of the apodization filter 251, and is a cross-sectional view taken along A—A in FIG. 27.

Reference numeral 251e denotes a PET film serving as a transparent substrate. An ink-accepting layer 251f is applied to the upper surface of the PET film 251e. A dye-based coloring material having a low dispersion and a flat spectral transmission rate in the visible light spectrum is ejected onto the ink-accepting layer 251f by a micro-drop ejecting apparatus, namely a so-called inkjet recording apparatus, thus forming effective filter portions 251a to 251d with a diameter of 2r0. On the other hand, in regions of the ink-accepting layer outside the four effective filter portion, a light-blocking portion 251j is formed, for example, by a pigment-based coloring material having a higher optical density than the dye-based coloring material. Then, a flattening layer 251g is applied, and the irregularities in the surface of the ink-accepting layer occurring due to the printing process are flattened out. Furthermore, anti-reflective layers 251h and 251i are formed on the upper surface of the flattening layer 251g and the lower surface of the transparent substrate 251e by vapor deposition method.

With this process, a large number of apodization filters are formed on the transparent substrate 251e of large surface area, and when separating them by punching into individual filters in a final pressing step, the bearing hole 252 for rotational driving is also punched out at the same time, thus obtaining the filter 251.

Figure 30:
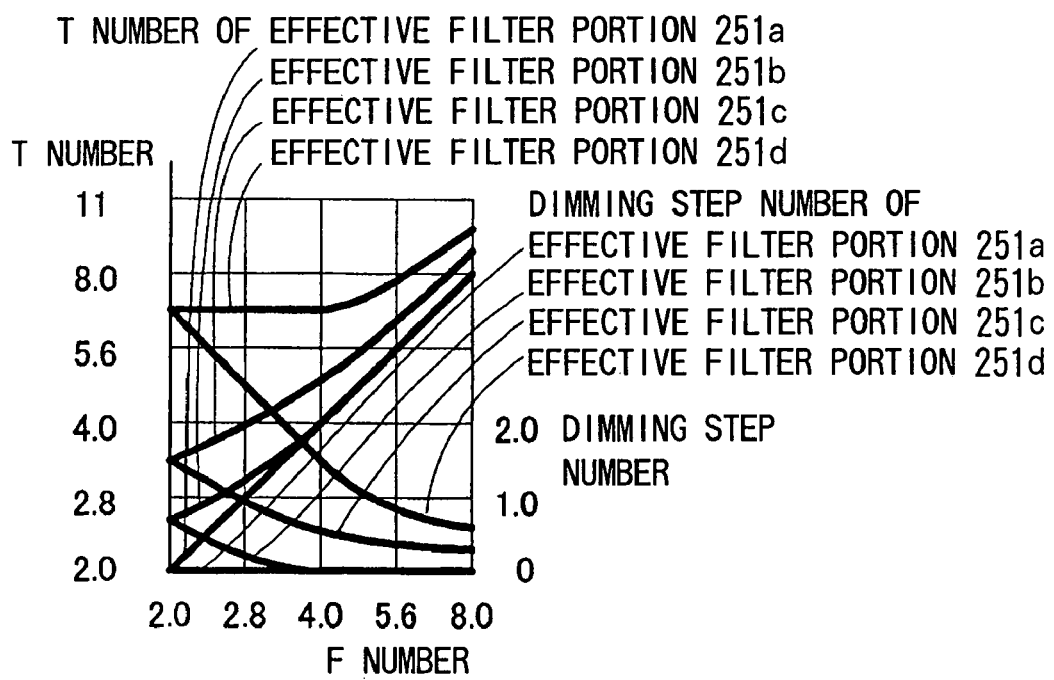
FIG. 30 is a graph illustrating a light amount adjusting action of an apodization filter in Embodiment 4.

FIG. 30 is a diagram illustrating a T number and a dimming step number for the case that an apodization filter as explained with FIGS. 27 to 29 is incorporated in the light amount adjusting apparatus of FIG. 26, which is then used in an image-forming optical system. FIG. 30 corresponds to FIG. 18 in Embodiment 3.

In FIG. 30, the horizontal axis is an F number adjusted by the diaphragm mechanism incorporated in the light amount adjusting apparatus 200. An open-state F number of the image-forming optical system according to this embodiment is F2.0 as in Embodiment 3, and the diaphragm mechanism has a diaphragm adjustment function from F2.0 (open) to F8.0 (smallest aperture). The vertical axis is a T number (left scale) and a dimming step number (right scale). The effective filter portion 251a is transparent across its entire region, so that in FIG. 30 the F number matches the T number, and the dimming step number is zero. The dimming step number becomes greater for the effective filter portions 251b, 251c and 251d in that order, and accordingly the estrangement of the F number and the T number increases.

Figure 31:
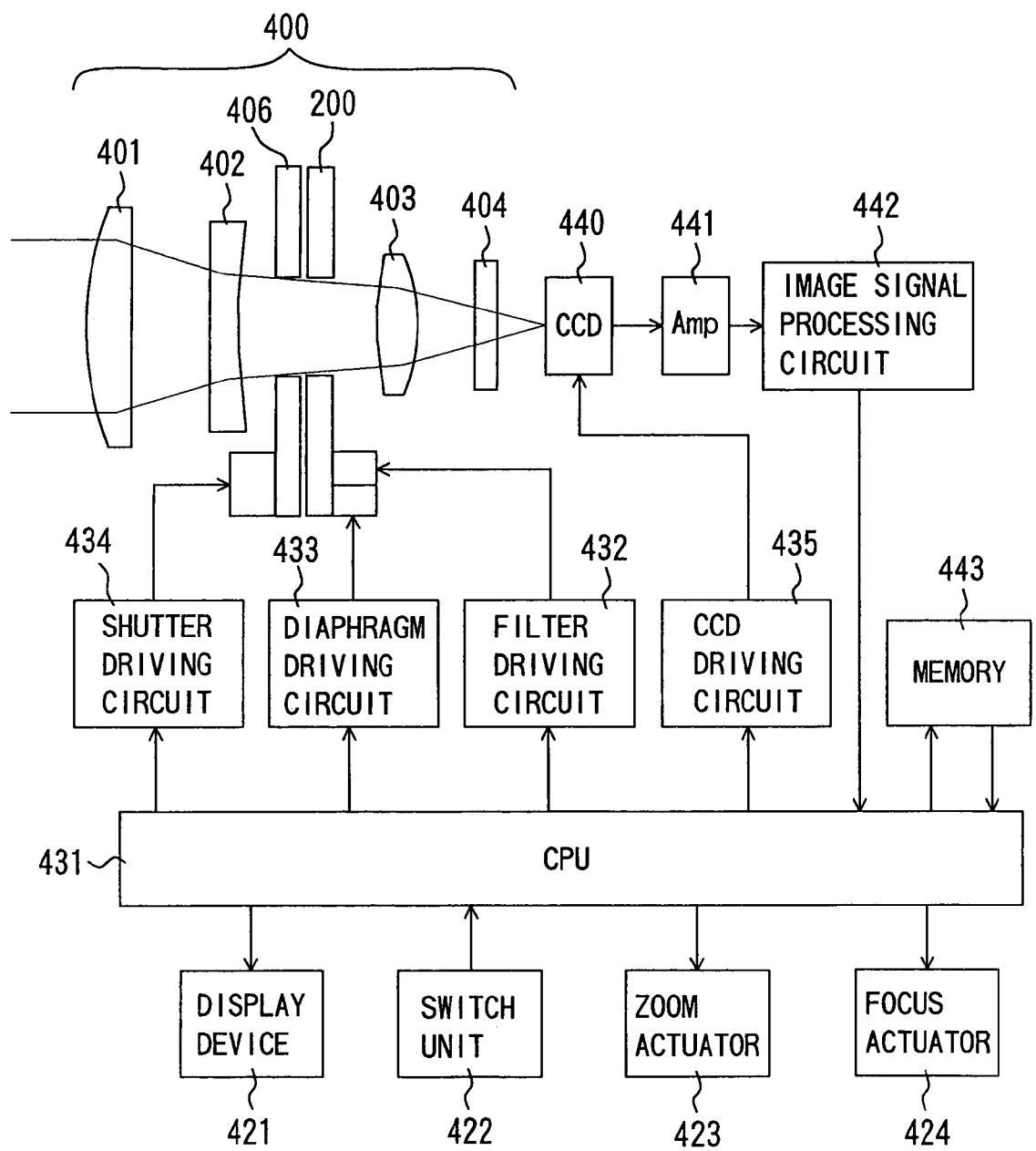
FIG. 31 is a diagram showing a structure of an image-taking apparatus according to Embodiment 4.

FIG. 31 illustrates an image-taking apparatus to which the light amount adjusting apparatus 200 shown in FIG. 26 has been mounted. This image-taking apparatus has the same structure as in Embodiment 3, so that further explanations have been omitted.

FIG. 32 is a table listing the image-taking modes with which the image-taking apparatus 200 of the present embodiment is provided, and corresponds to FIG. 20 in Embodiment 3. The image-taking modes with which the image-taking apparatus of the present embodiment is provided are the same in Embodiment 3, but in the present embodiment, a plurality of apodization filter types are provided, so that the most suitable filter is selected as described below.

In the image-taking modes (1) to (3) for still-picture image-taking, not much weight is given to the photographic effect of the blurred background, so that the apodization filters are not used, that is, the transparent portion 251a is ordinarily used, and attenuation of the transmitted light flux is avoided, thus preventing camera shake. However, if the object is too bright and using only the diaphragm mechanism would result in overexposure, then the apodization filters are used as ND filters. That is to say, in the image-taking modes (1) to (3), ordinarily the effective filter portion 251a is inserted into an optical path of the light flux transmitted through the light flux transmitting aperture, but if the object is too bright, then the filter portions 251*b* to 251*d* may be automatically selected.

On the other hand, the image-taking mode (4) is a mode in which the photographic effect of a blurred background is given much weight, so that the filter portion 251*c* is used preferentially. And if the object is bright, resulting in a small aperture (large F number), then the filter portion 251*d*, which is suitable for small apertures, is used. Thus, by automatically selecting the filter, the background during portrait image-taking becomes natural, the camera operator is relieved of the effort of having to manually insert the filter, and it can be avoided that the camera operator forgets to insert the filter or misses a good photo opportunity due to being distracted while having to insert the filter.

In the image-taking mode (5), the extent of the background blurring depends on the image-taking magnification, so that the optimal filter is selected automatically in accordance with the image-taking conditions. More specifically, if the object distance is close and the image-taking magnification is large, then the depth of field becomes extremely small and also the background blurring becomes large, so that the filter portion 251*d*, which is suitable for small apertures, is inserted automatically. If the object distance is in the medium range, then there is an appropriate extent of blurring, so that the effective filter portion 251*c*, which is suitable for open apertures, is inserted automatically. Moreover, if the object distance is large, then the background blurring is small and also the apodization filter effect is small, so that the filter portion 251*b*, which has a small dimming step number, is inserted automatically.

In the image-taking mode (6) to (9), the degree of freedom for exposure adjustment and photographic effect is raised, so that the camera operator can freely select any of the apodization filters 251*a* to 251*d*.

Also when taking moving pictures, the various modes can be set so as to attain the same photographic effects as for still-picture image-taking, and whether the apodization filters are used or not may be controlled in the same manner as during still-picture image-taking.

Figure 33:
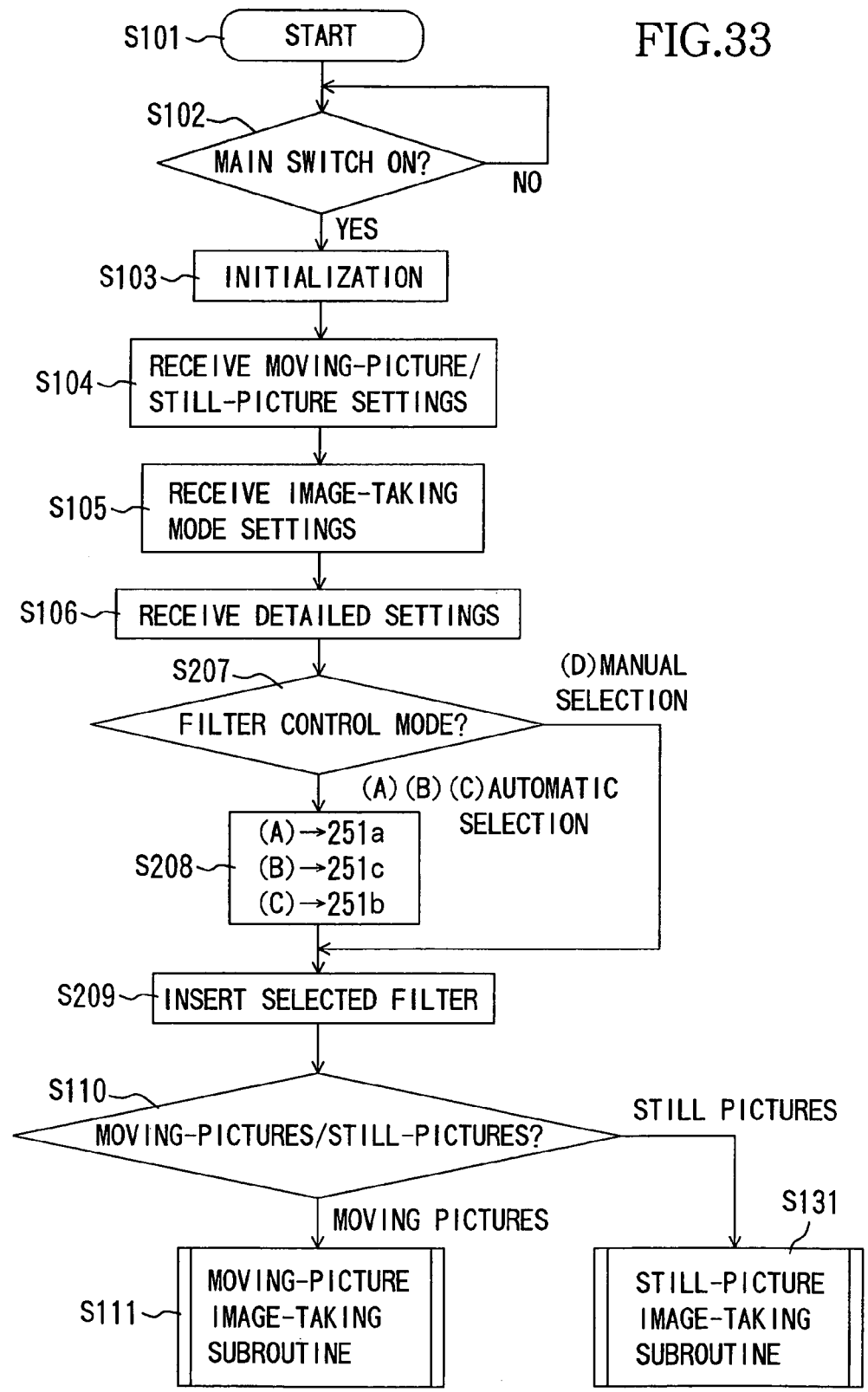
FIG. 33 is a flowchart showing a main control of an image-taking apparatus according to Embodiment 4.
Figure 34:
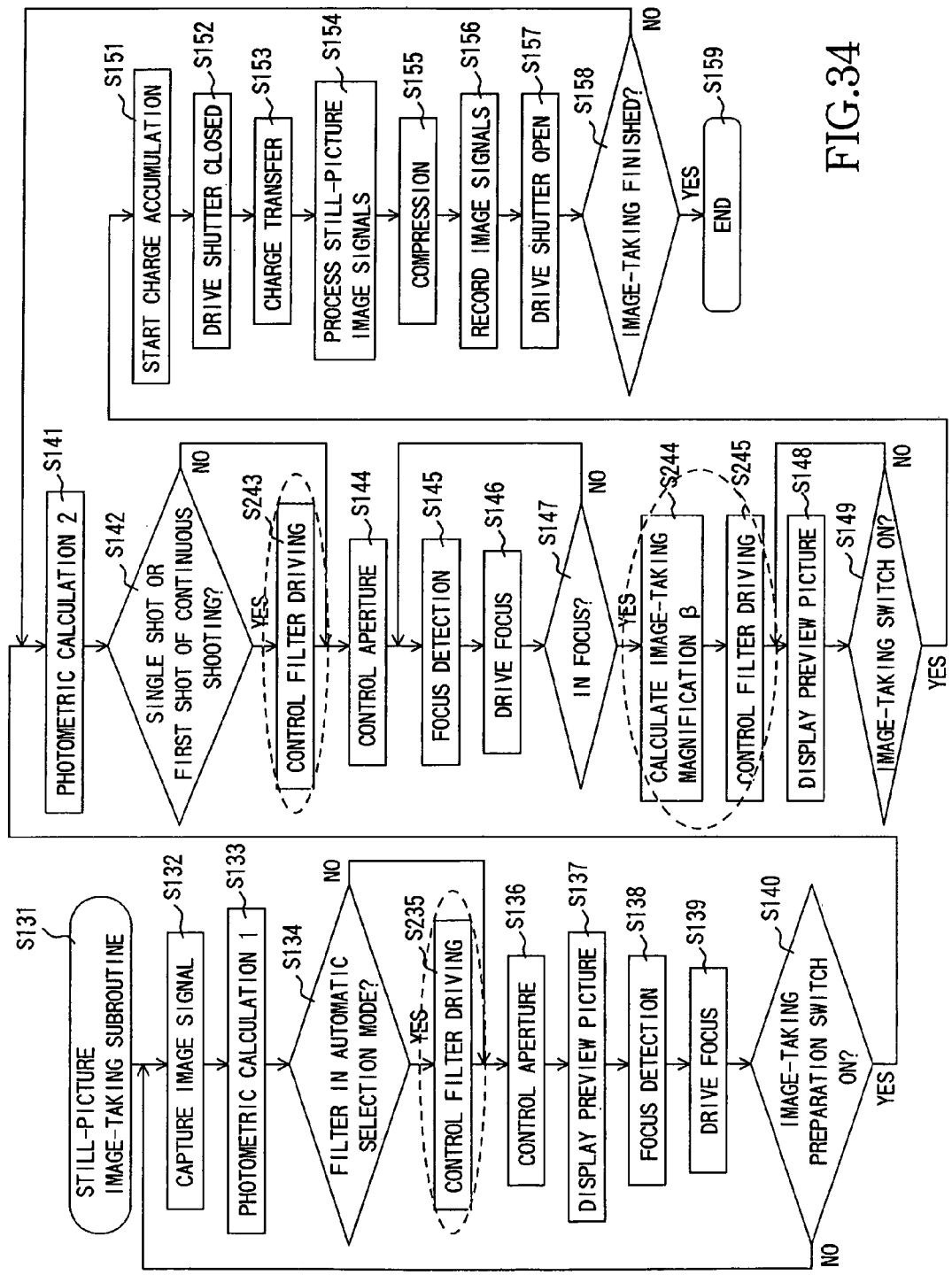
FIG. 34 is a flowchart showing a still-picture image-taking subroutine in Embodiment 4.

FIGS. 33 and 34 show a control flow for the image-taking apparatus according to Embodiment 4. In the control flow in Embodiment 4, only a portion of the flow in Embodiment 3 has been changed, so that only the changed portion is explained and the identical portions are not further explained.

FIG. 33 shows the main control flow for the image-taking apparatus according to Embodiment 4, and differs from the main control flow in Embodiment 3 only in that the Steps S107 to S109 in FIG. 21 of Embodiment 3 have been replaced by the Steps S207 to S209.

In Embodiment 3, there is only one type of apodization filter, and the driving unit advances and retracts this filter. Moreover, as shown in FIG. 20, there are three filter control modes (A) to (C). On the other hand, in the present embodiment, there are four types of apodization filters, including the transparent portion, so that the driving unit is driven selectively to insert the desired filter portion in an optical path of the light flux transmitted through the light flux transmitting aperture. Moreover, as shown in FIG. 32, there are four filter control modes (A) to (D). Accordingly, the control steps in FIG. 33 are explained with regard to these differences.

After the main switch has been turned on by the camera operator, the image-taking conditions are set by operating the various switches, and the steps up to Step S106 are concluded. Up to here, the flow is the same as in Embodiment 3.

At Step S207, it is discriminated which one of the filter control modes shown on the right in FIG. 32 the selected filter control mode is. If the filter control mode is one of the filter control modes (A) to (C), then the procedure advances to Step S208, and the filter that is used preferentially for each of those modes is selected. First, in the case of an automatic selection of (A) due to brightness (transparent portion preferred), then the filter 251*a* is selected. If the filters 251*c* or 251*d* are selected due to the brightness for (B), then the filter 251*c* is selected. In the case of automatic selection of (C) in accordance with the image-taking magnification, the filter 251*b* is selected. When at Step S208 the filter to be used has been selected, then that filter is advanced at Step S209 into the optical path of the light flux transmitted through the light flux transmitting aperture.

On the other hand, if the filter control mode is manual selection (D), then the procedure jumps to Step S209, and the filter that has been previously selected by the camera operator is advanced into the optical path of the light flux transmitted through the light flux transmitting aperture. This concludes the filter control prior to the image-taking, and the procedure advances to the next step.

In the moving-picture image-taking subroutine, substantially the same control as in Embodiment 3 is performed, so that further explanations thereof have been omitted. FIG. 34 is a flowchart of the still-picture subroutine.

In the foregoing Embodiment 3, there was only one type of apodization filter, so that also the filter driving took on the form of advancing and retracting, but in Embodiment 4 of the present invention, driving is performed by selecting a predetermined filter from a plurality of filters, so that the filter advancing/retracting control of the Steps S135 and S143 in FIG. 24 is changed to the filter driving control of Step S235 and Step S243 in FIG. 34. Moreover, in Embodiment 4, after the focusing at Step S147, a calculation of the image-taking magnification $\beta$ at Step S244 and a filter driving control at Step S244 have been newly added.

Here, the image-taking magnification $\beta$ can be expressed by the following equation:

$$\beta = [\text{distance between principal lens point and image surface}]/[\text{distance between object and principal lens point}] = f(\text{focus length, object distance}) \quad \text{(Eq. 8)}$$

The image-taking magnification $\beta$ is a function of a focus length and an object distance. The focus length can be calculated from a driving amount of the zoom actuator 423 in FIG. 31, and the object distance can be calculated from a driving amount of the focus actuator 424 in FIG. 31, so that the image-taking magnification data can be calculated based on values stored in the ROM of the CPU 431.

Then, at Step S245, a filter corresponding to the image-taking magnification $\beta$ is driven into the optical path of the light flux transmitted through the light flux transmitting aperture, but the way the filter is selected is explained later with reference to FIG. 36. Apart from the steps explained above, the process flow is similar to that in Embodiment 3, so that further explanations thereof have been omitted.

Figure 35:
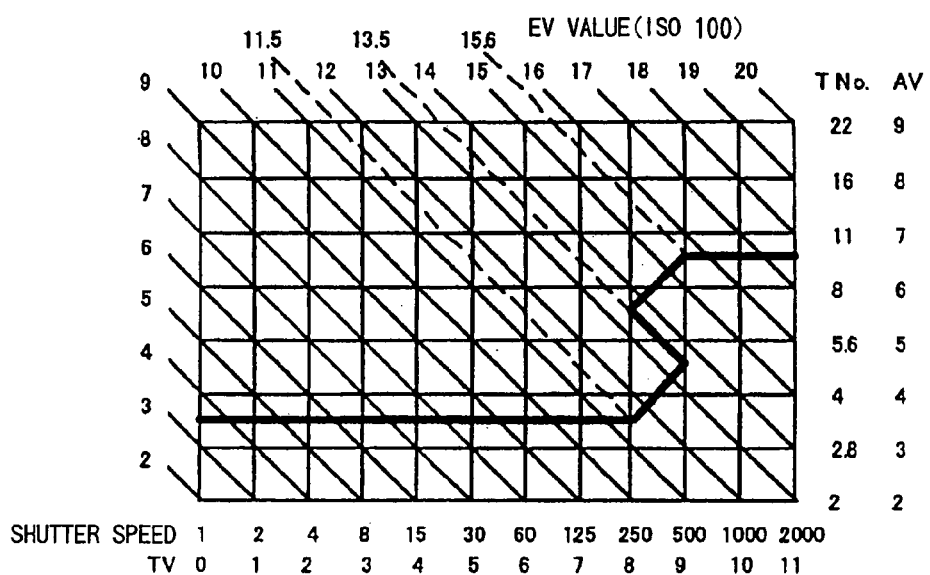
FIGS. 35(A) and 35(B) are graphs illustrating an exposure control during still-picture image-taking in Embodiment 4.
Figure 35:
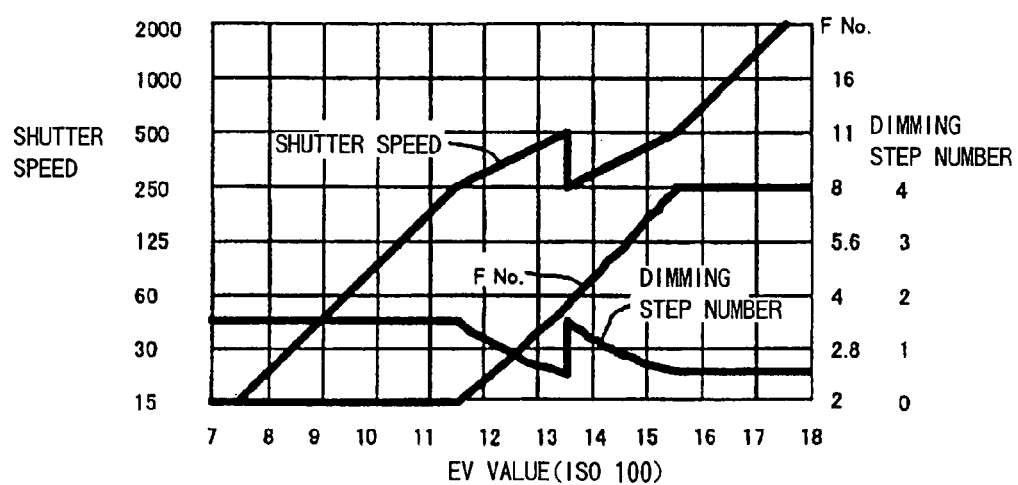

FIG. 35 shows exposure control charts for the still-picture image-taking mode in Embodiment 4, and corresponds to FIG. 25 in Embodiment 3. Also for this figure, only the differences to Embodiment 3 are explained.

FIG. 35(A) is an exposure control chart for the case that the portrait mode (4) in FIG. 32 has been selected. In this exposure control chart, there are kinks at EV 11.5, EV 13.5 and EV 15.6. Of these, the kink at EV 13.5 is due to the switching of the apodization filter, which is explained with reference to FIG. 35(B).

First, in the region of EV values of at least 3.5 and less than 11.5, the shutter speed is changed from 1 sec to 1/250 sec, whereas the F number due to the aperture control is kept at F2 (open). In this situation, the effective filter portion 251c is selected, and the dimming step number is 1.5. In the region of EV values of at least 11.5 and less than 13.5, the shutter speed is changed from 1/250 sec to 1/500 sec, and the F number due to the aperture control is changed from F2 (open) to F4. At the same time, the dimming step number of the filter portion 251c gradually changes from 1.5 to 0.5, as explained with FIG. 18. When the EV value slightly exceeds 13.5, then the filter portion 251c is switched to the filter portion 251d. With this operation, the dimming step number due to the apodization filter is increased by 1.5 while the aperture value is kept at F4, so that the exposure amount is kept at an appropriate value by returning the shutter speed from 1/500 sec to 1/250 sec. In the region of EV values of at least 13.5 and less than 15.6, the shutter speed is changed from 1/250 sec to 1/500 sec, and the F number due to the aperture control is changed from F4 to F8 (smallest aperture). At the same time, the dimming step number of the filter portion 251d gradually changes from 1.5 to 0.6, as illustrated in FIG. 30. And in the region of EV values of at least 15.6 and less than 17.6, the shutter speed is changed from 1/500 sec to 1/2000 sec, and the F number due to the aperture control is kept at the smallest aperture F8, and the dimming step number of the apodization filter is maintained at 0.6 steps.

With this control, when the portrait mode is selected during still-picture image-taking, the filter portion 251c is automatically inserted in the region of EV values of less than 13.5, and control to appropriate exposure is attained with an aperture value from open to F4 and a predetermined shutter speed, so that the blurring of the background is large and a high-quality image with smooth contours of the blurred image can be attained. Moreover, the filter portion 251d is automatically inserted in the region of EV values of 13.5 and higher, and control to appropriate exposure is attained with aperture values from F4 to F8 and a predetermined shutter speed, so that a high-quality still-picture image is attained in which a suitable degree of blur in the background remains while preventing overexposure.

In the foregoing, the process flow for the portrait mode in the present embodiment was explained, but embodiments are possible in which the apodization filter is automatically selected also in the other image-taking modes. For example, in the aperture-preferred mode, when the camera operator selects only the F number and whether an apodization filter should be used, then the type of the filter may be selected automatically for the selected F number by the image-taking apparatus. In this case, if the selected aperture value is between F2 and F4, then the effective filter portion 251c should be automatically selected, and if it is between F4 and F8, then the effective filter portion 251d should be automatically selected.

FIG. 36 is a table illustrating a filter selection method for macro image-taking. At Step S244 of the still-picture image-taking process flow in FIG. 34, the image-taking magnification β is calculated, and one of the effective filter portions 251b to 251d is selected in accordance with the region of the image-taking magnification β, as shown in FIG. 36.

More specifically, if the image-taking magnification β is less than 0.001, that is, if the object distance is large, then there is little background blurring, so that the effect of the apodization filter is small. Accordingly, instead of attaining a small blur improvement effect, the effective filter portion 251b whose dimming step number is small is selected, and camera shake due to insufficient exposure is avoided.

If the image-taking magnification β is at least 0.001 and less than 0.1, that is, if the object distance is mid-range, then there is a considerable degree of background blurring, so that the filter portion 251c, which has the largest blur improvement effect, is selected.

If the image-taking magnification β is at least 0.1 and less than 1, that is, if the object distance is close, then the depth of field at open aperture is too small, so that the filter portion 251d, which is suitable for small apertures, is selected, the depth of field is kept at a suitable degree and a suitable blur improvement effect is attained.

With this filter selection control, the blurred image is improved while attaining a suitable depth of field during macro image-taking, attaining a high-quality picture in which the main object within the softly blurred background looks attractive.

Embodiment 5

FIGS. 37 to 48 illustrate Embodiment 5 of the present invention.

Figure 37:
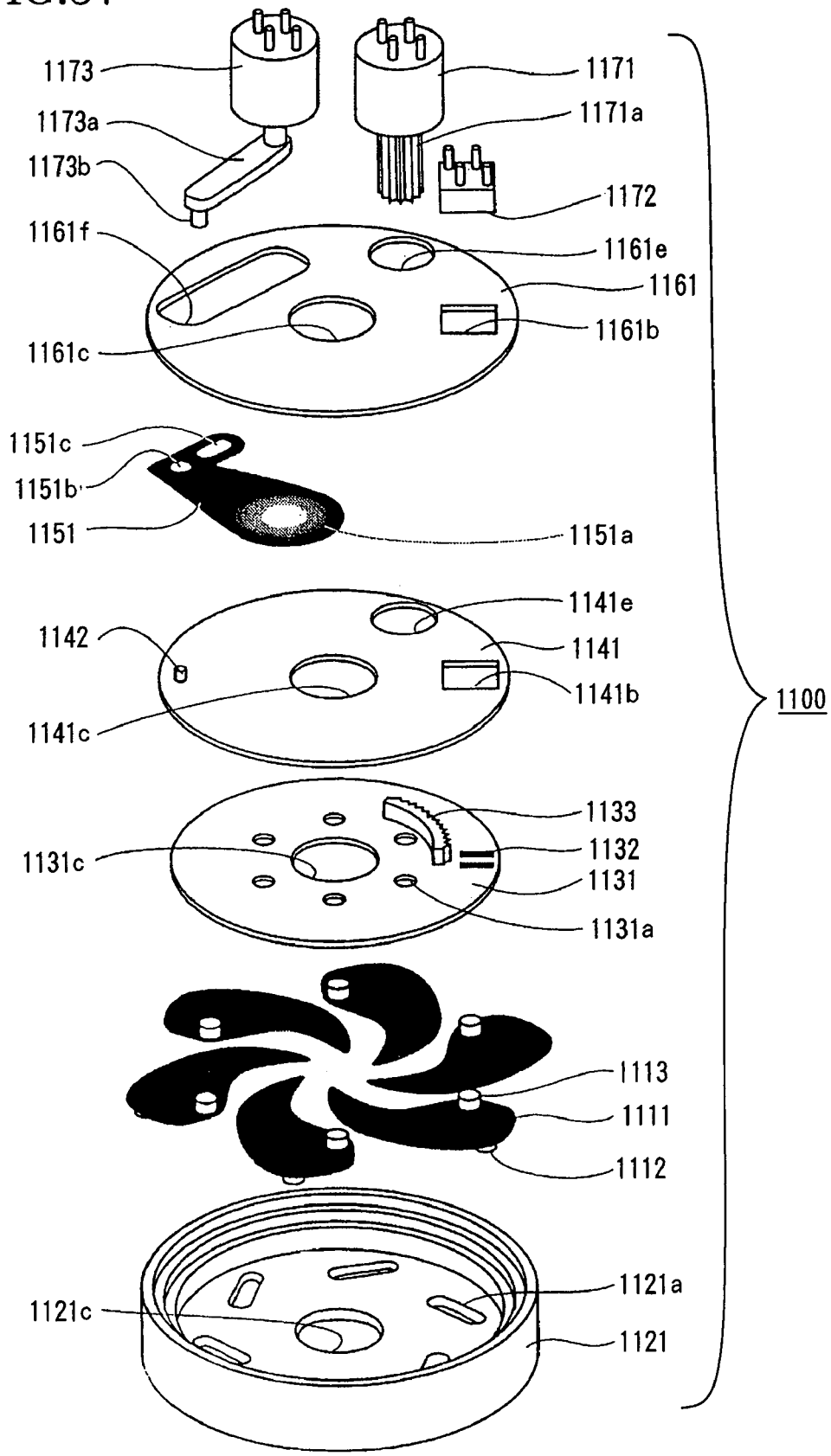
FIG. 37 is an exploded perspective view of a light amount adjusting apparatus according to Embodiment 5 of the present invention.

FIG. 37 is an exploded perspective view illustrating a structure of a light amount adjusting apparatus 1100, which incorporates an apodization filter according to the present invention. In FIG. 37, reference numeral 1111 denotes diaphragm blades having a property of blocking light across their entire region. Driven pins 1112 and 1113 are arranged upright on a lower and an upper surface of the diaphragm blades 1111. Six diaphragm blades 1111 of the same shape are used, forming a diaphragm aperture. It should be noted that a larger the number of diaphragm blades 1111 is, the closer a shape of an aperture becomes to being circular when the diaphragm blades 1111 are constricted, improving a naturalness of the blurred image and easing a diffraction phenomenon due to vertices of the polygonal aperture, but a larger number of blades also incurs greater manufacturing costs. Consequently, in the present diaphragm mechanism, it is preferable that a number of diaphragm blades is 5 to 9. In this embodiment, six diaphragm blades are used, as shown in FIG. 37, striving for an optimum balance between optical performance and manufacturing costs.

Reference numeral 1121 denotes a bottom plate holding the diaphragm blades 1111, which is provided, in the middle of a planar bottom surface, with an aperture 1121c limiting a maximum diameter of a light flux when the diaphragm blades are spread open. Six cam grooves 1121a are provided around this aperture 1121c. The pins 1112 of the diaphragm blades 1111 engage these cam grooves 1121a and can be moved through them in a sliding manner. The six cam grooves 1121a all have the same shape and are arranged at intervals of 60° around the aperture 1121c.

Reference numeral 1131 denotes a driving member also referred to as "windmill wheel," which is provided with six holes 1131a for driving the diaphragm blades arranged at equal intervals around an aperture 1131c in the center. The pins 1113 of the diaphragm blades 1111 engage these holes 1131a in a rotatable manner. Accordingly, when the windmill wheel 1131 is turned in counterclockwise direction, the six diaphragm blades 1111 are driven by the driven pins 1113 on the upper side, but at the same time the driven pins 1112 on the lower side slide under the restriction of the cam grooves 1121a, so that the diaphragm blades 1111 are constricted from an open state to a minimum aperture value. When the windmill wheel 1131 is turned back in clockwise direction, then the diaphragm blades 1111 are restored from their minimum aperture value to their open state. Furthermore, a mark (an index) 1132 for detecting an initial position of the windmill wheel as well as a driven gear 1133 are provided on the upper surface of the windmill wheel 1131.

Reference numeral 1141 denotes a partition plate. A predetermined space is formed between the partition plate 1141 and the bottom plate 1121, and the diaphragm blades 1111 and the windmill wheel 1131 are accommodated in this space. An aperture 1141c for transmitting light flux is provided in the middle of the partition plate 1141. A rotation support shaft 1142 of an apodization filter (explained below) is arranged upright next to the aperture 1141c. The partition plate 1141 is further provided with a phase detection window 1141b for detecting the presence of the mark 1132 on the windmill wheel 1131 as well as an escape hole 1141e of a later-described pinion gear.

Reference numeral 1151 denotes an apodization filter made by forming a later-described apodization pattern (effective filter portion) 1151a by inkjet printing on an about 0.1 mm thick transparent resin film, such as a PET (polyethylene terephthalate) film, and provided on its base end with a bearing hole 1151b for rotational support and a long hole 1151c for driving the apodization filter. The bearing hole 1151b engages with the rotation support shaft 1142 on the partition plate 1141, rotatively supporting the filter 1151. The transmission rate distribution, that is, the optical density pattern of the effective filter portion 1151a is explained further below.

Reference numeral 1161 denotes a cover plate. A predetermined space is formed between this cover plate 1161 and the partition plate 1141, and the apodization filter 1151 is accommodated in this space. An aperture 1161c for transmitting light flux is provided in the middle of the cover plate 1161. The cover plate 1161 is further provided with a detection window 1161b for detecting the presence of the mark 1132 on the windmill wheel 1131 as well as an escape hole 1161f of a later-described driving lever.

Reference numeral 1171 denotes a stepper motor for driving the windmill wheel 1131. A pinion gear 1171a of the stepper motor 1171 passes through the holes 1161e and 1141e, and a front end portion (lower portion) of the gear 1171a meshes with the gear 1133 provided on the windmill wheel 1131. Reference numeral 1172 denotes an optical position detection unit having a light projector element and a photodetector element, and detecting light that has been reflected from the upper surface of the windmill wheel 1131. The optical position detection unit 1172 is configured such that when the mark 1132 is arranged in opposition directly below the position detection unit 1172, then a predetermined signal is output, so that it can be detected whether the phase angle of the windmill wheel 1131 has returned to the initial state.

With this structure, the stepper motor 1171 is driven to return the windmill wheel 1131 to its initial state and the diaphragm aperture is returned to the open state, while observing the output of the position detection unit 1172. By driving the stepper motor from this position in accordance with a predetermined program, the diaphragm aperture can be controlled to the desired size.

Reference numeral 1173 denotes a rotative actuator for driving the apodization filter 1151, which is a bistable actuator, which can stop stably at both ends of a rotatable range when no current is sent through it. A driving lever 1173a is fixed to the tip of an output shaft of the actuator 1173, and a driving shaft 1173b is arranged vertically on the lower surface at the front end of this driving lever 1173a. The driving shaft 1173b engages the long hole 1151c for driving the apodization filter 1151.

With this structure, by controlling the direction of the current flowing through the actuator 1173, the rotation of the driving lever 1173a is controlled, and the effective filter portion 1151a of the apodization filter 1151 can be advanced into or retracted from an optical path of the light flux transmitted through the aperture hole 1141c.

On the other side, a shutter mechanism as known in the art is arranged below the light amount adjusting apparatus 1100. In FIG. 37, a downward direction is an object side, and the upward direction is an image-forming plane side. That is to say, the image-taking light flux is transmitted through the shutter mechanism, the diaphragm mechanism, and the apodization filter in that order. In the optical apparatus to which the light amount adjusting apparatus of this embodiment is mounted, when not image-taking, the shutter mechanism is in a light flux blocking state, that is, the shutter blades are in a closed position, and the diaphragm mechanism is kept in a minimum aperture state. In this situation, the apodization filter 1151 is placed in the dark, so that a deterioration of the filter pigments due to harmful light, such as UV light, can be avoided.

Furthermore, the diaphragm blades and the apodization filter are layered in a direction of the optical axis, and are overall configured as one unit. The stepper motor 1171 for driving the diaphragm blades and the filter driving actuator 1173 are arranged next to one another in this unit, so that the apodization filter and the mechanism for driving it can be incorporated in a space that is substantially the same as in a conventional diaphragm mechanism, which contributes to the compactness of the overall apparatus.

The present embodiment is configured such that when the diaphragm mechanism is incorporated in a later-described image-forming optical system, the F number can be adjusted from F2 for the open state to F8 for the smallest aperture.

Figure 38:
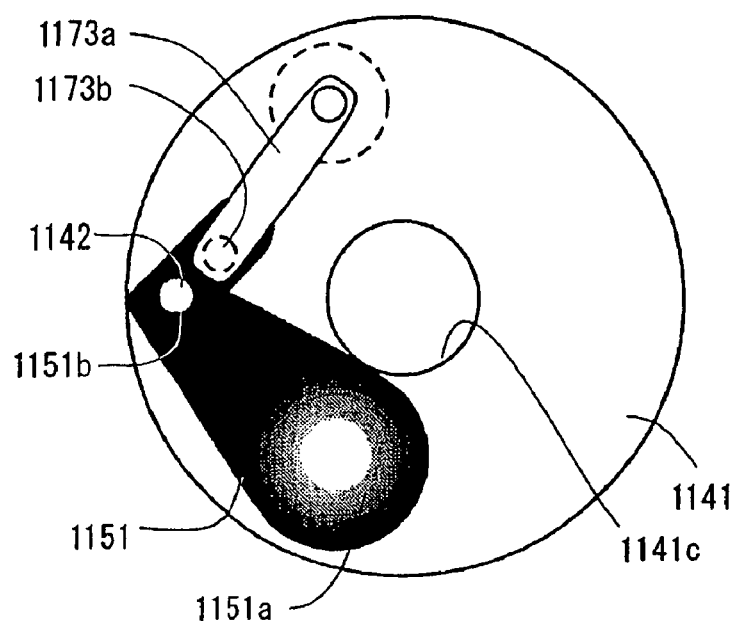
FIGS. 38(A) and 38(B) are top views of an apodization filter in Embodiment 5.
Figure 38:
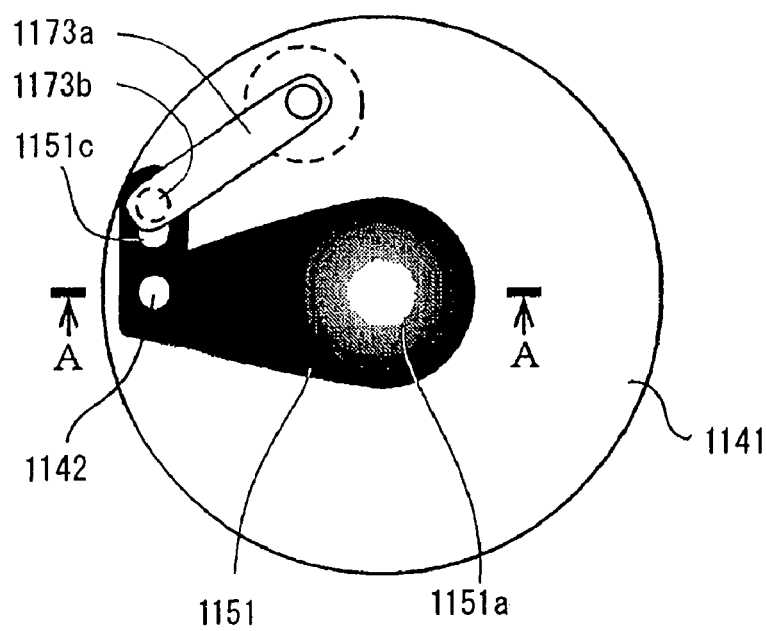

FIG. 38 is a top view illustrating the advancing/retracting operation of the apodization filter 1151. FIG. 38(A) shows a state when the filter is retracted from the light flux transmitting aperture. In FIG. 38(A), reference numeral 1141 denotes the partition plate explained in FIG. 37. The light flux transmitting aperture 1141c is arranged in the middle, and the rotation support shaft 1142 of the apodization filter is arranged at the edge portion of the partition plate 1141.

Reference numeral 1151 denotes the apodization filter (also referred to simply as "filter" below), which is provided with the bearing hole portion 1151b for rotational support, rotatably engaging the support shaft 1142. Reference numeral 1173a denotes the driving lever, which is fixed to the output shaft of the actuator 1173. The driving shaft 1173b on the lower side at the tip of the driving lever 1173a engages the driven long hole 1151c provided in the apodization filter 1151. In FIG. 38(A), the driving lever 1173a is turned in counterclockwise direction, so that the apodization filter 1151 is turned in clockwise direction, and the effective filter portion 1151a is retracted away from the light flux transmitting aperture 1141c.

Next, when a current of a predetermined direction is sent through the actuator 1173, the driving lever 1173a turns in clockwise direction. Thus, the apodization filter 1151 turns in counterclockwise direction and is advanced such that the effective filter portion 1151a covers the light flux transmitting aperture 1141c, resulting in the state shown in FIG. 38(B). And when the current sent through the actuator 1173 is inverted, also the apodization filter 1151 is inverted, and returns to the state shown in FIG. 38(A). By using the bistable actuator 1173, the apodization filter 1151 can be kept stably in both the states shown in FIG. 38(A) and FIG. 38(B) when the current is stopped.

The following is an explanation of the optical characteristics of the apodization filter 1151. The optical absorption capability of the apodization filter differs depending on a position on its effective region, but the spectral transmission rate in the visible light spectrum is substantially uniform at any position within the effective region. Ordinarily, an optical density or a transmission rate is used as an index for expressing the optical characteristics of such a filter. An optical density (OD) and a transmission rate Tr (%) are related by the following equation:

$$Tr=100\times10^{(-OD)} \quad \text{(Eq. 1)}$$

$$OD=-\text{Log}_{10}(Tr/100) \quad \text{(Eq. 2)}$$

Figure 39:
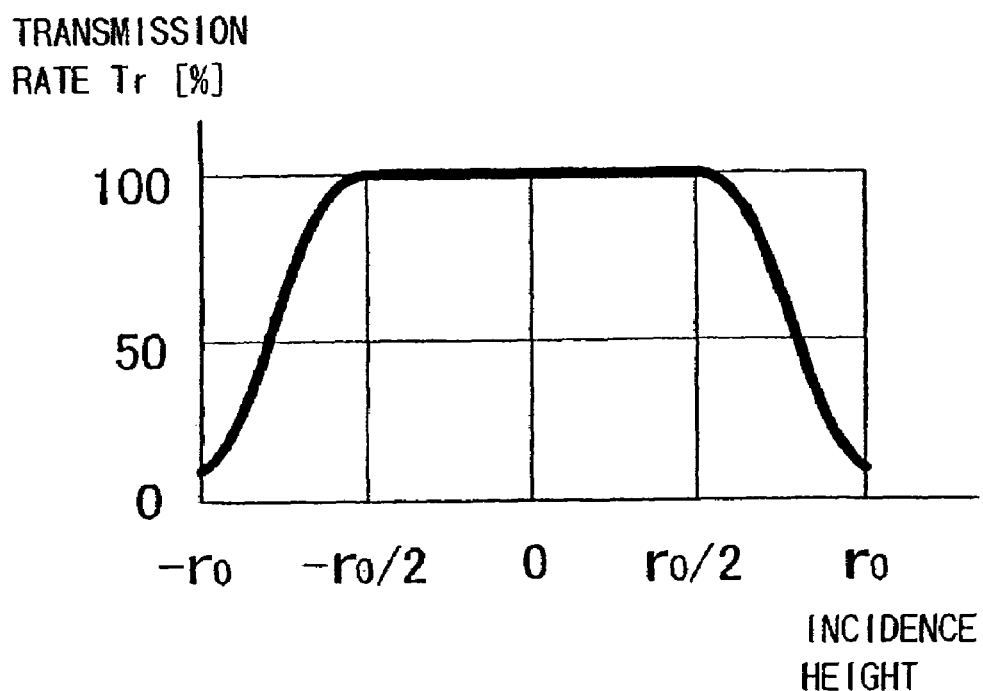
FIG. 39(A) shows a transmission rate distribution of an apodization filter in Embodiment 5.
FIG. 39(B) shows an optical density distribution of an apodization filter in Embodiment 5.
Figure 39:
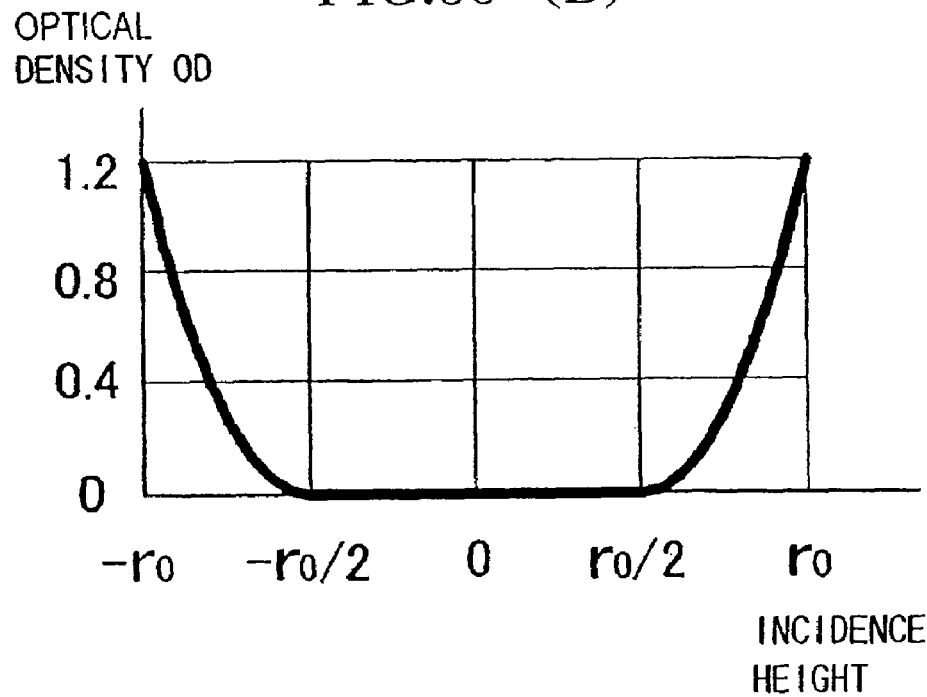

FIG. 39 shows graphs illustrating pattern characteristics of the effective filter portion 1151a of the apodization filter 1151 according to the present embodiment. FIG. 39(A) shows a transmission rate distribution. The horizontal axis in FIG. 39(A) is a light ray incidence height on the filter, that is, the distance from the center of the filter, with r0 being an effective radius of the filter. The vertical axis in FIG. 39(A) is a transmission rate Tr (%). FIG. 39(B) shows an optical density (OD). The horizontal axis in FIG. 39(B) similarly is an incidence height, and the vertical axis is an optical density.

In the present embodiment, as shown in FIG. 39(A), the transmission rate Tr(r) for the range of incidence heights r from zero to r0/2 is transparent, leading to the following equation:

$$Tr(r)=100\% \quad \text{(Eq. 3b)}$$

In the range of incidence heights r from r0/2 to r0, the following equation is satisfied:

$$Tr(r)=100\times\exp(\alpha\times(r-r0/2)\times(r-r0/2)) \quad \text{(Eq. 3c)}$$

Here, α represents a predetermined negative factor, and Eq. 3c is the equation for a Gauss distribution. That is to say, the center portion of the apodization filter is transparent with a constant transmission rate, and in the region outside of that region, the transmission rate gradually decreases. The transmission rate distribution in the angular direction with respect to the center is a constant isotropic pattern. The optical density distribution calculated by substituting Eq. 3b and Eq. 3c in Eq. 2 is shown in FIG. 39(B).

FIG. 40 is a diagram illustrating the structure of the apodization filter 1151, and is a cross-sectional view taken along A—A in FIG. 38(B). Reference numeral 1151e denotes a PET film serving as a transparent substrate. An ink-accepting layer 1151f is applied to the upper surface of the PET film 1151e. A dye-based coloring material having a low dispersion and a flat spectral transmission rate in the visible light spectrum is ejected onto the ink-accepting layer 1151f by a micro-drop ejecting apparatus, namely a so-called inkjet recording apparatus, thus forming an effective filter portion 1151a with a diameter of 2r0. As noted above, the effective filter portion 1151a has a constant optical density (transparent in the present embodiment) in the range up to a diameter r0 from the middle, and outside that region, the optical density changes continually. On the other hand, in regions of the ink-accepting layer outside the effective filter portion 1151a, a light-blocking portion 1151j is formed by, for example, a pigment-based coloring material having a higher optical density than the dye-based coloring material. Then, a flattening layer 1151g is applied, and the irregularities in the surface of the ink-accepting layer occurring due to the printing process are flattened out. Furthermore, anti-reflective layers 1151h and 1151i are formed by vapor deposition on the upper surface of the flattening layer 1151g and the lower surface of the transparent substrate 1151e by vapor deposition method. With this process, a large number of apodization filters are formed on the transparent substrate 1151e of large surface area, and when separating them by punching into individual filters in a final pressing step, the bearing hole portion 1152 for rotational driving is also punched out at the same time, thus obtaining the filter 1151. It should be noted that details regarding the materials for the various layers, the application process and the drying process are described in Japanese Patent Application No. 2002-041634 by the applicant of the present application.

For the process of manufacturing the apodization filter according to the present invention, the above-described process is preferable, but there is no limitation to this. For example, it is also possible to fabricate by inkjet printing process only the portion of the filter through which the light flux is transmitted, then separate this portion by punching, and attach it to a holding lever made of a metal thin sheet. Moreover, it is also possible to continually change the film thickness of an optically absorbing thin film of titanium oxide or the like by using a vacuum deposition apparatus.

FIG. 41 shows an image-taking apparatus to which the light amount adjusting apparatus 1100 shown in FIGS. 37 to 40 has been mounted. In the present embodiment, a digital camera is taken as an example of the image-taking apparatus, which photoelectrically converts an optical image with an image-pickup device into electrical signals, and records still images or moving images as digital data. This image-taking apparatus is provided with a TTL (through the lens) finder used in single-lens reflex cameras as a finder mechanism for confirming the object field to be taken.

Reference numeral 1400 denotes an image-forming optical system made of a plurality of lens units, including a front lens unit 1401, a variator lens unit 1402, and a focus lens unit 1403. The optical specifications of the image-forming optical system according to the present embodiment are a focal length of 35–200 in terms of a camera using a 35 mm film, and an open F number of 2. Reference numeral 1100 denotes the light amount adjusting apparatus shown in FIG. 37, which is arranged inside an image-forming optical system 1400 at a predetermined position of the image-forming optical system, that is, such that the light flux transmitting aperture 1141c is positioned near the exit pupil, as explained below.

A half-transparent main mirror 1411 and a fully reflective submirror 1412 are arranged behind the image-forming optical system 1400. 70% of the image-taking light flux are reflected upwards by the main mirror 1411, and a viewfinder image is formed on a finder screen 1413. The viewfinder image is converted into an upright image by a pentaprism 1414, and guided to the camera operator's eye via an eyepiece 1415. The remaining 30% of the image-forming light flux are reflected downward by the submirror 1412 after passing through the main mirror 1411, and are guided to a later-described focus detection unit 1450. The main mirror 1411 and the submirror 1412 are configured such that they can be retracted from the image-taking light path by a quick-return mechanism as known in the art.

A focal plane shutter 1416 as known in the art and an optical low-pass filter 1404 are arranged behind the submirror 1412. Behind the optical low-pass filter 1404, an image-pickup device 1440 is arranged at the focus position (expected image surface) of the image-forming optical system 1400. For this, a photoelectrical conversion system, such as a two-dimensional CCD is used, which is made of a plurality of photoelectrical conversion sections converting irradiated optical energy into charges, a charge accumulation section accumulating these charges, and a charge transfer section transferring these charges to the outside. In the present embodiment, a CCD sensor with 3 million pixels is used.

The image of the object that is formed on the image-pickup device 1440 is converted into an electrical signal with a charge amount at each pixel that corresponds to the brightness of the image at that pixel. After the electrical signal has been amplified by an amplification circuit 1441, it is subjected to a predetermined γ-correction process or the like with an image signal processing circuit 1442. This process may also be performed as a digital signal process after A/D conversion. The thusly produced image signal is stored in a memory 1443. The memory 1443 may be a semiconductor memory such as a flash ROM, an optical memory such as an optomagnetic disk, or a magnetic memory such as a magnetic tape or the like.

Reference numeral 1421 denotes a display device, such as a liquid crystal display, which displays an object that is picked up with the image-pickup device 1440 and information relating to the operating condition and the image-taking condition of the optical apparatus. Reference numeral 1422 denotes a control (operation) switch unit made of a zoom switch, an image-taking preparation switch, an image-taking start switch, an image-taking mode selection switch for selecting either a still-image mode or a moving-image mode, and an image-taking condition switch for setting an exposure control mode or an AF mode. Reference numeral 1423 denotes a zoom actuator, which drives the zoom lens unit 1402 and changes a focus length of the image-forming optical system 1400. Reference numeral 1424 denotes a focus actuator, which drives the focus lens unit 1403 and adjusts a focus condition of the image-forming optical system 1400.

Reference numeral 1431 denotes a CPU, which controls the operation of the overall image-taking apparatus. Reference numeral 1432 denotes a filter driving circuit, which drives the advancing and retracting of the apodization filter 1151 into and out of an optical path of the light flux transmitted through the light flux aperture by controlling the current flowing through the actuator 1173 shown in FIG. 37. Reference numeral 1433 denotes a diaphragm driving circuit, which drives the stepper motor 1171 while monitoring the output of the optical position detection unit 1172 shown in FIG. 37. Thus, the diaphragm driving circuit 1433 adjusts the rotation angle of the windmill wheel 1131 and controls the F number to a desired value. Reference numeral 1434 denotes a shutter driving circuit, which drives the shutter 1416 and controls an exposure time for the image-pickup device 1440. Reference numeral 1436 denotes an AF sensor driving circuit of the focus detection unit 1450. The AF sensor driving circuit 1436 photoelectrically converts an object image for focus detection with an AF sensor, and sends a corresponding signal via the focus detection unit 1450 to the CPU 1431.

FIG. 41 shows an embodiment in which the image-forming optical system 1400 and the image-pickup system including for example the image-pickup device are formed in an integrated manner, but it is also possible to make the image-forming optical system incorporating the light amount adjusting apparatus freely mountable/removable with respect to the image-pickup system. That is to say, a structure as that of a single-lens reflex camera system with exchangeable lens, in which an optical apparatus including the image-forming optical system and an image-pickup device including the image-pickup system can be separated from one another is also possible.

Figure 42:
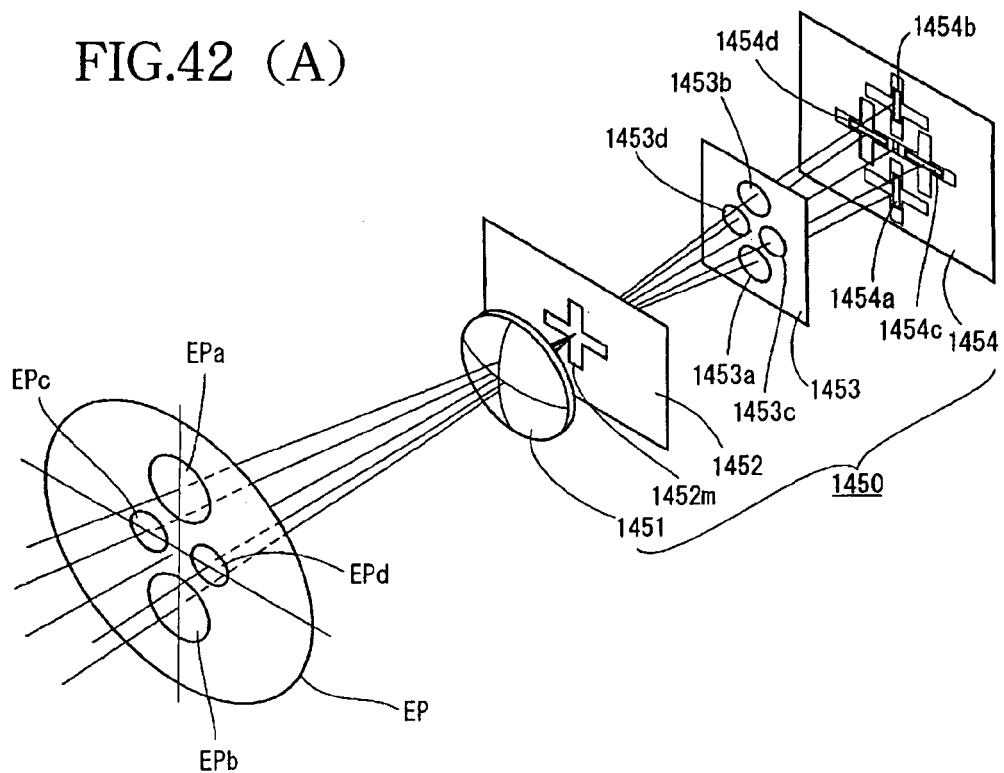
FIGS. 42(A) and 42(B) illustrate a principle of focus detection method by phase difference detection in Embodiment 5.
Figure 42:
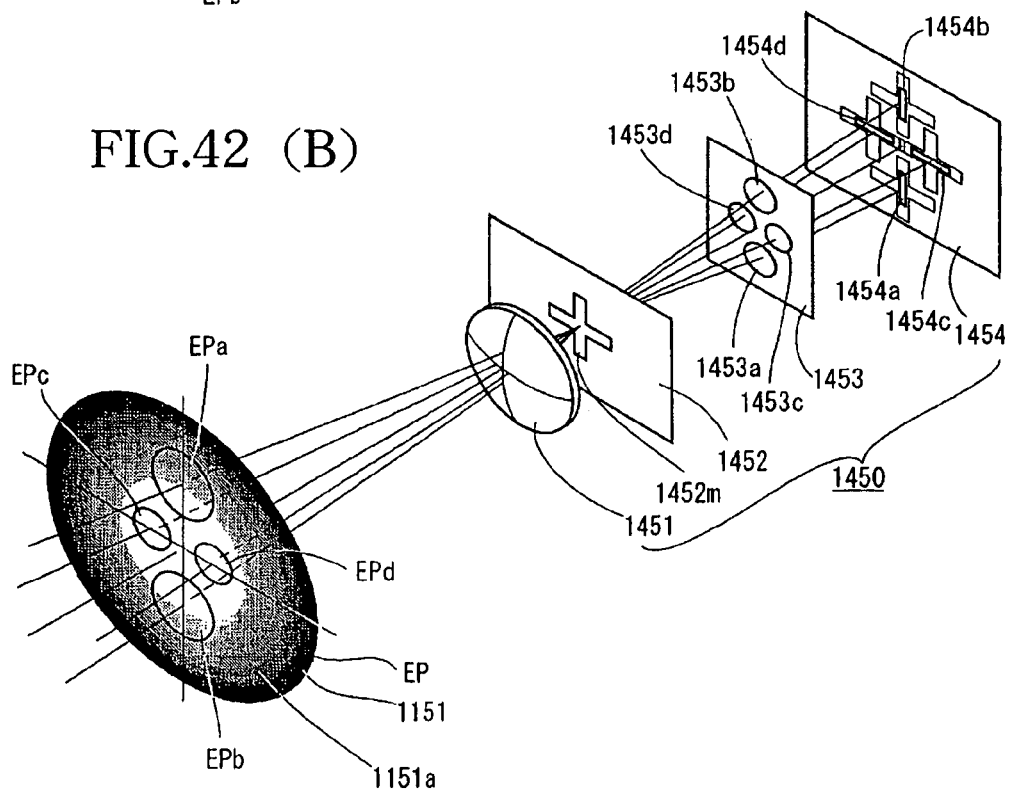

FIG. 42 shows a perspective view showing the structure of the focus detection unit 1450 incorporated in the image-taking apparatus of FIG. 41, and illustrating a focus detection principle. FIG. 42(A) shows the case that the apodization filter 1151 is retracted from the image-taking light path, whereas FIG. 42(B) shows the case that the apodization filter 1151 is advanced into the image-taking light path.

The main members constituting the focus detection unit 1450 are a field lens 1451, a field mask 1452, a secondary image-forming lens 1453, and an AF sensor 1454. The focus detection unit 1450 is arranged at a predetermined position below the submirror 1412, such that the field lens 1451 is arranged near the expected image surface (primary image surface) of the image-forming optical system 1400. Moreover, EP denotes an exit pupil of the image-forming optical system 1400. In the present embodiment, the light amount adjusting apparatus 1100 is arranged within the image-forming optical system 1400, such that the light flux aperture 1141c illustrated in FIG. 37 is positioned near this exit pupil.

The following is a description of the structure of the focus detection unit 1450. The field mask 1452 is provided with a cross-shaped aperture 1452m that regulates the focus detection region. The AF sensor 1454 is made of a total of four line sensors, namely a pair of line sensors 1454a and 1454b that are arranged one above the other in vertical direction, and a pair of line sensors 1454c and 1454d that are arranged next to each other in horizontal direction. These line sensors are line CCDs in which several dozen pixels of light-receiving sections of very small size are lined up in one line. The secondary image-forming lens 1453 is constituted by a total of four lenses, namely a pair of lenses 1453a and 1453b that are arranged one above the other in vertical direction, and a pair of lenses 1453c and 1453d that are arranged next to each other in horizontal direction. The aperture 1452m of the field mask 1452 is imaged via the four secondary image-forming lenses 1453a to 1453d as four aperture images onto the light-receiving surface of the AF sensor. That is to say, the field mask 1452 and the AF sensor 1454 are at optically conjugated positions with respect to the secondary image-forming lens 1453.

On the other hand, the incident aperture portion of each of the lenses of the secondary image-forming lens 1453 is imaged via the field lens 1451 as four aperture images (these regions are labeled the exit pupil regions EPa to EPd) onto the exit pupil EP of the image-forming optical system. That is to say, the secondary image-forming lens 1453 and the exit pupil EP of the image-forming optical system are at optically conjugated positions with respect to the field lens 1451.

In this structure, the light flux transmitted through the exit pupil regions EPa and EPb of the image-forming optical system is transmitted through the field lens 1451 arranged near the primary image-forming surface and is imaged onto the aperture 1452m of the field mask 1452. The light flux that has been transmitted through the aperture 1452m then starts to diverge, but is again converged by the secondary image-forming lenses 1453a and 1453b and again imaged as an image for focus detection onto the line sensors 1454a and 1454b on the AF sensor 1454. Then, the focus condition of the object image on the primary image-forming surface can be detected by calculating the relative distance in vertical direction between the images formed on the two line sensors 1454a and 1454b by a method as known in the art.

Similarly, the light flux that has been transmitted through the other exit pupil regions EPc and EPd of the image-forming optical system is transmitted through the field lens 1451 and the aperture 1452m, and is again imaged via the secondary image-forming lenses 1453c and 1453d onto the line sensors 1454c and 1454d. Then, the focus condition of the object image on the primary image-forming surface can be detected by calculating the relative distance in horizontal direction between the images formed on the two line sensors 1454c and 1454d by a method as known in the art. This focus detection method is known as focus detection by phase-difference detection method. With this detection method, a detection error occurs when the focus detection light flux is eclipsed at the aperture stop or the lens barrel of the image-forming optical system, so that the dimensions and optical parameters of the members in the focus detection unit are determined while giving sufficient consideration to the diameter of the exit pupil in the image-forming optical system and its position on the optical axis.

In the present embodiment, an open F number of the image-forming optical system is F2.0, so that the exit pupil EP can be regarded as an image-taking light flux transmitting region for the case of an aperture value of F2.0. The pair of exit pupil regions EPa and EPb are arranged within the light flux transmitting region for an aperture value of F2.8. Moreover, the other pair of regions EPc and EPd are arranged within the light flux transmitting region for an aperture value of F5.6. Accordingly, if the aperture value of the image-forming optical system is F2.8 or brighter than that, then a focus detection using all of the AF sensors 1454a to 1454d is possible. And if the aperture value of the image-forming optical system is between F2.8 and F5.6, then a focus detection using only the AF sensors 1454c and 1454d is possible. That is to say, when the F number of the image-taking optical system is bright (that is, when the F number is small), then the depth of field of the object is small, so that a focus detection with high precision is necessary. Accordingly, in this case, the focus detection is performed using preferentially the focus detection optical system with the longer base length. And when the F number of the image-taking optical system is dark (that is, when the F number is large), then the focus detection light flux with the focus detection optical system having the longer base length is eclipsed, so that its use is prohibited, and the focus detection is performed using the focus detection optical system having the shorter base length (if there are even more image-forming optical systems, then the image-forming optical system with the longest base length in a range in which the focus detection light flux is not partially attenuated is used).

In the present embodiment, the open F number of the image-forming optical system is constantly at F2.0 regardless of the focal length, so that if the focus detection is performed with open aperture and without using the apodization filter, then the focus detection can be performed using two pairs of focus detection optical systems, as shown in FIG. 42(A).

On the other hand, if the apodization filter is used, then the apodization filter 1151 is advanced into the exit pupil position of the image-forming optical system, as shown in FIG. 42(B). Here, the transmission rate distribution of the apodization filter 1151 is such that the region from the center to r0/2 is transparent, and outside thereof the optical density gradually increases, as illustrated in FIG. 39. That is to say, in the region that is brighter than an aperture value of F4.0, the transmission rate varies with the location. Consequently, a portion of the light flux is attenuated by the filter in the case of a focus detection optical system having a long base length, and a focus detection error occurs. Addressing this problem, an accurate focus detection becomes possible by using only a detection optical system with a short base length, in which there is no eclipsing by the apodization filter.

FIGS. 43 to 48 illustrate the image-taking control flow of the image-taking apparatus shown in FIG. 41. First, the image-taking modes provided in this image-taking apparatus are explained with reference to FIG. 43.

In still-cameras and video-cameras, a plurality of image-taking modes are prearranged, and ordinarily, the camera operator can select the desired image-taking mode with a control switch. When the desired image-taking mode is selected, the exposure control mode, AF mode, driving mode (continuous shooting/single shot) and photographic sensitivity distribution and the like that are suitable for that mode are set automatically. Accordingly, in this embodiment, the apodization filter 1151 is driven in accordance with the selected image-taking mode.

FIG. 43 is a table illustrating the exposure-control modes with which the image-taking apparatus of the above-described structure is provided. The names of the image-taking modes are listed on the left side, whereas the exposure control, apodization filter control, finder and AF control modes for those image-taking modes are listed in the middle and on the right side.

The camera operator first selects the still-picture mode or the moving-picture mode using the still-picture/moving-picture selection switch, which is one of the control switches in the control switch unit 1422 of the image-taking apparatus in FIG. 41. Subsequently, the desired image-taking mode is selected from (1) to (16) using the image-taking mode selection switch. Thus, the image-taking apparatus selects and executes the "exposure control mode," the "filter mode," the "finder mode," and the "AF mode" listed in FIG. 43, in order to attain the photographic effects in accordance with the photo-shooting circumstances of those modes. In this embodiment, not much weight is given to the photographic effect of the blurred background in the image-taking modes (1) to (3) for still-picture image-taking, so that the apodization filter 1151 is forcibly retracted and not used. As for the viewfinder, in order to use an optical viewfinder without response delays for moving objects is used, the main mirror and the submirror are advanced into the image-taking light path, and the object can be observed with the optical viewfinder through the eyepiece lens. For the AF mode, a phase difference detection AF with excellent response characteristics is used. For this, the apodization filter 1151 is retracted, so that the exit pupil of the image-forming optical system is transparent across its entire region, and a phase difference detection optical system corresponding to F2.8 with a long base length is used. In the sports mode (3), a servo AF mode is used which is suitable for taking moving objects, that is, a control mode in which the focus adjustment is continued after the in-focus position has been found. On the other hand, in the modes (1) and (2), a one-shot AF mode is used which is suitable for still objects, that is, a control mode in which AF is not performed again after the in-focus position has been found, even if the in-focus position of the object has changed.

The image-taking modes (4) and (5) are modes in which the photographic effect of a blurred background is given much weight, so that the apodization filter 1151 is forcibly inserted. Thus, the camera operator is relieved of the effort of having to manually insert the filter, and it can be avoided that the camera operator forgets to insert the filter or misses a good photo opportunity due to being distracted while having to insert the filter. For the AF mode, contrast detection method is used, which has slower responsiveness, but better precision. Contrast detection method is a focus adjustment control also known as "hill-climbing servo AF", in which the focus position at which the high-frequency components of the image signal become maximal is searched, and the lens is stopped at this position. In this mode, the contrast of the image formed on the image-pickup device 1440 is detected without using the focus detection unit 1450. That is to say, contrast detection method is characterized in that, since the image-pickup device is identical with the AF sensor, a focus detection with a high focus detection precision and at any F number without limitations due to the aperture stop becomes possible, and focus detection is also possible when a special filter, such as an apodization filter, is inserted. On the other hand, the direction and the amount by which the focus is off is not known, so that the responsiveness is poorer than with phase difference detection method.

An electronic viewfinder is used as the viewfinder. That is to say, the main mirror and the submirror are retracted from the image-taking light path, the focal plane shutter is open, and an optical image is constantly formed on the image-pickup device 1440. Consequently, the light flux toward the optical viewfinder is blocked and the image signals captured with the image-pickup device are displayed as a preview image on the display device 1421.

In the image-taking modes (6) to (9), the degree of freedom for exposure adjustment and photographic effects is raised, so that the camera operator can select freely whether or not to use the apodization filter. As the viewfinder, an optical viewfinder exhibiting no response delays with respect to moving objects is used. Phase difference detection one-shot AF is used for the AF. However, if the camera operator has selected the use of the apodization filter, then a phase difference detection optical system corresponding to F5.6 with a short base length is used in order to prevent focus detection errors due to this filter. On the other hand, if the camera operator has selected not to use the apodization filter, then a phase difference detection optical system corresponding to F2.8 with a long base length is used.

Also during moving-picture image taking, the various modes are set such that the same photographic effects as for still-picture image taking are attained, and whether the apodization filter is used or not is set as shown in FIG. 43. Moreover, in the moving-picture mode, the electronic viewfinder is always used as the viewfinder and AF by contrast detection method is used, in order to allow continuous viewfinder observation.

FIGS. 44 to 48 are control flowcharts of the image-taking apparatus according to the present embodiment. First, the main control flow during image-taking is explained with reference to FIG. 44.

After Step S1101, at Step S1102, it is discriminated whether the main switch has been turned on by the camera operator, and if it has not been turned on, the procedure remains at Step S1102. If it is judged at Step S1102 that the main switch has been turned on, then the CPU 1431 is awakened from the sleep mode, and the Steps S1103 and onward are executed.

At Step S1103, the image-taking apparatus is initialized. More specifically, after the image-forming optical system has been reeled out from the collapsed state to the image-taking enabled state, the apodization filter 1151 in the light amount adjusting apparatus 1100 is reset to its retracted position and the windmill wheel for driving the diaphragm blades is reset to the diaphragm open position. At Step S1104, a selection of an image-taking mode determining whether still-picture image-taking or moving-picture image-taking is carried out is received. At Step S1105, a selection of the image-taking modes corresponding to (1) to (16) in FIG. 43 is received. At Step S1106, detailed settings of the various image-taking conditions, such as single shot/continuous shooting mode, white balance mode, picture size for still-picture image-taking etc. are received. Moreover, if the control mode of the apodization filter is the manual selection mode, then the settings for usage of the apodization filter are also received.

At Step S1107, the moving-picture/still-picture mode set at Step S1104 is discriminated. In case of the moving-picture image-taking mode, the procedure advances to the moving-picture image-taking subroutine of Step S1111, whereas in case of the still-picture image-taking mode, the procedure advances to the still-picture image-taking subroutine of Step S1131.

Figure 45:
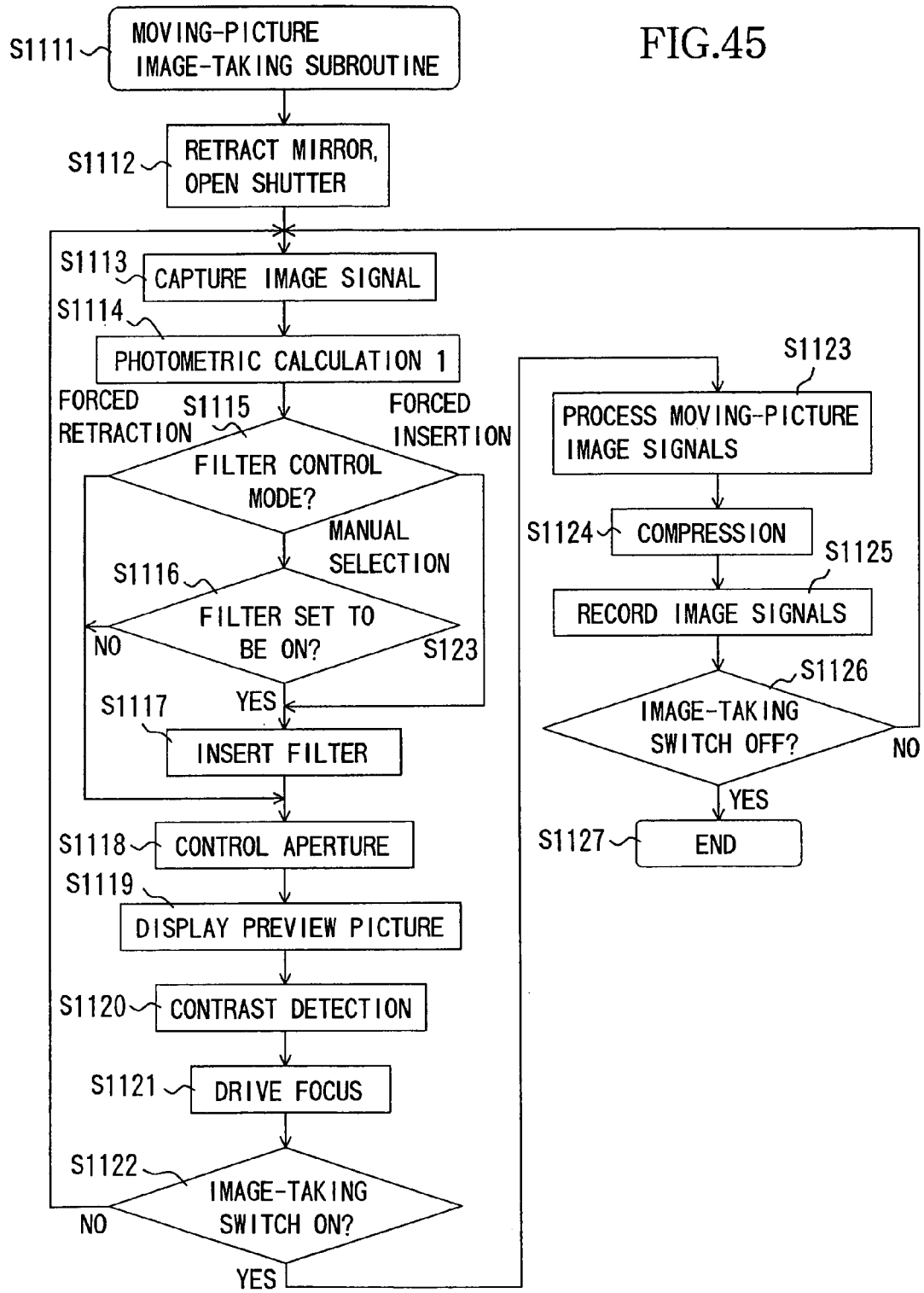
FIG. 45 is a flowchart showing a moving-picture image-taking subroutine in Embodiment 5.

FIG. 45 is a flowchart of the subroutine for moving-picture image-taking, and shows the control flow for the case that the main flow in FIG. 44 has branched off to Step S1111. After Step S1111, at Step S1112, the main mirror and the sub mirror are retracted out of the image-taking light flux, the focal plane shutter 1416 is opened, and an object image is formed on the image-pickup device 1440. At Step S1113, an image signal is obtained with the image-pickup device 1440, and a predetermined image process is performed by the image signal processing circuit 1442. At Step S1113, a first photometric calculation is carried out. This is a photometric calculation for moving-picture image-taking, which calculates the brightness of the object using the maximum value, the minimum value and the average value of the image signal obtained at Step S1112. Then, using predetermined equations relating to the exposure control, the diaphragm control value of the light amount adjusting apparatus 1100 is calculated. For this, the characteristics relating to the dimming step number of the apodization filter 1151 illustrated in FIG. 39 are stored in a ROM of the CPU 1431, so that during usage of the apodization filter, these characteristics are looked up, and the appropriate diaphragm control value is calculated.

At Step S1115, the control mode (filter mode) of the apodization filter 1151 that was set in the main routine of FIG. 44 is discriminated. When this filter mode is the forced retraction mode, then the procedure advances to Step S1118 without driving the filter. When this control mode is the forced insertion mode, then the procedure advances to Step S1117, the apodization filter 1151 is advanced into the optical path of the light flux transmitted through the light flux aperture, and then the procedure advances to Step S1118. When the filter mode is the manual selection mode, then the procedure advances to Step S1116, and then the procedure advances to Step S1117 or Step S1118, depending on the filter usage settings selected by the camera operator at Step S1106 in FIG. 44. That is to say, if use of the filter has been selected by the camera operator, then the procedure advances to Step S1117, and the filter is inserted at Step S1117. And if the camera operator has selected not to use the filter, then the procedure advances to Step S1118.

At Step S1118, the aperture control is carried out. More specifically, the stepper motor 1171 of FIG. 37 is driven by a predetermined amount, and the windmill wheel rotation angle is controlled such that a predetermined F number is attained. At Step S1119, the image signal obtained at Step S1113 is converted into a preview picture, which is displayed on the display device 1421. At Step S1120 and Step S1121, a focus adjustment of the image-forming optical system 1400 is performed. The focus adjustment is performed by a technique known as "hill-climbing servo AF", in which the focus position at which the high-frequency components of the image signal become maximal is searched, and the lens is stopped at this position.

At Step S1122, it is discriminated whether the camera operator has turned on the image-taking switch for moving-picture image-taking. If the image-taking switch is not turned on, then the procedure returns to Step S1113, and the light amount adjustment control, the focus adjustment control and the preview picture display are performed again. If it is determined at Step S1122 that the image-taking switch has been turned on, then the procedure advances from Step S1122 to Step S1123. After the image signal obtained with the image-pickup device 1440 has been miniaturized at Step S1123 to 300,000 pixels, which is the pixel number of images for moving-picture recording, image processing for moving images is carried out. At Step S1124, an image compression for moving-picture recording is carried out, and at Step S1125, the compressed image signal is recorded in the memory 1443.

At Step S1126, it is discriminated whether the camera operator has turned off the image-taking switch. If it has not been turned off, then the procedure returns to Step S1113, and the light amount adjustment control, the focus adjustment control, the preview picture display, and the recording of the moving images into the memory are performed again. If it is determined at Step S1126 that the image-taking switch has been turned off, then the image-taking is terminated at Step S1127.

Figure 46:
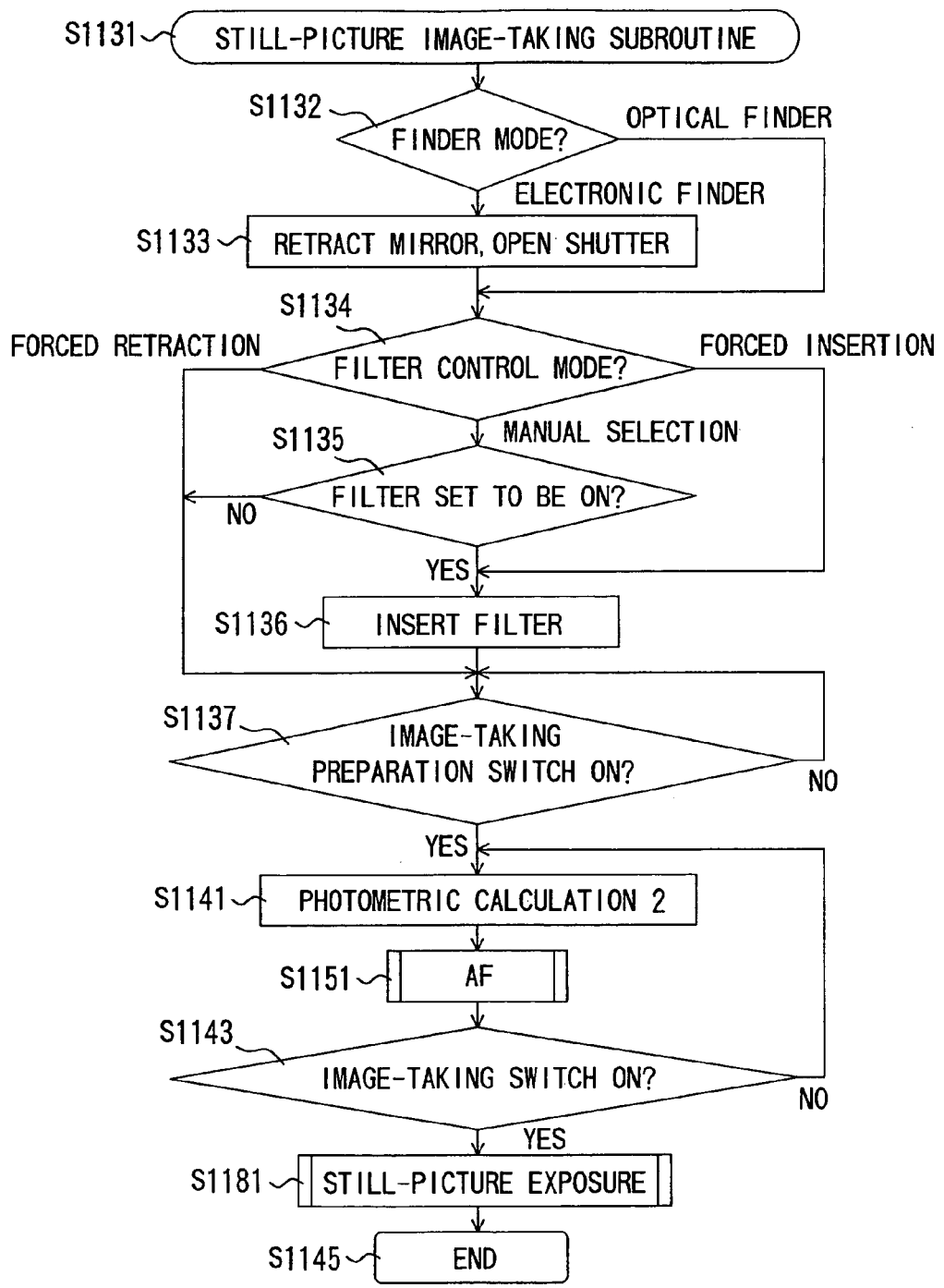
FIG. 46 is a flowchart showing a still-picture image-taking subroutine in Embodiment 5.

FIG. 46 is a flowchart of the subroutine for still-picture image-taking, and shows the control flow for the case that the procedure has branched off to Step S1131 in the main flow of FIG. 44. After Step S1131, at Step S1132, the finder mode is discriminated. If it is the electronic finder mode, then the main mirror and the submirror are retracted from the image-taking light flux at Step S1133, the focal plane shutter 1416 is opened, and an object image is formed on the image-pickup device 1440. On the other hand, if it is the optical finder mode, then the procedure jumps to Step S1134 without executing through Step S1133.

At Step S1134, the control mode (filter mode) of the apodization filter 1151 that was set in the main routine of FIG. 44 is discriminated. When this filter mode is the forced retraction mode, then the procedure advances to Step S1137 without driving the filter. When the filter mode is the forced insertion mode, then the procedure advances to Step S1136, the apodization filter 1151 is advanced into the optical path of the light flux transmitted through the light flux aperture, and then the procedure advances to Step S1137. When the filter mode is the manual selection mode, then the procedure advances to Step S1135, and then the procedure advances to Step S1136 or Step S1137, depending on the filter usage settings selected by the camera operator at Step S1106 in FIG. 44. That is to say, if use of the filter has been selected by the camera operator, then the filter is inserted at Step S1136 and then the procedure advances to Step S1137. And if the camera operator has selected not to use the filter, then the procedure advances to Step S1137.

At Step S1137, it is discriminated whether the camera operator has turned on the image-taking preparation switch for still-picture image-taking. If the image-taking preparation switch is not turned on, then the procedure remains at this step, and stands by until the image-taking preparation switch is turned on. If it is determined at Step S1137 that the image-taking preparation switch has been turned on, then the procedure advances from Step S1137 to Step S1141.

At Step S1141, a second photometric calculation is carried out. This is a photometric calculation for still-picture image-taking, which calculates the brightness of the object using the maximum value, the minimum value and the average value of the image signal obtained immediately before Step S1141. Then, using predetermined equations relating to the exposure control, the diaphragm control value of the light amount adjusting apparatus 1100 is calculated. Also for this, when using the apodization filter, the characteristics relating to the dimming step number that are stored in the ROM of the CPU 1431 are looked up, and the appropriate diaphragm control value is calculated.

At Step S1151, and AF subroutine is executed, and focus adjustment control is carried out. This is explained in more detail with reference to FIG. 47.

At Step S1143, it is discriminated whether the camera operator has turned on the image-taking switch (exposure start switch) for still-picture image-taking. If the image-taking switch is not turned on, then the procedure returns to Step S1141, and the second photometric calculation and the AF control are carried out again. If it is determined at Step S1143 that the image-taking is turned on, then the procedure advances from Step S1143 to Step S1181. At Step S1181, the still-picture exposure subroutine for still-picture recording is executed. This is explained in more detail with reference to FIG. 48. Then, after the exposure has been finished, the control ends at Step S1145.

Figure 47:
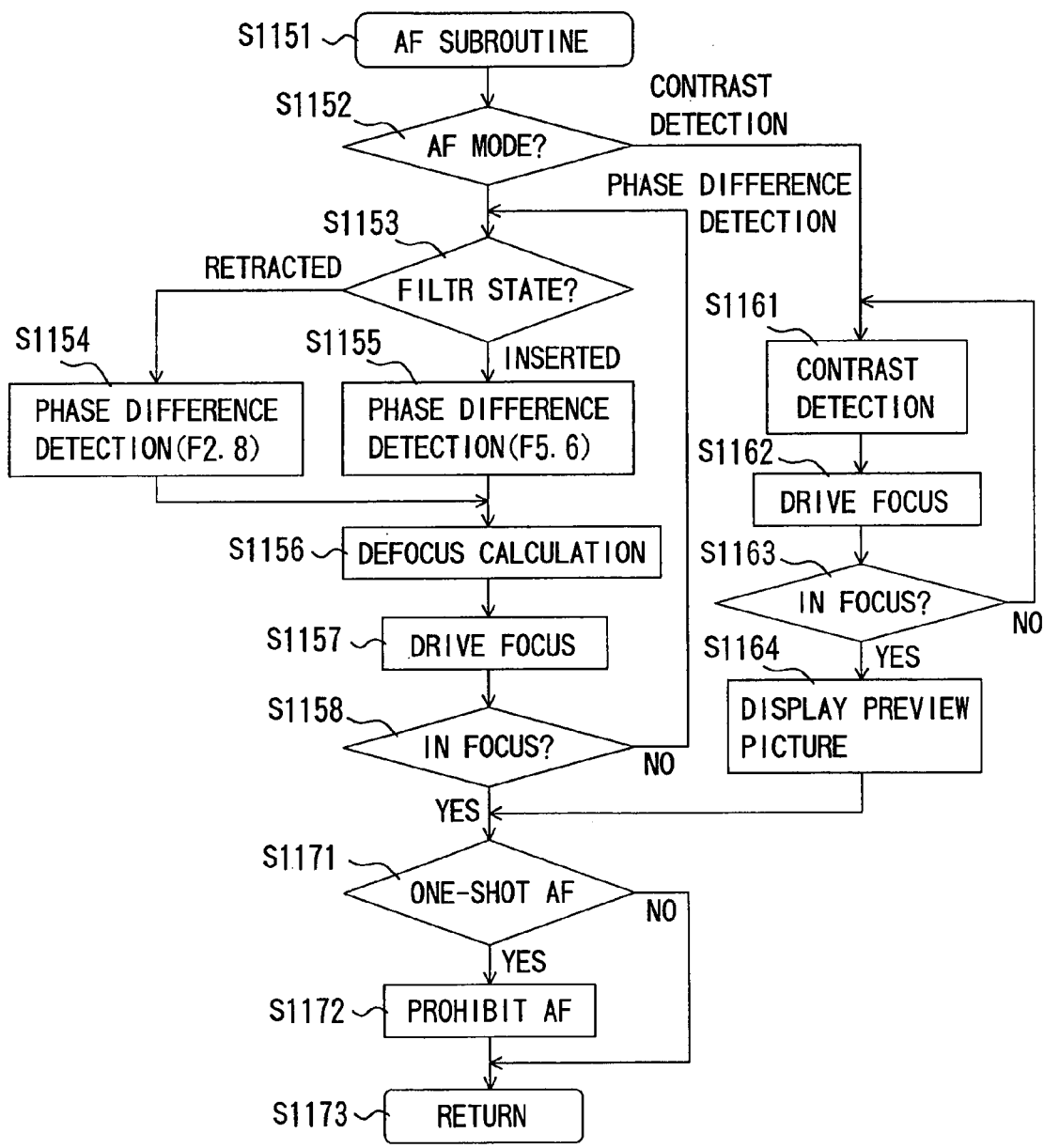
FIG. 47 is a flowchart showing an AF subroutine in Embodiment 5.

FIG. 47 shows a flowchart of the AF control subroutine, and shows the control content for Step S1151 in the flowchart of the still-picture image-taking subroutine of FIG. 46.

After Step S1151, at Step S1152, the AF mode is discriminated. If contrast detection method has been selected as the AF mode, then the Steps 1161 and onward are executed. Steps S1161 and S1162 perform the same control as the Steps S1120 and S1121 in the moving-picture image-taking subroutine of FIG. 45, so that further detailed explanations have been omitted. At Step S1163, it is determined whether the image-taking optical system is in focus or not, and if it is not in focus, then Step S1161 and Step S1162 are repeated. Then, when the image-taking optical system is in focus, the preview picture is displayed on the display device 1421 at Step S1164, and the procedure advances to Step S1171.

If it is discriminated at Step S1152 that the AF mode is phase difference detection method, then the Steps S1153 and onward are executed. At Step S1153, the filter control state carried out at Steps S1134 to S1136 in FIG. 46 is discriminated. If the apodization filter 1151 is not inserted (but retracted), then a phase difference detection using a focus detection optical system corresponding to F2.8 with a long base length is carried out at Step S1154. On the other hand, if the apodization filter 1151 is inserted, then a phase difference detection using a focus detection optical system corresponding to F5.6 with a short base length is carried out at Step S1155. That is to say, in the case of phase difference detection AF, it is necessary to perform the focus detection using the light flux transmitted through the portion of constant optical density that is provided at the center of the apodization filter 1151, so that it is judged whether the light flux for the phase difference detection stays within the region of the portion where the optical density is constant, and a phase difference detection is performed with a focus detection optical system having a base length corresponding to the result of this judgment.

At Step S1156, the defocusing amount and the focus lens driving amount necessary for focusing are calculated based on the results detected at Step S1154 or Step S1155. At Step S1157, the focus lens is driven in accordance with the result of this calculation. At Step S1158, it is determined whether the image-forming optical system is in focus or not, and if it is not in focus, then the Steps S1153 to S1157 are carried out again. Then, when focusing has been accomplished, the procedure advances from Step S1158 to Step S1171.

At Step S1171, the AF tracking mode for tracking moving objects is discriminated. That is to say, if the currently selected AF mode is the phase difference detection one-shot AF or the contrast detection one-shot AF mode, then AF tracking of moving objects after focusing is prohibited, so that the AF at Step S1172 is prohibited, and the procedure returns at Step S1173 to the still-picture image-taking subroutine of FIG. 46. On the other hand, if the AF mode is the phase difference detection servo AF or the contrast detection servo AF mode, then AF tracking of moving objects is performed even after focusing, so that the procedure returns at Step S1173 to the still-picture image-taking subroutine of FIG. 46 without prohibiting AF. Thus, the AF subroutine is finished, and the Steps S1143 and onward of FIG. 46 are carried out.

Figure 48:
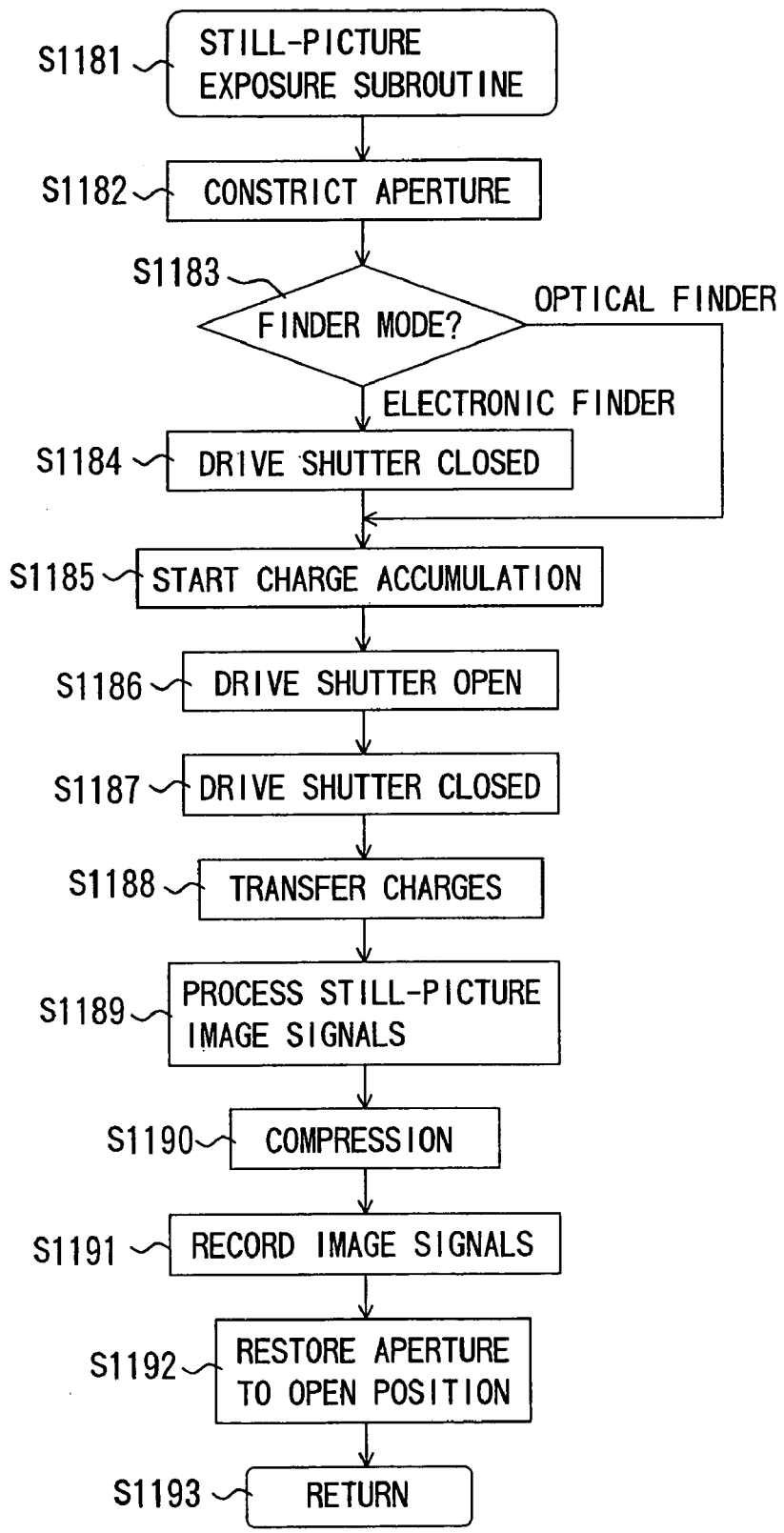
FIG. 48 is a flowchart showing a still-picture exposure subroutine in Embodiment 5.

FIG. 48 is a flowchart of the still-picture exposure subroutine, and shows the control content for Step S1181 in the flowchart of the still-picture image-taking subroutine of FIG. 46.

After Step S1181, at Step S1182, the diaphragm blades 1111 of the light amount adjusting apparatus 1100 are constricted in accordance with the diaphragm control value calculated with the second photometrical calculation executed at Step S1141 of FIG. 46. At Step S1183, the currently selected finder mode is discriminated. If it is discriminated to be the electronic finder mode, then the focal plane shutter 1416 is driven shut at Step S1184, blocking the image-taking light flux onto the image-pickup device 1440. The reason for this is that at Step S1132 and Step S1133 of FIG. 46, during the electronic finder mode, the shutter was open and the image-pickup device has obtained the object image, but the control of the exposure start and end during still-picture image-taking is performed with a mechanical shutter, in order to maintain the shutter speed on the image-taking screen uniform and prevent smear during the reading of the image signals. At Step S1183, if the finder mode has been discriminated to be the optical finder mode, then the focal plane shutter 1416 is closed, so that the procedure advances to Step S1185.

At Step S1185, the charge accumulation in the image-pickup device 1440 is started in order to obtain the image. At Step S1186, the first curtain of the focal plane shutter 1416 starts to travel, opening the shutter. At Step S1187, in accordance with the shutter speed calculated by the second photometric calculation at Step S1141 in FIG. 46, the second curtain of the shutter 1416 starts to travel, closing the shutter, and blocking the light flux onto the image-pickup device 1440. At Step S1188, the charges in the image-pickup device 1440 are transferred, and at Step S1189, the image signals corresponding to the obtained 3 million pixels are subjected to an image process for still-picture image signals. At Step S1190, an image compression for still-picture recording is performed, and at Step S1191, the compressed image signals are recorded in the memory 1443. At Step S1192, the diaphragm blades are restored to their open position, and at Step S1193, the procedure returns to the still-picture image-taking subroutine in FIG. 46.

With this control, by using both the apodization filter and phase difference detection AF, a detection optical system that is suitable for the optical density pattern of the filter is selected, thus enabling the high-speed AF that is characteristic for phase difference detection AF. Consequently, it becomes easy to attain high-quality images in which the main object is accurately in focus and the contours of blurred images are softened, without the risk of missing a good photo opportunity.

Embodiment 6

In the apodization filter used in Embodiment 5, the transmission rate distribution from the center to the radius r has an axially symmetric pattern that is the same in all directions. In Embodiment 6 of the present invention described below, a filter is provided whose transparent rate distribution differs depending on the direction. The following is an explanation of the structure and the operation of Embodiment 6 using the FIGS. 49 to 59.

Figure 49:
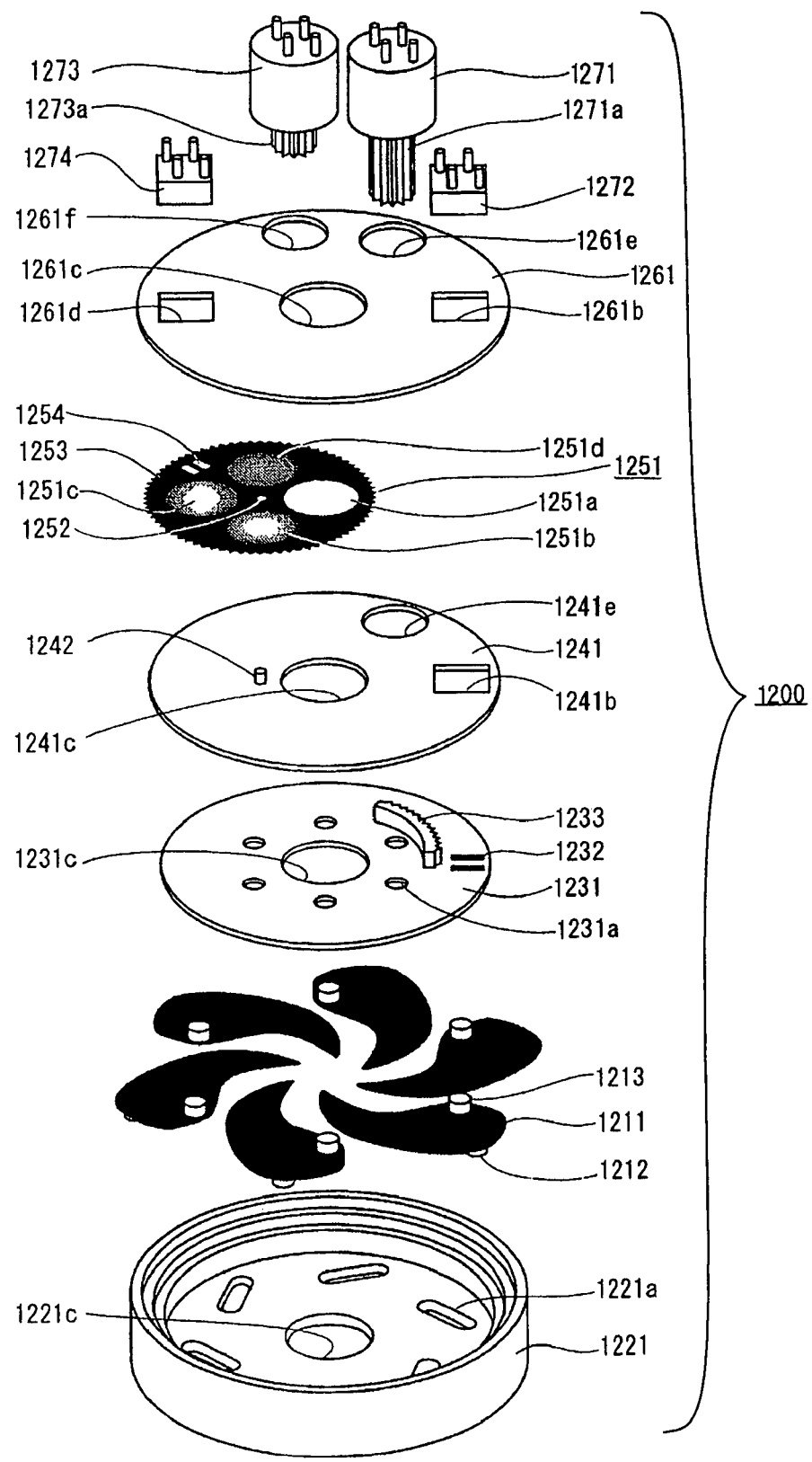
FIG. 49 is an exploded perspective view of a light amount adjusting apparatus according to Embodiment 6 of the present invention.

FIG. 49 is an exploded perspective view illustrating a structure of a light amount adjusting apparatus 1200 according to the present embodiment, corresponding to FIG. 37 in Embodiment 5.

In FIG. 49, reference numeral 1211 denotes diaphragm blades having a property of blocking light across their entire region. Driven pins 1212 and 1213 are arranged upright on a lower and an upper surface of the diaphragm blades 1211. Six diaphragm blades 1211 of the same shape are used, forming a diaphragm aperture. Reference numeral 1221 denotes a bottom plate holding the diaphragm blades 1211, which is provided, in the middle of a planar bottom surface, with an aperture 1221c limiting the maximum diameter of the light flux when the diaphragm blades are spread open. Six cam grooves 1221a are provided around this aperture 1221c. The pins 1212 of the diaphragm blades 1211 engage these cam grooves 1221a and can be moved through them in a sliding manner.

Reference numeral 1231 denotes a driving member also referred to as "windmill wheel," which is provided with six holes 1231a for driving the diaphragm blades arranged at equal intervals around an aperture 1231c in the center. The pins 1213 of the diaphragm blades 1211 engage these holes 1231a in a rotatable manner. Accordingly, when the windmill wheel 1231 is turned in counterclockwise direction, the diaphragm aperture diameter is continually diminished in the same manner as in Embodiment 5, performing a constricting action. A mark (index) 1232 for detecting an initial position of the windmill wheel 1231 as well as a driven gear 1233 are provided on an upper surface of the windmill wheel 1231.

Reference numeral 1241 denotes a partition plate. A predetermined space is formed between the partition plate 1241 and the bottom plate 1221, and the diaphragm blades 1211 and the windmill wheel 1231 are accommodated in this space. An aperture 1241c for transmitting light flux is provided in the middle of the partition plate 1241. A rotation support shaft 1242 of the apodization filter (explained below) is arranged upright next to the aperture 1241c. The partition plate 1241 is further provided with a phase detection window 1241b for detecting the presence of the mark 1232 on the windmill wheel 1231 as well as an escape hole 1241e of a later-described pinion gear.

Reference numeral 1251 denotes a disk-shaped apodization filter made by forming later-described apodization patterns by inkjet printing on an about 0.1 mm thick transparent resin film, such as a PET (polyethylene terephthalate) film, as in Embodiment 5, and provided in its center with a bearing portion 1252 at which it is rotatably supported by the rotation support shaft 1242 on the partition plate. A gear 1253 made of a metal plate is adhered to an outer circumferential portion of the apodization filter 1251. It should be noted that it is also possible to form the outer circumferential portion of the transparent film serving as the substrate for the apodization filter into gear shape. Moreover, a mark 1254 for detecting an initial position of a rotation direction of the filter is provided on the upper surface of the apodization filter 1251.

In the present embodiment, a light attenuation pattern of the apodization filter 1251 is constituted by the following four regions. Reference numeral 1251a denotes a transparent filter region with a transmission rate of substantially 100% across the entire effective region. Reference numeral 1251b denotes a filter portion having the same transmission rate distribution as the effective filter portion 1151a in Embodiment 5. Reference numeral 1251c denotes a filter portion whose transmission rate distribution varies depending on the direction from the center. Reference numeral 1251d denotes a filter portion in which a predetermined optical density is also given to the center region. This is explained in more detail further below.

Reference numeral 1261 denotes a cover plate. A predetermined space is formed between this cover plate 1261 and the partition plate 1241, and the filter 1251 is accommodated in this space. An aperture 1261c for transmitting light flux is provided in the middle of the cover plate 1261. The cover plate 1261 is further provided with detection windows 1261b and 1261d for detecting the presence of the mark 1232 on the windmill wheel 1231 and the mark 1254 on the filter, as well as escape holes 1261e and 1261f of a later-described pinion gear.

Reference numeral 1271 denotes a stepper motor for driving the windmill wheel 1231. A pinion gear 1271a of the stepper motor 1271 passes through the holes 1261e and 1241e, and meshes with the gear 1233 provided on the windmill wheel 1231. Reference numeral 1272 denotes an optical position detection unit having a light projector element and a photodetector element, and detecting light that has been reflected from the upper surface of the windmill wheel 1231. The optical position detection unit 1272 is configured such that when the mark 1232 is arranged in opposition directly below the position detection unit 1272, then a predetermined signal is output, so that it can be detected whether the phase angle of the windmill wheel 1231 has returned to the initial state.

With this structure, the stepper motor 1271 is driven to return the windmill wheel 1231 to its initial position and the diaphragm aperture is returned to the open state, while observing the output of the position detection unit 1272. By driving the stepper motor from this position in accordance with a predetermined program, the diaphragm aperture can be controlled to the desired size. It should be noted that also in this embodiment, when the diaphragm mechanism is incorporated in a later-described image-forming optical system, the F number can be adjusted from F2 on the open side to F8 on the most constricted side.

Reference numeral 1273 denotes a stepper motor for driving the apodization filter 1251. A pinion gear 1273a passes through the hole 1261f and meshes with the gear 1253 provided on the filter 1251. Reference numeral 1274 denotes an optical position detection unit incorporating a light projector element and a photodetector element, and detecting light that has been reflected from the upper surface of the filter 1251. The optical position detection unit 1274 is configured such that when the mark 1254 is arranged in opposition directly below the position detection unit 1274, then a predetermined signal is output, so that it can be detected whether the phase angle of the filter 1251 has returned to the initial state.

With this structure, the stepper motor 1273 is driven to return the apodization filter 1251 to its initial state, that is, to the state in which the transparent portion 1251a covers the aperture 1241c, while observing the output of the position detection unit 1274. Moreover, by driving the stepper motor from this position in accordance with a predetermined program, it is possible to advance the desired pattern into an optical path of the light flux transmitted through the light flux transmitting aperture, and to alter the effect for improving blurred images.

Moreover, since a plurality of driving control unit, that is, the two stepper motors 1271 and 1273 are arranged next to one another in the ring-shaped space enclosing the apertures 1221c and 1241c, it is possible to keep a size to approximately the same size as that of the light amount adjusting apparatus in Embodiment 5.

Figure 50:
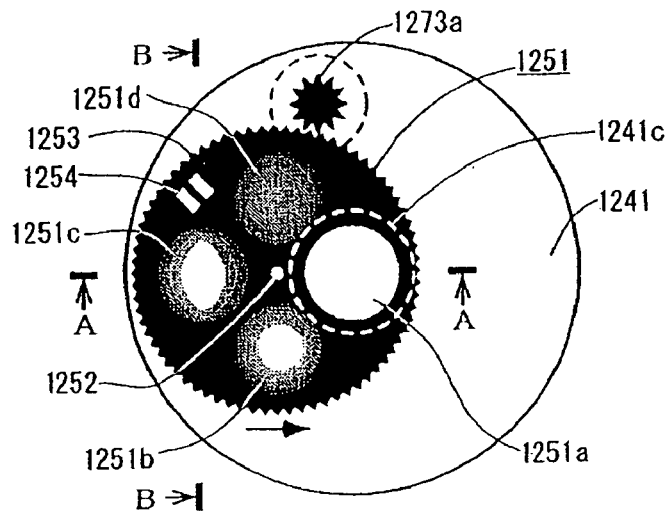
FIG. 50 is a top view of an apodization filter in Embodiment 6.

FIG. 50 is a plan view illustrating in more detail the structure of the apodization filter 1251, and corresponds to FIG. 38 in Embodiment 5. Reference numeral 1251 denotes an apodization filter disk, whose filter structure is the same as in Embodiment 5, but whose filter pattern arrangement and operation are different. That is to say, the filter 1251 is made by forming apodization patterns by inkjet printing on an about 0.1 mm thick transparent resin film, such as a PET (polyethylene terephthalate) film. The apodization filter 1251 is provided in its middle with a bearing portion 1252, and is rotatably supported by the rotation support shaft 1242 on the partition plate. A gear made 1253 of a metal plate is adhered to the outer circumferential portion of the apodization filter 1251. Moreover, a mark (index) 1254 for detecting an initial position of the filter is provided on the upper surface of the apodization filter 1251.

Reference numeral 1251a denotes a transparent filter portion with a transmission rate of substantially 100% across the entire effective region. Reference numeral 1251b denotes an apodization filter with the same pattern as the filter 1151a in Embodiment 5, wherein when the maximum effective diameter, that is, the maximum incident height is given as r0, then the region within a radius of r0/2 is transparent, and in the region of r0/2 and greater, the transmission rate decreases gradually. Furthermore, it is an isotropic pattern having a constant transmission rate distribution in an angular direction (circumferential direction) with respect to the center. Reference numeral 1251c denotes a filter portion that, in vertical direction, is transparent in the region from the center up to a radius of (¾)r0, and whose transmission rate gradually decreases in the region of (¾)r0 and greater, whereas in the horizontal direction it has the same transmission rate distribution as the filter portion 1251b. That is to say, it is an anisotropic apodization filter whose transmission rate distribution is direction-dependent. Reference numeral 1251d denotes an isotropic apodization filter whose transmission rate distribution is as defined in the following equation:

$$Tr(r)=100 \times \exp(\alpha \times (r-r0) \times (r-r0))$$ (Eq. 9)

Figure 51:
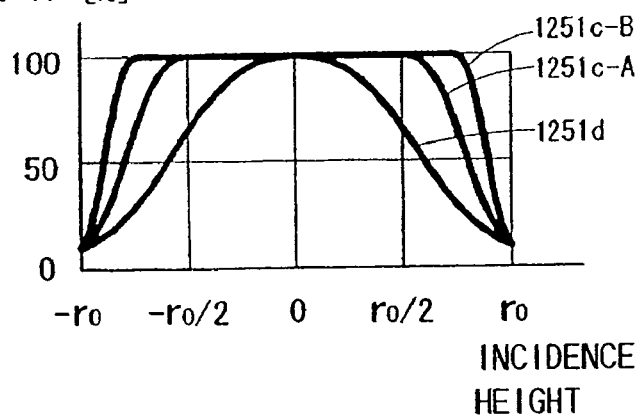
FIG. 51(A) shows a transmission rate distribution of an apodization filter in Embodiment 6.
FIG. 51(B) shows an optical density distribution of an apodization filter in Embodiment 6.
Figure 51:
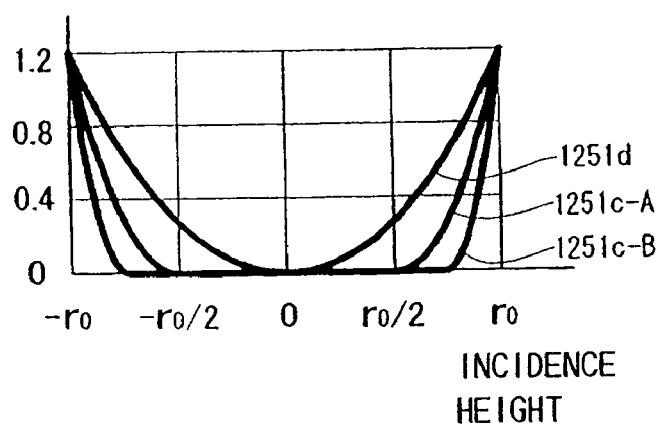

The transmission rate distribution and the optical density distribution of each of the filter portions are illustrated in detail in FIG. 51.

Reference numeral 1273a denotes a pinion gear of the stepper motor 1273 for driving the filter. This pinion gear 1273a meshes with the gear 1253 provided at the circumference of the filter. Consequently, when the pinion gear 1273a is driven in clockwise direction, the filter 1251 is rotated in counterclockwise direction, and the filter portions 1251a to 1251d are successively inserted into the optical path of the light flux transmitted through the light flux transmitting aperture 1241c.

FIG. 51 shows graphs illustrating the pattern characteristics of the filter portions 1251a to 1251d of the apodization filter 1251 according to the present embodiment. FIG. 51(A) shows the transmission rate distribution and corresponds to FIG. 39(A) in Embodiment 5. FIG. 51(B) shows the optical density (OD) and similarly corresponds to FIG. 39(B) in Embodiment 5. In these graphs, "1251c-A" denotes the transmission rate distribution of the filter portion 1251c along the section A—A in FIG. 50, and "1251c-B" denotes the transmission rate distribution of the filter portion 1251c along the section B—B in FIG. 50. Thus, the filter portion 1251c has an anisotropic filter pattern whose transmission rate distribution is direction-dependent. "1251d" in FIG. 51 denotes the transmission rate distribution of the filter portion 1251d in FIG. 50, which is an isotropic apodization filter whose light attenuation region starts from the center.

Thus, in the present embodiment, a plurality of filters having different transmission rate distributions are provided, so that it is possible to achieve both AF precision and the effect of easing the contours in a blurred image by suitably selecting the combination of AF mode and filter pattern.

Figure 52:
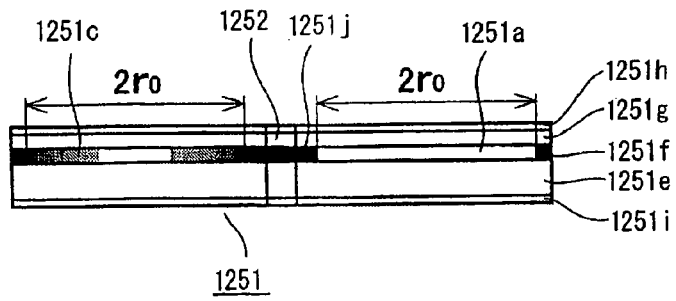
FIG. 52 is a cross-sectional view of an apodization filter in Embodiment 6.

FIG. 52 is a diagram illustrating the structure of the apodization filter 1251, and is a cross-sectional view taken along A—A in FIG. 50. Reference numeral 1251e denotes a PET film serving as a transparent substrate. An ink-accepting layer 1251f is applied to the upper surface of the PET film 1251e. A dye-based coloring material having a low dispersion and a flat spectral transmission rate in the visible light spectrum is ejected onto the ink-accepting layer 1251f by a micro-drop ejecting apparatus, namely a so-called inkjet recording apparatus, thus forming the effective filter portions 1251a to 1251d with a diameter of 2r0. On the other hand, in regions of the ink-accepting layer outside the four effective filter portion, a light-blocking portion 1251j is formed, for example, by a pigment-based coloring material having a higher optical density than the dye-based coloring material. Then, a flattening layer 1251g is applied, and the irregularities in the surface of the ink-accepting layer occurring due to the printing process are flattened out. Furthermore, anti-reflective layers 1251h and 1251i are formed by vapor deposition method on the upper surface of the flattening layer 1251g and the lower surface of the transparent substrate 1251e. With this process, a large number of apodization filters are formed on a transparent substrate 1251e of large surface area, and when separating them by punching into individual filters in a final pressing step, the bearing hole 1252 for rotational driving is also punched out at the same time, thus obtaining the filter 1251.

Figure 53:
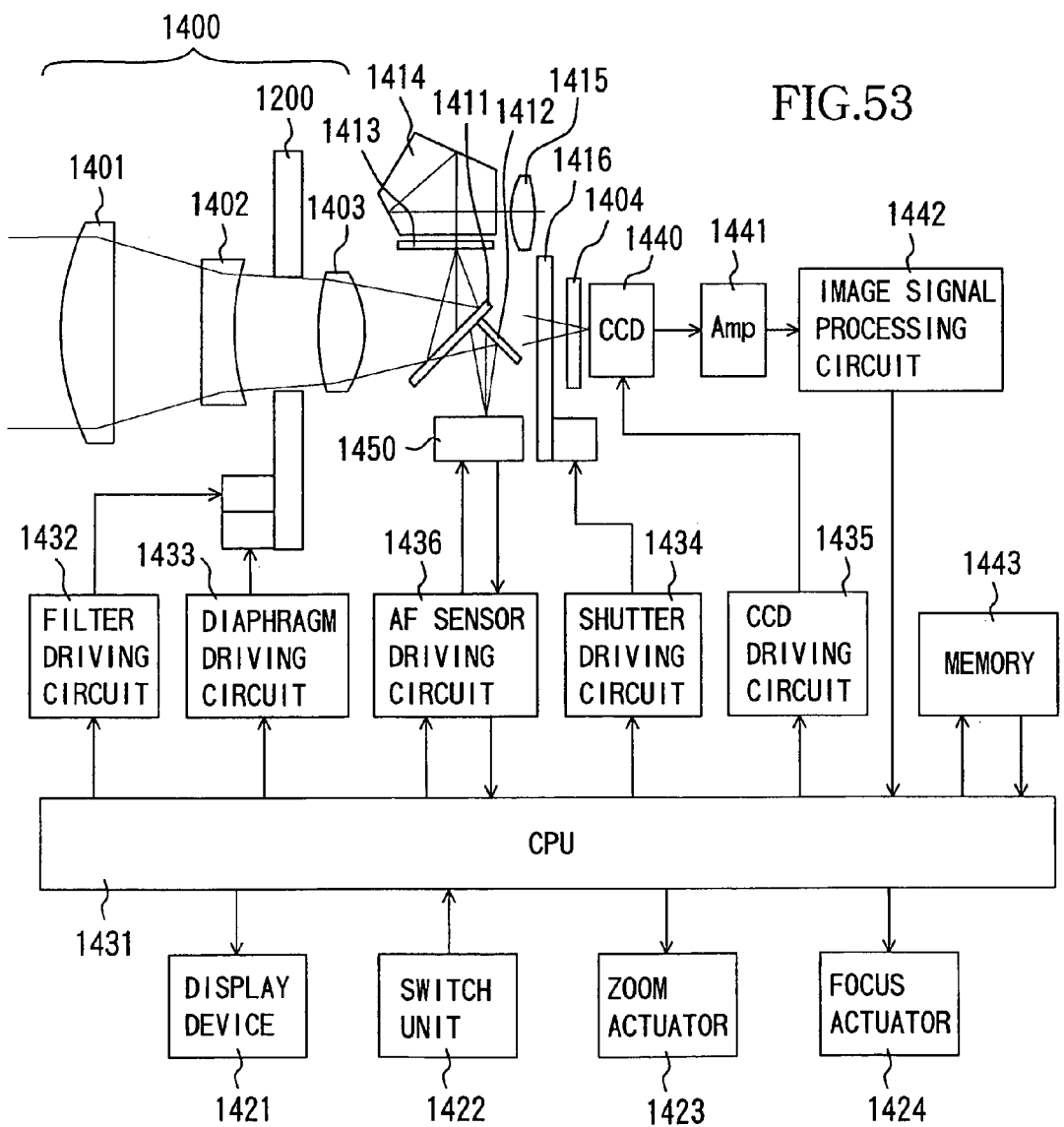
FIG. 53 is a diagram showing a structure of an image-taking apparatus according to Embodiment 6.

FIG. 53 shows an image-taking apparatus to which the light amount adjusting apparatus 1200 shown in FIGS. 49 to 52 has been mounted, and which is similar to Embodiment 5 shown in FIG. 41, except for the structure of the light amount adjusting apparatus 1200, so that further explanations thereof have been omitted.

Figure 54:
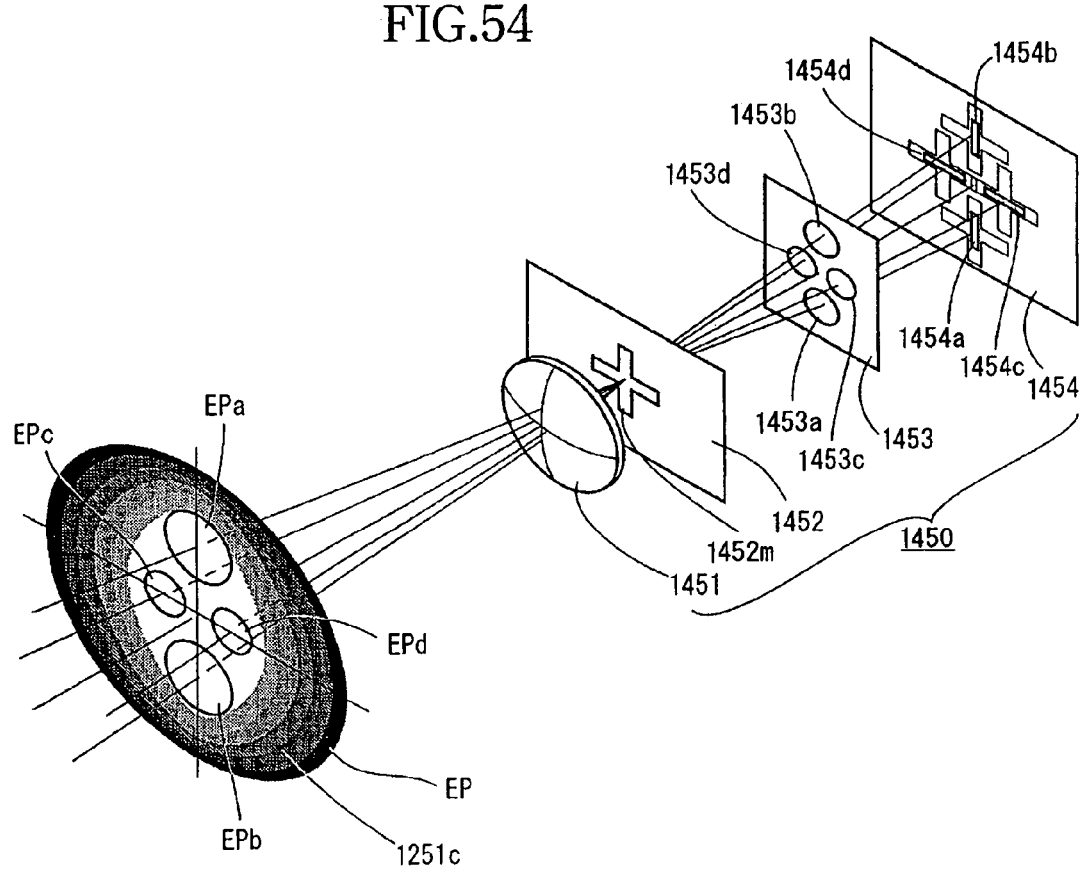
FIG. 54 illustrate a principle of focus detection by phase difference detection method in Embodiment 6.
Figure 56:
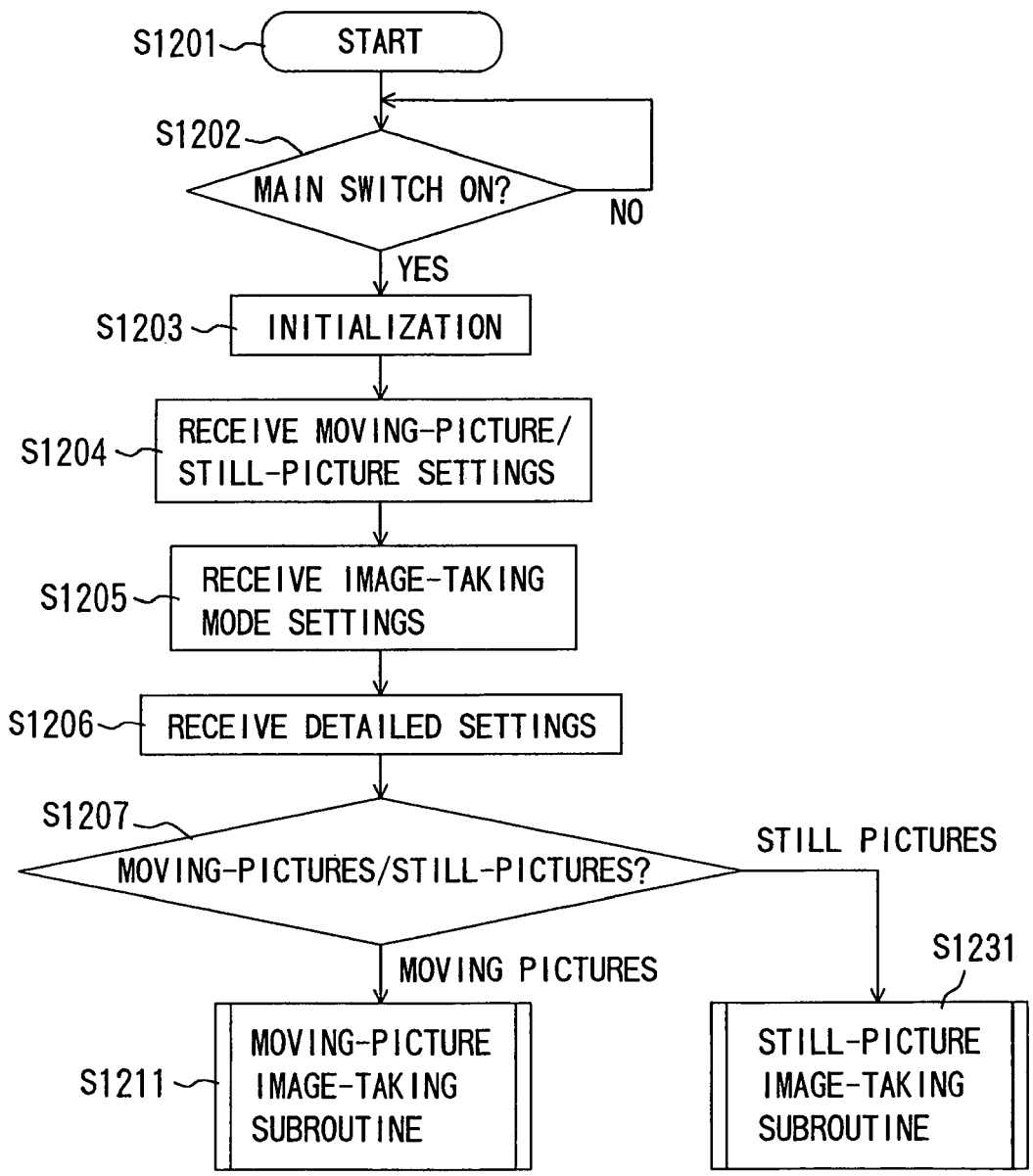
FIG. 56 is a flowchart showing a main control of an image-taking apparatus according to Embodiment 6.

FIG. 54, which corresponds to FIG. 42(B) in Embodiment 5, is a perspective view showing the structure of the focus detection unit 1450 incorporated in the image-taking apparatus of FIG. 53, and illustrating the focus detection principle. FIG. 54 shows the case that the above-described filter portion 1251c is used.

Like in Embodiment 5, the main members constituting the focus detection unit 1450 are a field lens 1451, a field mask 1452, a secondary image-forming lens 1453, and an AF sensor 1454. The focus detection unit 1450 is arranged at a predetermined position below the submirror 1412, such that the field lens 1451 is arranged near the expected image surface (primary image surface) of the image-forming optical system 1400. Moreover, EP denotes an exit pupil of the image-forming optical system. In the present embodiment, the light amount adjusting apparatus 1200 is arranged within the image-forming optical system 1400, such that the light flux aperture 1241c illustrated in FIG. 49 is positioned near this exit pupil.

The structure of the focus detection unit 1450 is identical to Embodiment 5, so that further explanations thereof have been omitted, but the incident apertures of the lenses of the secondary image-forming lens 1453 are imaged via the field lens 1451 as four aperture images (exit pupil regions EPa to EPd) onto the exit pupil EP of the image-forming optical system. That is to say, the secondary image-forming lens 1453 and the exit pupil region EP of the image-forming optical system are at optically conjugated positions with respect to the field lens 1451.

In the present embodiment, the open F number of the image-forming optical system is F2.0, so that the exit pupil EP can be regarded as the image-taking light flux transmitting region with an aperture value of F2.0. The pair of exit pupil regions EPa and EPb are arranged within the light flux transmitting region for an aperture value of F2.8. Moreover, the other pair of regions EPc and EPd are arranged within the light flux transmitting region for an aperture value of F5.6. And when the apodization filter 1251c is used, then the apodization filter is advanced into the exit pupil position of the image-forming optical system, as shown in FIG. 54. Here, the transmission rate distribution of the apodization filter is an anisotropic transmission rate distribution, in which the transparent region in the vertical direction is wide and the transparent region in the horizontal direction is narrow, as shown in FIGS. 50 and 51. Moreover, the dimensions and optical parameters of all the members within the focus detection unit are determined such that the focus detection light flux with a long base length stays within the bounds of the transparent region in the vertical direction, and the focus detection light flux with a short base length stays within the bounds of the transparent region in the horizontal direction.

Consequently, if the apodization filter 1251c of the present embodiment is used, a phase difference detection AF using both the focus detection light flux corresponding to F2.8 and the focus detection light flux corresponding to F5.6 becomes possible, and an AF with higher precision becomes possible, while attaining the effect of the apodization filter.

FIG. 55, which corresponds to FIG. 43 in Embodiment 5, is a table illustrating the image-taking modes with which the image-taking apparatus of the present embodiment is provided. The following is an explanation of the differences of the present embodiment to Embodiment 5.

(a) Since a plurality of apodization filters are provided, the filter modes are not a simple selection between advancing and retracting, but a selection between the plurality of filters. The filters that are selected in the various image-taking modes can be selected manually by the camera operator in the image-taking modes (6) to (9) and (15) and (16), whereas in the other modes the most suitable filter for the respective mode is automatically selected.

(b) In the portrait mode (4), the finder mode is "optical finder" and the AF mode is phase difference detection one-shot AF using a light flux of F2.8. The reason for this is that in the portrait mode, since the possibility to take snapshots is desirable and the depth of field is small, a high-speed high-precision phase difference detection AF is preferable.

(c) Since in the macro mode (4) the blurring of the background is very large, the filter 1251d, which has the largest effect of easing the contours in a blurred picture, is used.

(d) When in the image-taking modes (6) to (9) the filter has been manually selected, the detection light flux for phase difference detection AF is switched in accordance with the filter type. More specifically, when the apodization filters 1251a or 1251c are used, then a detection light flux equivalent to F2.8 can be used, so that a phase difference detection AF using a detection optical system equivalent to F2.8 is used. When the apodization filter 1251b is used, then only the light flux equivalent to F5.6 can be used, so that a phase difference detection AF using a detection optical system equivalent to F5.6 is used. On the other hand, when the apodization filter 1251d is used, then it is impossible to use a light flux equivalent to F5.6, so that AF is prohibited.

(e) In the portrait mode (14), the blurring of the background is large, and contrast detection servo AF is performed instead of phase difference detection AF, so that the filter 1251d, which has the largest effect of easing the contours in a blurred picture, is used.

Apart from the above five points, the control is performed in a similar manner as in Embodiment 5 in FIG. 43.

FIGS. 56 to 59 are control flowcharts of the image-taking apparatus according to the present embodiment. First, the main control flow during image-taking is explained with reference to FIG. 56. This main control flow is similar to Embodiment 5 in FIG. 44. After Step S1201 and Step S1202, at Step S1203, the image-taking apparatus is initialized. From Step S1204 to S1206, the settings of the various modes for image-taking and the image-taking conditions are received. Then, if the image-taking mode is the moving-picture image-taking mode, the procedure advances to the moving-picture image-taking subroutine of Step S1211, whereas if the image-taking mode is the still-picture image-taking mode, the procedure advances to the still-picture image-taking subroutine of Step S1231.

Figure 57:
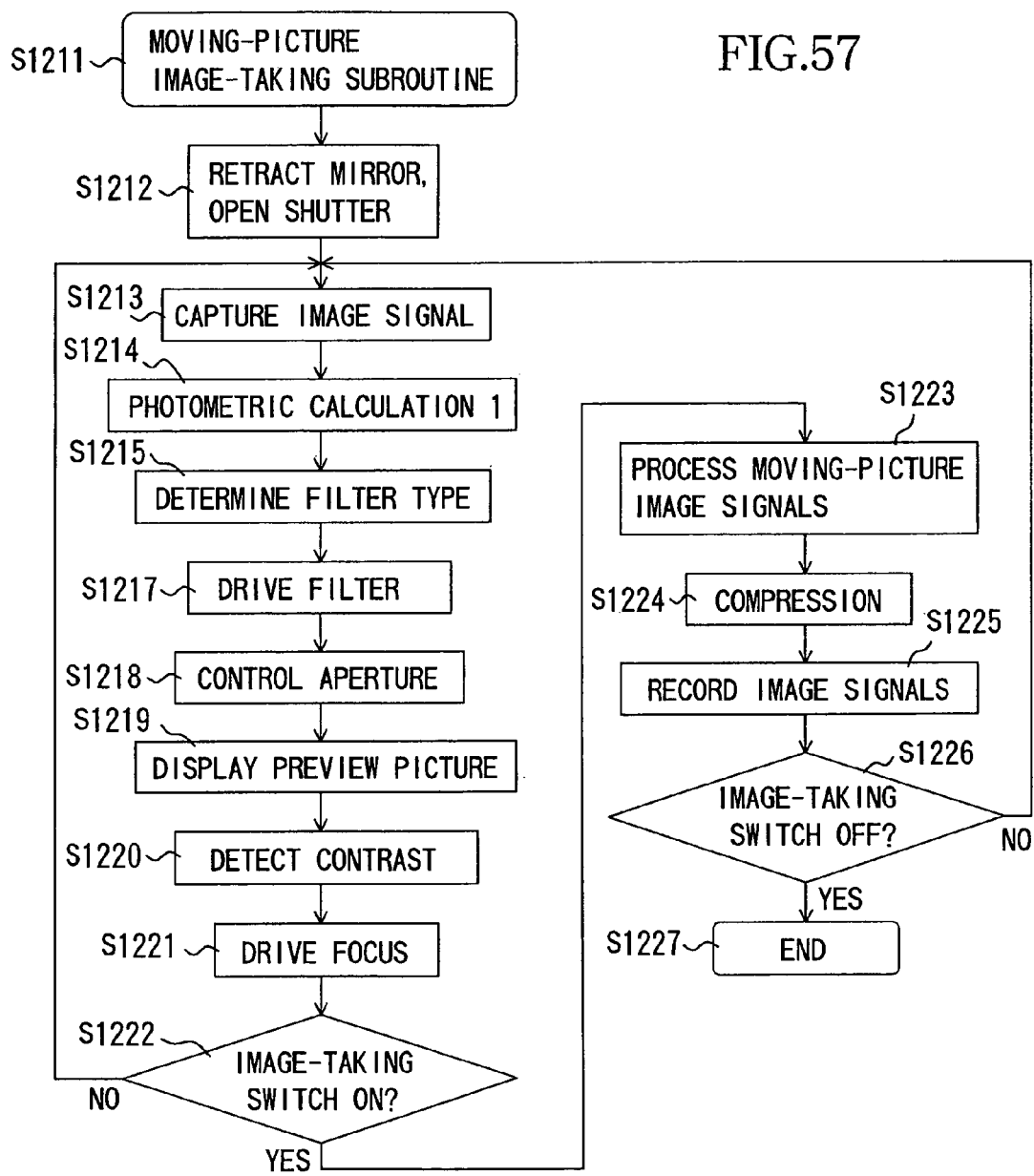
FIG. 57 is a flowchart showing a moving-picture image-taking subroutine in Embodiment 6.

FIG. 57 is a flowchart of the subroutine for moving-picture image-taking, which differs from Embodiment 5 as shown in FIG. 45 only with respect to the flow of the filter control. That is to say, in Embodiment 5, in the Steps S1115 to S1117, the filter was advanced and retracted in accordance with the on/off state of the apodization filter, whereas in Embodiment 6, at Step S1215 and Step S1217, the type of the selected apodization filter is determined, and the selected filter is advanced into the optical path of the light flux transmitted through the light flux aperture. The rest of the flowchart is the same as in Embodiment 5, so that further explanations thereof have been omitted.

Figure 58:
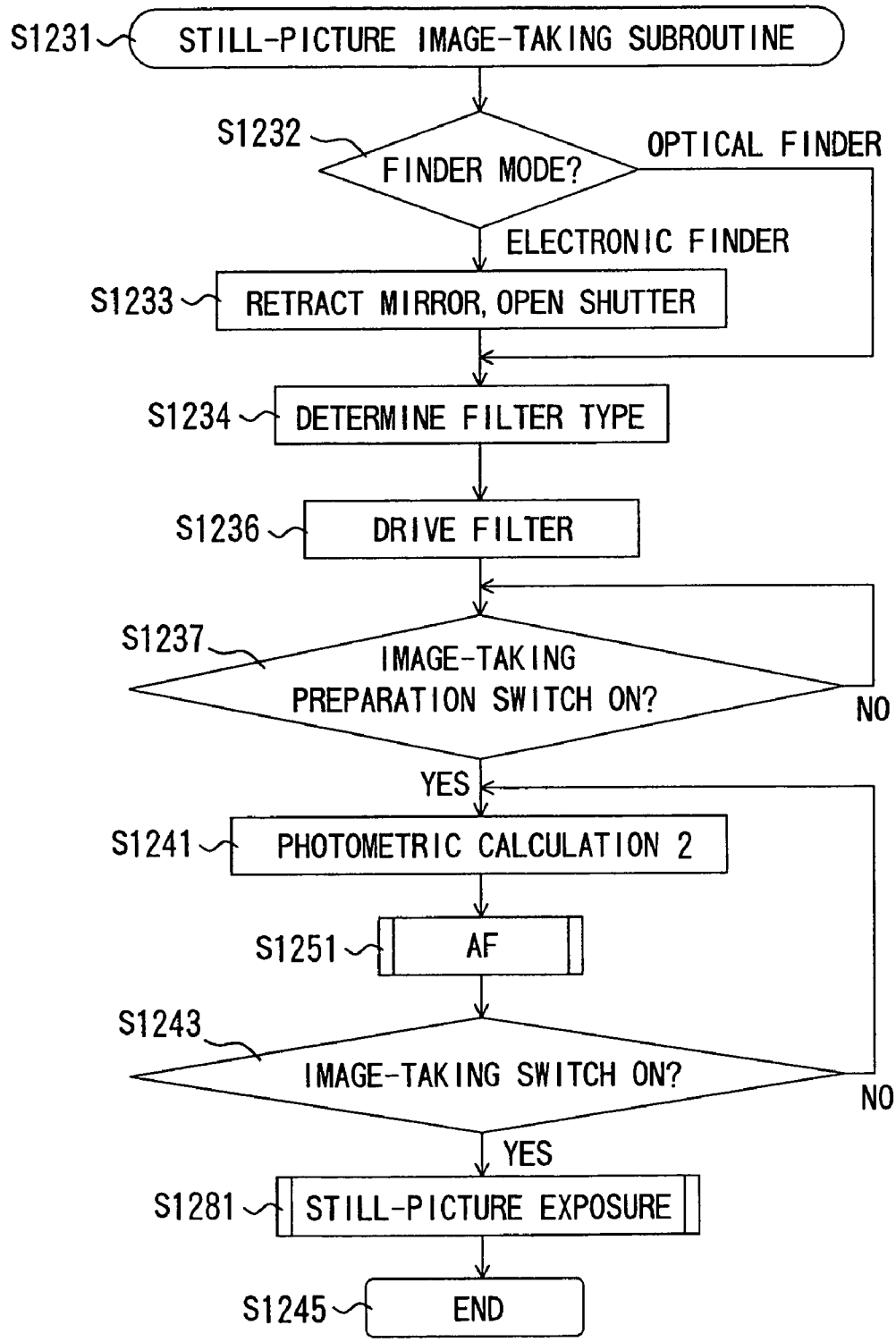
FIG. 58 is a flowchart showing a still-picture image-taking subroutine in Embodiment 6.

FIG. 58 is a flowchart of the subroutine for still-picture image-taking, which differs from Embodiment 5 as shown in FIG. 46 only with respect to the flow of the filter control. That is to say, in Embodiment 5, in the Steps S1134 to S1136, the filter was advanced and retracted in accordance with the on/off state of the apodization filter, whereas in the present embodiment, the type of the selected apodization filter is determined at Step S1234 and Step S1236, and the selected filter is advanced into the optical path of the light flux transmitted through the light flux aperture. The rest of the flowchart is the same as in Embodiment 5, so that further explanations thereof have been omitted.

Figure 59:
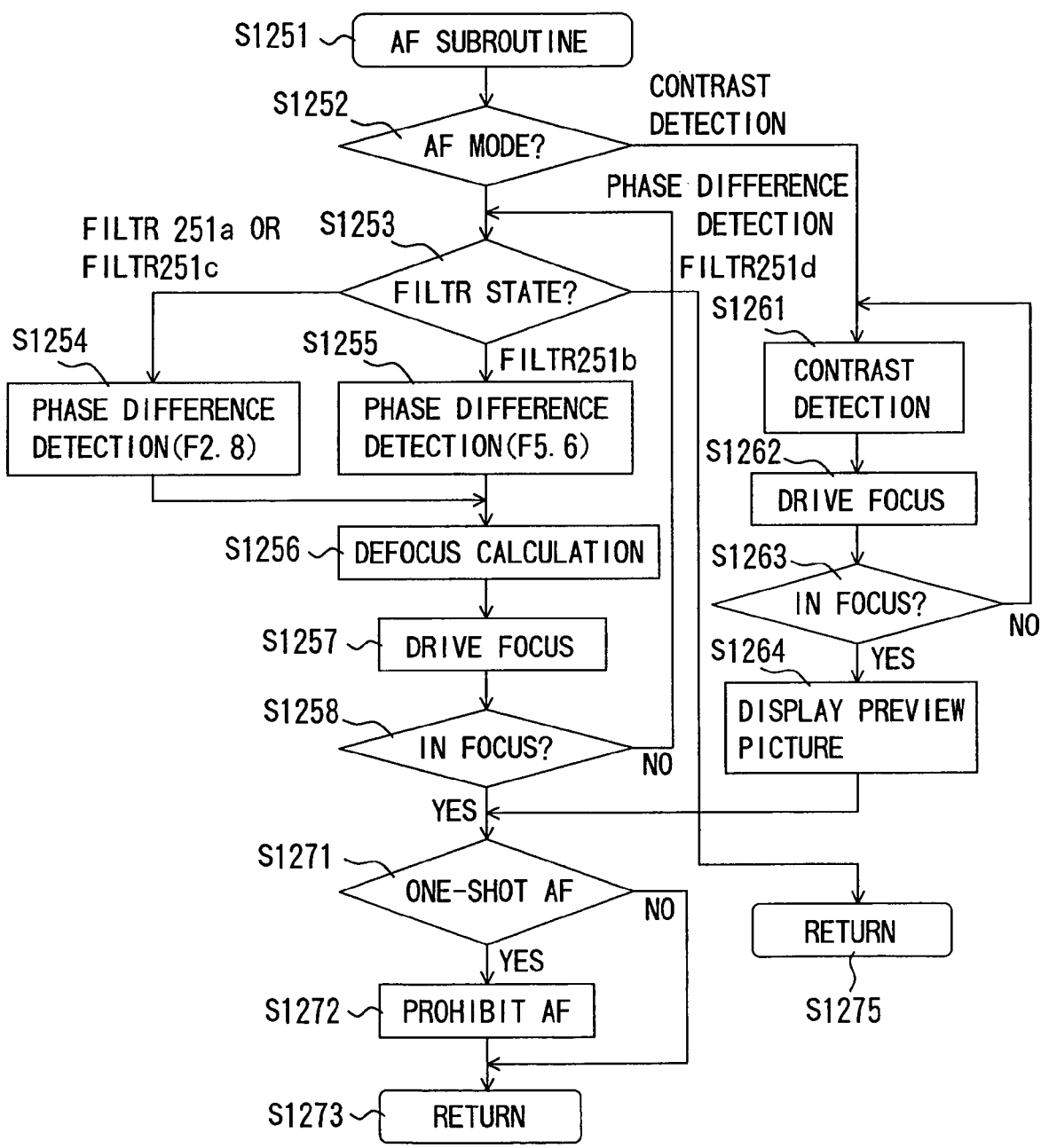
FIG. 59 is a flowchart showing an AF subroutine in Embodiment 6.

FIG. 59 shows the AF control subroutine which differs from Embodiment 5 as shown in FIG. 47 only with respect to the flow of the selection operation of phase difference detection AF. That is to say, in Embodiment 5, at Steps S1153 to S1155, if the apodization filter is retracted (not used), then a focus detection optical system corresponding to F2.8 with a longer base line length is used, whereas if the apodization filter is advanced (used), then a focus detection optical system corresponding to F5.6 with a shorter base line length is used to perform phase difference detection.

On the other hand, in the present embodiment, if it is judged at Step S1252 that the AF mode is the phase difference detection mode, then the apodization filter type is determined at Step S1253. Then, if the selected filter is the filter 1251a or the filter 1251c, then phase difference detection using the focus detection optical system corresponding to F2.8 with the longer base line length is used at Step S1254, and subsequently a defocus calculation is performed at Step S1256.

On the other hand, if it is judged at Step S1253 that the filter type is the filter 1251b, then phase difference detection using the focus detection optical system corresponding to F5.6 with the shorter base line length is used at Step S1255, and subsequently a defocus calculation is performed at Step S1256. And if it is judged at Step S1253 that the filter type is the filter 1251d, then phase difference detection AF is impossible so that phase difference detection AF is prohibited, the procedure advances to Step S1275, and returns to the still-picture image-taking subroutine of FIG. 58. In this case, contrast detection AF is performed, as shown in FIG. 55. The rest of the flow is the same as in Embodiment 5, so that further explanations thereof have been omitted.

The still-picture exposure subroutine of Step S1281 in FIG. 58 is the same as the still-picture exposure subroutine of Embodiment 5 as shown in FIG. 48, so that further explanations thereof have been omitted.

With the control flow of the present embodiment as described above, an AF control is executed that is suitable for the apodization filter type. More specifically, the most suitable AF control mode is selected from four types of AF control modes, namely phase difference detection AF with long base lengths, phase difference detection AF with short base lengths, AF prohibited, and contrast detection AF, in accordance with the image-taking mode and the apodization filter type. Consequently, the AF mode is selected in consideration of the AF responsiveness and the importance of the focus precision for the image-taking scene, so that a high-quality image can be easily attained in which the main object is precisely in focus, and the contours of the blurred image are softened.

Embodiment 7

In the foregoing Embodiments 5 and 6, the AF mode is selected in accordance with the usage state of the apodization filter, whereas in the following Embodiment 7 of the present invention, advancing of the filter during AF is prohibited when using the apodization filter, and the filter is advanced after AF has been completed. The following is an explanation of the structure and the operation of the present embodiment with reference to FIGS. 60 to 65.

Figure 60:
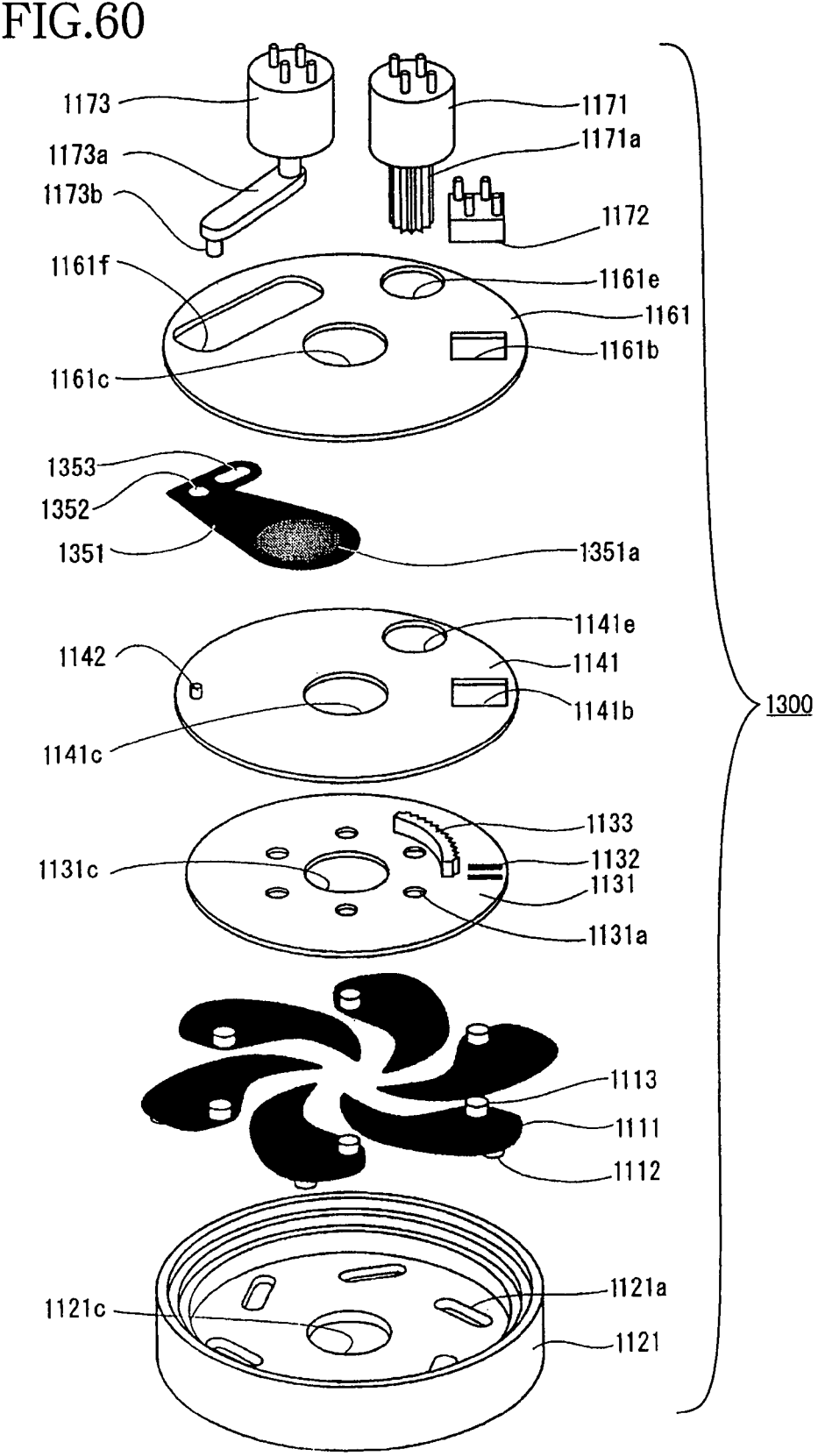
FIG. 60 is an exploded perspective view of a light amount adjusting apparatus according to Embodiment 7 of the present invention.

FIG. 60 is an exploded perspective view illustrating the structure of a light amount adjusting apparatus 1300 according to the present embodiment, which differs from the one in Embodiment 5 as shown in FIG. 37 only in that the filter 1151 of Embodiment 5 has been changed to the filter 1351 in the present embodiment. That is to say, in Embodiment 5, the transmission rate distribution pattern of the apodization filter is such that when the maximum effective diameter, that is, the maximum incident height is given as r0, then the region within a radius of r0/2 is transparent, in order to allow phase difference detection AF also when the apodization filter has been advanced into the optical path of the light flux transmitted through the light flux transmitting aperture, and phase difference detection AF was performed with the light flux transmitted through the transparent portion. On the other hand, in the present embodiment, the transmission rate distribution pattern of the apodization filter has the same transmission rate distribution as the filter 1251*d* shown in FIG. 50 of Embodiment 6. That is to say, there is practically no transparent region in the center, and a region in which the transmission rate gradually decreases is provided from the center to the outermost peripheral region. Therefore, the effect of smoothening the contours of blurred images is excellent, but the later-described filter driving control is carried out because discrepancies may occur when AF is performed through the filter.

Apart from the transmission rate distribution of the filter 1351, the structure is the same as in Embodiment 5 explained in FIGS. 37 to 42, so that further explanations thereof have been omitted.

FIG. 61 is a table listing the image-taking modes of the image-taking apparatus according to the present embodiment, and corresponds to FIG. 43 in Embodiment 5. The following are the differences between the present embodiment and Embodiment 5.

(a) In the portrait mode (4), the finder mode is the optical finder mode, and the AF mode is phase difference detection one-shot AF using the F2.8 light flux. The reason for this is that in the portrait mode, the possibility to take snapshots is desirable and the depth of field is small, so that a high-speed high-precision phase difference detection AF is necessary.

(b) In the image-taking modes (6) to (9), phase difference detection AF using a detection optical system corresponding to F2.8 is performed regardless of whether the filter is used or not.

Apart from these two points, the control is substantially the same as in Embodiment 5 as shown in FIG. 43.

FIGS. 62 to 65 are control flowcharts of the image-taking apparatus according to the present embodiment. First, the main control flow during image-taking is explained with reference to FIG. 62. This main control flow is similar to the main flow of Embodiment 5 as shown in FIG. 44. That is to say, after Steps S1301 and S1302, at Step S1303, the image-taking apparatus is initialized, and at Steps S1304 to S1306, the settings for the various modes for image-taking and the image-taking conditions are received. Then, if the image-taking mode is the moving-picture image-taking mode, then the procedure advances to the moving-picture image-taking subroutine of Step S1311, whereas if the image-taking mode is the still-picture image-taking mode, then the procedure advances to the still-picture image-taking subroutine of Step S1331.

The moving-picture image-taking subroutine of Step S1311 in the present embodiment is the same as that of Embodiment 5 as shown in FIG. 45, so that further explanations thereof have been omitted.

Figure 63:
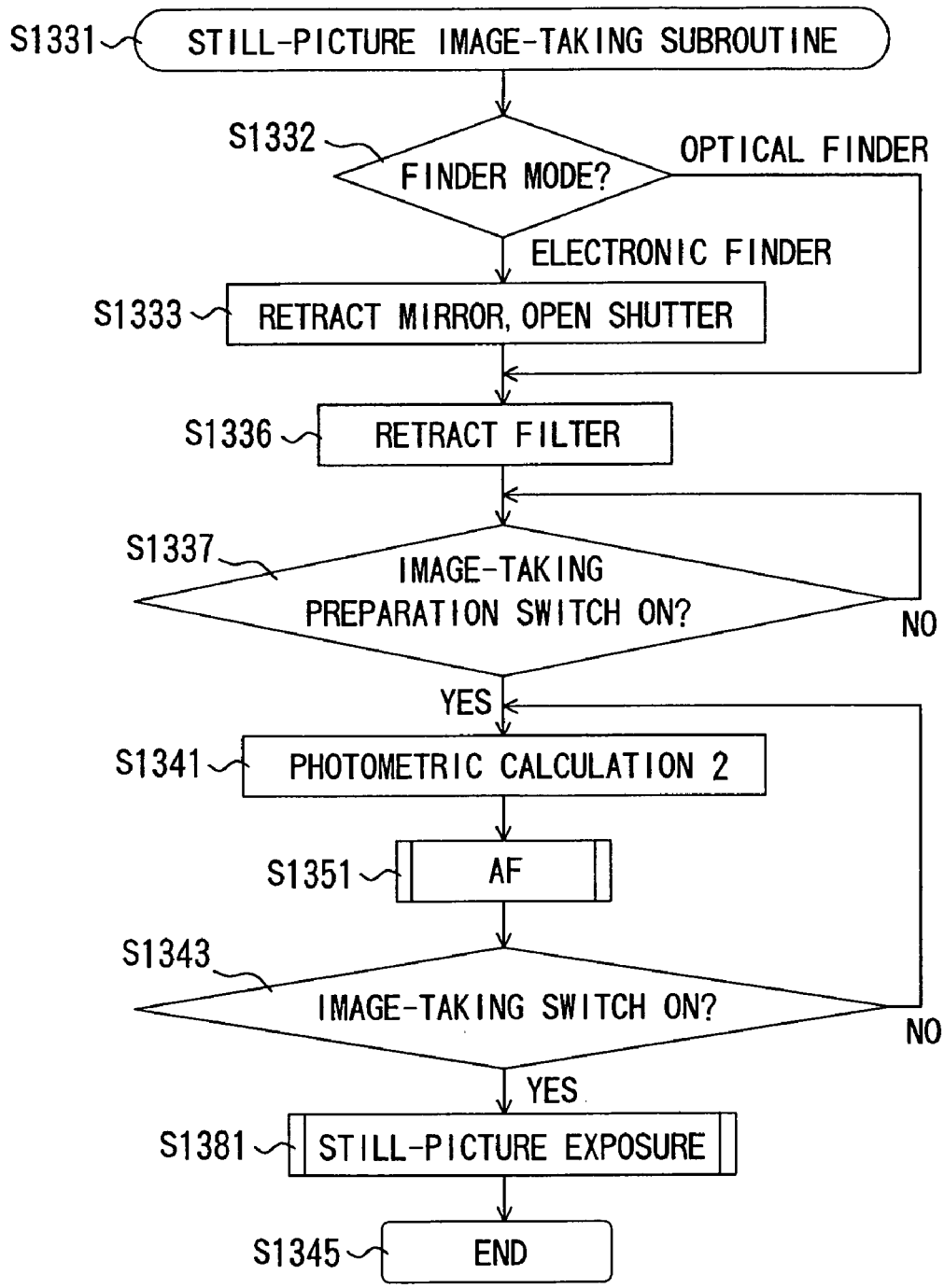
FIG. 63 is a flowchart showing a moving-picture image-taking subroutine in Embodiment 7.

FIG. 63 shows the flowchart for the still-picture image-taking subroutine, and differs from FIG. 46 in Embodiment 5 only with regard to the flow of the filter control. That is to say, in Embodiment 5, at Steps S1134 to S1136, the filter was advanced or retracted in accordance with the on/off settings of the apodization filter, whereas in the present embodiment, the retracting of the apodization filter is performed in any case at Step S1336. That is to say, during still-picture image-taking, the filter is retracted regardless of the filter selection state. Then, at Step S1337, it is discriminated whether the camera operator has turned on the image-taking preparation switch for still-picture image-taking or not. If the camera operator has not turned the image-taking preparation switch on, then the procedure remains at this step and stands by until the image-taking preparation switch is turned on. If it is determined at Step S1337 that the image-taking preparation switch has been turned on, then the procedure advances from Step S1337 to Step S1341.

At Step S1341, a second photometric calculation is carried out. This is a photometric calculation for still-picture image-taking, which calculates the brightness of the object using the maximum value, the minimum value and the average value of the image signal obtained immediately before Step S1341. Then, using predetermined equations relating to the exposure control, the diaphragm control value of the light amount adjusting apparatus 1300 is calculated. Also for this, when using the apodization filter, the characteristics relating to the dimming step number that are stored in the ROM of the CPU 1431 are looked up, and the appropriate diaphragm control value is calculated. At Step S1351, an AF subroutine is executed, and focus adjustment control is carried out. This is explained in more detail with reference to FIG. 64.

At Step S1343, it is discriminated whether the camera operator has turned on the image-taking switch for still-picture image-taking. If the image-taking switch is not turned on, then the procedure returns to Step S1341, and the second photometric calculation and the AF control are carried out again. If it is determined at Step S1343 that the image-taking switch has been turned on, then the procedure advances from Step S1343 to Step S1381.

At Step S1381, the still-picture exposure subroutine for still-picture recording is executed. This is explained in more detail with reference to FIG. 65. Then, after the exposure has been finished, the control ends at Step S1345.

Figure 64:
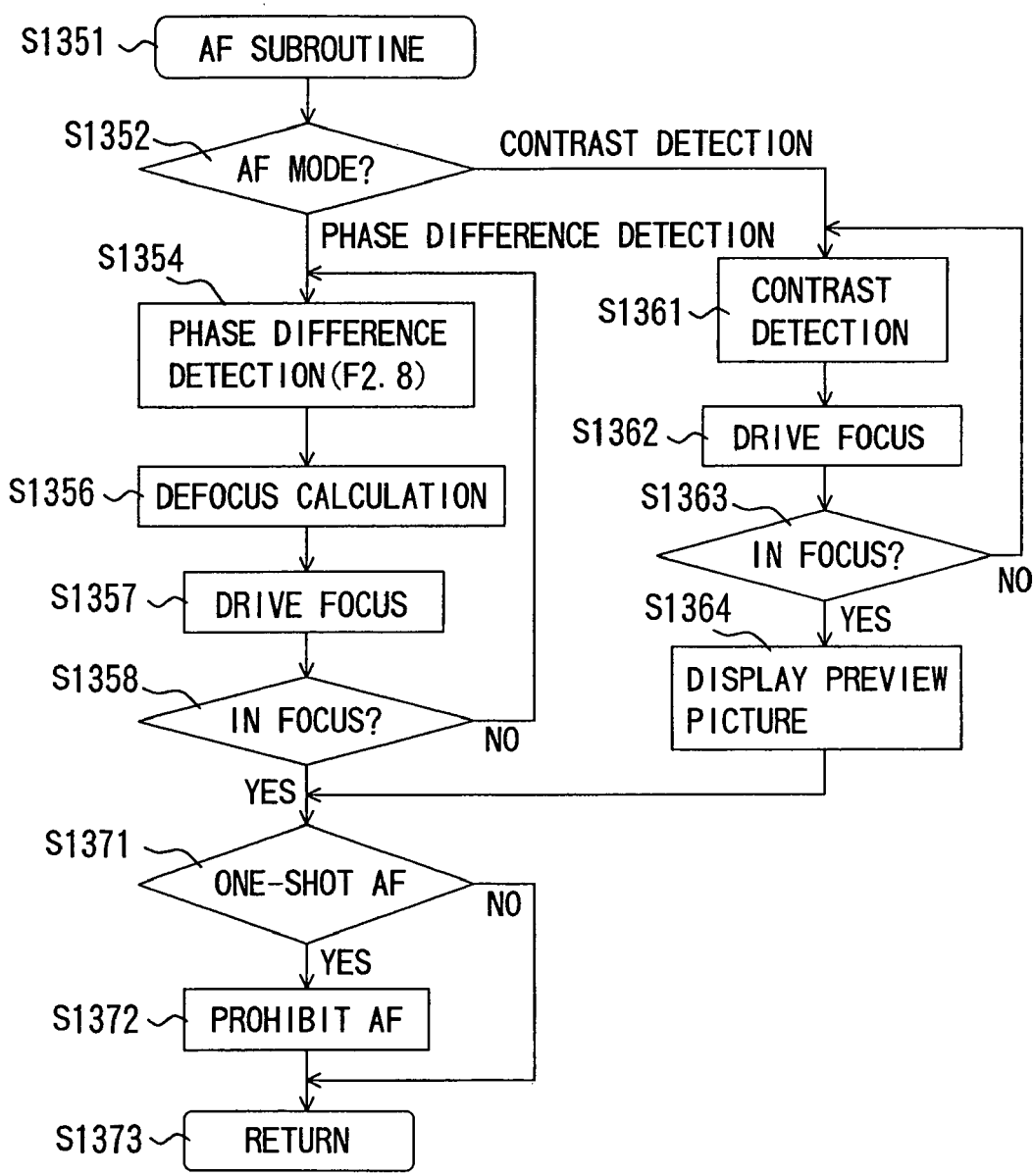
FIG. 64 is a flowchart showing a still-picture image-taking subroutine in Embodiment 7.

FIG. 64 shows a flowchart of the AF control subroutine, which differs from Embodiment 5 as shown in FIG. 47 only with regard to the flow of the phase difference detection AF selection operation. That is to say, in Embodiment 5, at Step S1153 to Step S1155, if the apodization filter is retracted (not used), then phase difference detection is performed using a focus detection optical system corresponding to F2.8 with a long base length, whereas if the apodization filter is inserted (used), then phase difference detection is performed using a focus detection optical system corresponding to F5.6 with a short base length.

On the other hand, in the present embodiment, an apodization filter retraction operation is carried out prior to the AF control at Step S1336 in FIG. 63, thus preventing that the phase difference detection AF is adversely affected by the filter. Consequently, the focus detection optical system corresponding to F2.8 with the long base length is always used for the phase difference detection. Then, a defocusing calculation is performed at Step S1356, and focus lens driving is performed at Step S1357.

Apart from the above-described steps, the flow is similar to the flow in Embodiment 5, so that further explanations thereof have been omitted.

Figure 65:
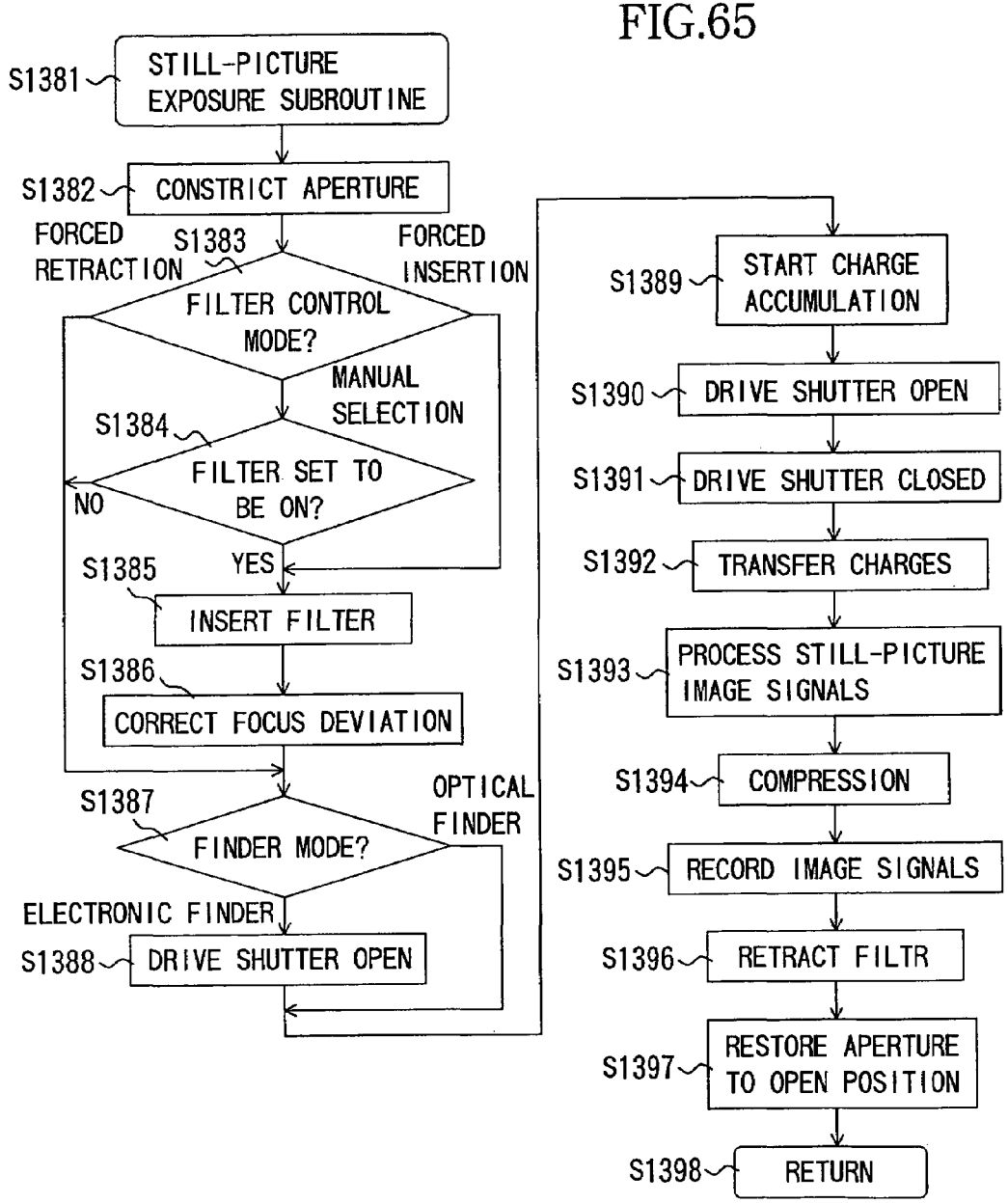
FIG. 65 is a flowchart showing an AF subroutine in Embodiment 7.

FIG. 65 is a flowchart of the still-picture exposure subroutine, and shows the control content for Step S1381 in the flowchart of the still-picture image-taking subroutine of FIG. 63.

After Step S1381, at Step S1382, the diaphragm blades 1111 of the light amount adjusting apparatus 1300 are constricted in accordance with the diaphragm control value calculated with the second photometrical calculation executed at Step S1341 of FIG. 63.

Figure 62:
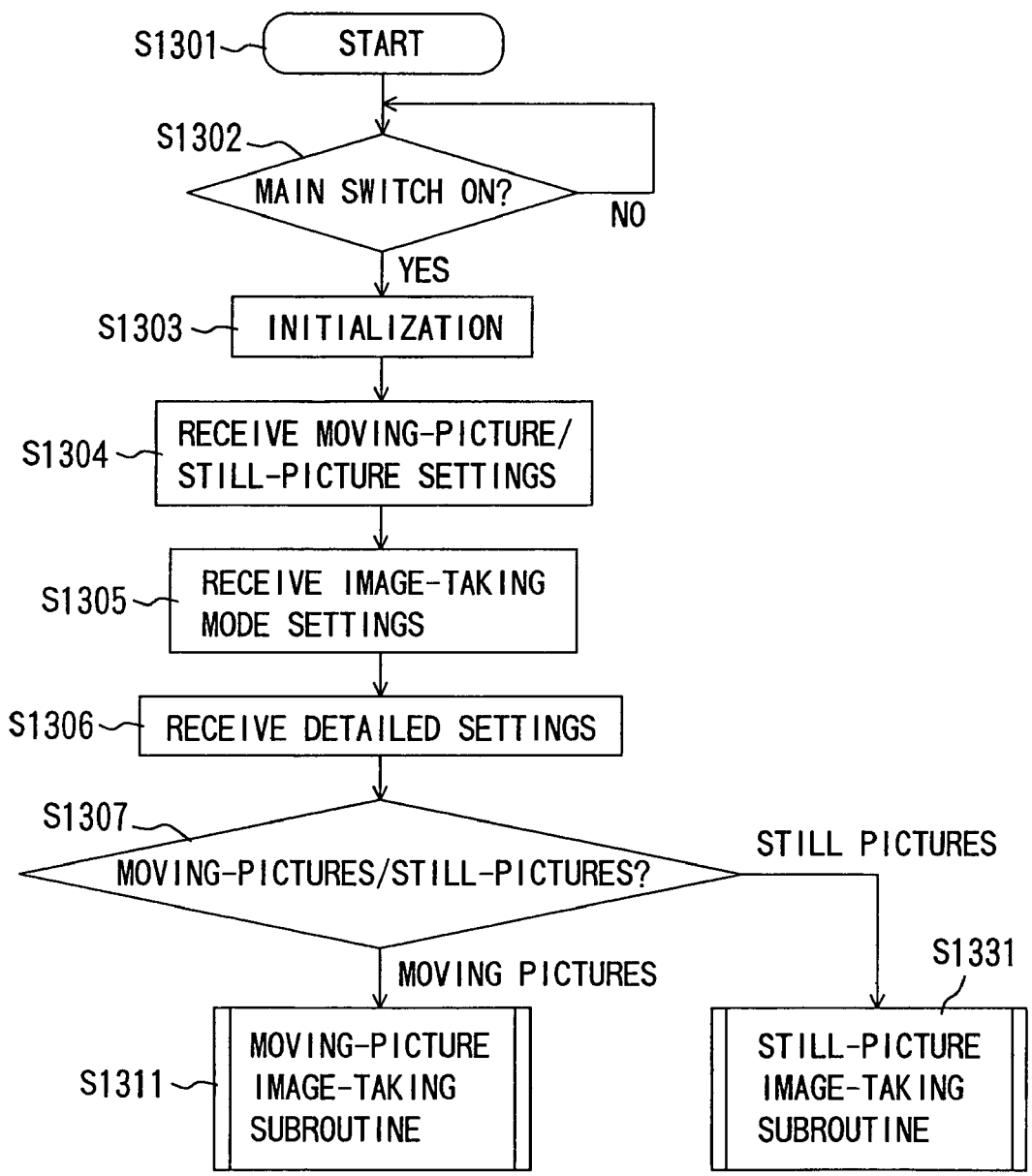
FIG. 62 is a flowchart showing a main control of an image-taking apparatus according to Embodiment 7.

At Step S1383, the apodization filter control mode that has been set in the main routine of FIG. 62 is discriminated. If this control mode is the forced retraction mode, then the procedure advances to Step S1387 without filter driving. And if this filter control mode is the forced insertion mode, then the procedure advances to Step S1385, the apodization filter is advanced into the optical path of the light flux transmitted through the light flux aperture, and then the procedure advances to Step S1386. If the filter control mode is the manual selection mode, then the procedure advances to Step S1384, and then the procedure advances to Step S1385 or Step S1387, depending on the filter usage settings selected by the camera operator at Step S1306 in FIG. 62. That is to say, if use of the filter has been selected by the camera operator, then the filter is inserted at Step S1385, after which the procedure advances to Step S1386. And if the camera operator has selected not to use the filter, then the procedure advances to Step S1387.

After the filter has been inserted at Step S1385, a focus deviation correction control is performed at Step S1386. Like in Embodiment 5, focusing is performed by AF control with the filter retracted. When the filter is advanced and image-taking is performed after this, then the light-path length of the image-forming optical system changes by an amount corresponding to the thickness of the filter, leading to a focus deviation of the taken images. Consequently, the focus deviation amount due to the presence of the filter is stored in a memory of the CPU, and at Step S1386, the focus lens is driven by a small amount in accordance with this stored value. If the focus deviation correction amount differs depending on the positions of the zoom lens and the focus lens, then a plurality of correction values corresponding to the positions of these two lens units should be stored.

At Step S1387, the currently selected finder mode is discriminated. If it is discriminated to be the electronic finder mode, then the focal plane shutter 1416 is driven shut at Step S1388, blocking the image-taking light flux onto the image-pickup device 1440. The reason for this is that at Step S1332 and Step S1333 of FIG. 63, during the electronic finder mode, the shutter was open and the image-pickup device has obtained the object image, but the control of the exposure start and end during still-picture image-taking is performed with a mechanical shutter, in order to maintain the shutter speed on the image-taking screen uniform and prevent smear during the reading of the image signals. At Step S1387, if the finder mode is discriminated to be the optical finder mode, then the focal plane shutter is closed, so that the procedure advances to Step S1389.

At Step S1389, the charge accumulation in the image-pickup device 1440 is started in order to obtain the image. At Step S1390, the first curtain of the focal plane shutter 1416 starts to travel, opening the shutter. At Step S1391, in accordance with the shutter speed calculated by the second photometric calculation at Step S1341 in FIG. 63, the second curtain of the shutter 1416 starts to travel, closing the shutter and blocking the light flux onto the image-pickup device 1440. At Step S1392, the charges in the image-pickup device 1440 are transferred, and at Step S1393, the image signals corresponding to the obtained 3 million pixels are subjected to an image process for still-picture image signals. At Step S1394, an image compression for still-picture recording is performed, and at Step S1395, the compressed image signals are recorded in the memory 1443. At Step S1396, the filter that is advanced into the optical path of the light flux transmitted through the light flux aperture is retracted from that aperture, at Step S1397, the diaphragm blades are restored to their open position, and at Step S1398, the procedure returns to the still-picture image-taking subroutine in FIG. 63.

With the foregoing embodiment and control flow, a decrease of the AF precision due to performing AF with a retracted filter can be prevented when using the apodization filter. That is to say, during use of the apodization filter, the outward portion of the light flux for phase difference detection is attenuated and the focus detection discrepancy becomes large, so that a high-precision AF always using a detection optical system with a long base length becomes possible by performing phase difference detection with a retracted filter.

Moreover, during use of the apodization filter, the transmitted light amount is attenuated and also the diameter of blurred images is decreased, so that it also has a slightly adverse effect on contrast detection AF. Also in this case, a reduction of the detection precision can be prevented by performing contrast detection with the filter retracted. With the foregoing embodiment, high-speed AF is performed when phase difference detection AF is selected, whereas high-precision AF is performed when contrast detection AF is selected, and it is easy to obtain a high-quality image in which the main object is precisely in focus, and the contours of blurred images have been softened.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

"This application claims priorities from Japanese Patent Application Nos. 2003-296076 filed on Aug. 20, 2003, 2003-296075 filed on Aug. 20, 2003 and 2004-76368 filed on Mar. 17, 2004 which are hereby incorporated by reference herein."

What is claimed is:

1. An image-taking apparatus comprising:
   an image-pickup element photoelectrically converting an object image formed by an image-taking optical system; and
   a focus detection unit detecting a focus state of the image-taking optical system by using a phase difference detection method;
   wherein the image-taking optical system comprises an optical filter including a first region with a constant optical density; and
   wherein the focus detection unit performs a focus detection operation using a light flux which has been transmitted through the first region.

2. The image-taking apparatus according to claim 1, further comprising a control circuit discriminating whether the light flux used for the focus detection is transmitted through the first region, and controlling the driving of the focus detection unit based on a result of the discrimination.

3. The image-taking apparatus according to claim 2, wherein the focus detection unit comprises a plurality of focus detection optical systems, and performs a focus detection operation by using one pair of the focus detection optical systems, in accordance with the result of the discrimination.

4. An image-taking system comprising:
the image-taking apparatus according to claim 1; and
an image-taking optical system comprising an optical filter having a first region with a constant optical density.

5. An image-taking apparatus comprising:
an image-pickup element photoelectrically converting an object image formed by an image-taking optical system;
a first focus detection unit detecting a focus state of the image-taking optical system by using a phase difference detection method;
a second focus detection unit detecting a focus state of the image-taking optical system by using a contrast detection method; and
a control circuit controlling driving of one of the first and the second focus detection units in accordance with a position, with respect to a light transmission aperture within the image-taking optical system, of an optical filter arranged within the image-taking optical system.

6. The image-taking apparatus according to claim 5,
wherein the optical filter includes a plurality of filter portions with different optical densities; and
the control circuit prohibits driving of the first focus detection unit in a case where a filter portion that is not suitable for focus detection by a phase difference detection method is positioned in light flux passed through the light transmission aperture.

7. An image-taking system comprising:
the image-taking apparatus according to claim 5; and
an image-taking optical system including an optical filter.

* * * * *

UNITED STATES PATENT AND TRADEMARK OFFICE
CERTIFICATE OF CORRECTION

PATENT NO.      : 7,099,555 B2
APPLICATION NO. : 10/919514
DATED           : August 29, 2006
INVENTOR(S)     : Ichiro Onuki et al.

It is certified that error appears in the above-identified patent and that said Letters Patent is hereby corrected as shown below:

IN THE DRAWINGS:
Sheet No. 42, Figure 47, Item S1153, "FILTR" should read --FILTER--.
Sheet No. 52, Figure 59, Item S1253, "FILTR" should read --FILTER--.
Sheet No. 58, Figure 65, Item S1396, "FILTR" should read --FILTER--.

COLUMN 3:
Line 31, "defection" should read --detection--.
Line 38, "duce" should read --duct--.

COLUMN 17:
Line 25, "FIG. 8" should read --FIG. 8.--.

Signed and Sealed this

Twenty-fourth Day of July, 2007

JON W. DUDAS
*Director of the United States Patent and Trademark Office*